US011774590B2

(12) United States Patent
Shand

(10) Patent No.: US 11,774,590 B2
(45) Date of Patent: *Oct. 3, 2023

(54) LIGHT DETECTION AND RANGING (LIDAR) DEVICE RANGE ALIASING RESILIENCE BY MULTIPLE HYPOTHESES

(71) Applicant: Waymo LLC, Mountain View, CA (US)

(72) Inventor: Mark Alexander Shand, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 16/989,509

(22) Filed: Aug. 10, 2020

(65) Prior Publication Data

US 2020/0371235 A1 Nov. 26, 2020

Related U.S. Application Data

(63) Continuation of application No. 15/638,607, filed on Jun. 30, 2017, now Pat. No. 10,754,033.

(51) Int. Cl.
*G01S 17/10* (2020.01)
*G01S 7/483* (2006.01)
(Continued)

(52) U.S. Cl.
CPC ............ *G01S 17/10* (2013.01); *G01S 7/483* (2013.01); *G01S 7/484* (2013.01); *G01S 7/4865* (2013.01);
(Continued)

(58) Field of Classification Search
None
See application file for complete search history.

(56) References Cited

U.S. PATENT DOCUMENTS 4,751,381 A 6/1988 Dorman
5,805,110 A 9/1998 McEwan
(Continued)

FOREIGN PATENT DOCUMENTS

CN 101034155 A 9/2007
CN 104375119 A 2/2015
(Continued)

OTHER PUBLICATIONS

Definition of Range ambiguity resolution from Wikipedia, retrieved on Jun. 29, 2017, https://en.wikipedia.org/wiki/Range_ambiguity_resolution (4 pages).
(Continued)

*Primary Examiner* — Luke D Ratcliffe
(74) *Attorney, Agent, or Firm* — McDonnell Boehnen Hulbert & Berghoff LLP

(57) ABSTRACT

A computing system may operate a LIDAR device to emit light pulses in accordance with a time sequence including a time-varying dither. The system may then determine that the LIDAR detected return light pulses during corresponding detection periods for each of two or more emitted light pulses. Responsively, the system may determine that the detected return light pulses have (i) detection times relative to corresponding emission times of a plurality of first emitted light pulses that are indicative of a first set of ranges and (ii) detection times relative to corresponding emission times of a plurality of second emitted light pulses that are indicative of a second set of ranges. Given this, the system may select between using the first set of ranges as a basis for object detection and using the second set of ranges as a basis for object detection, and may then engage in object detection accordingly.

20 Claims, 29 Drawing Sheets

(51) Int. Cl.
*G01S 17/89* (2020.01)
*G01S 7/4865* (2020.01)
*G01S 17/42* (2006.01)
*G01S 7/484* (2006.01)
*G01S 17/931* (2020.01)

(52) U.S. Cl.
CPC .............. *G01S 17/42* (2013.01); *G01S 17/89* (2013.01); *G01S 17/931* (2020.01)

(56) References Cited

U.S. PATENT DOCUMENTS

| | | | |
|---|---|---|---|
| 7,746,449 | B2 | 6/2010 | Ray et al. |
| 8,368,876 | B1 | 2/2013 | Johnson et al. |
| 8,629,976 | B2 | 1/2014 | Hui et al. |
| 9,207,680 | B1 | 12/2015 | Agarwal et al. |
| 9,383,447 | B2 | 7/2016 | Schmitt et al. |
| 10,754,033 | B2 | 8/2020 | Shand |
| 2003/0039172 | A1 | 2/2003 | Thomas |
| 2009/0010644 | A1 | 1/2009 | Varshneya et al. |
| 2011/0176565 | A1 | 7/2011 | Hutchin |
| 2011/0273324 | A1 | 11/2011 | Petillon |
| 2012/0257186 | A1 | 10/2012 | Rieger et al. |
| 2014/0240161 | A1 | 8/2014 | Davidson |
| 2015/0070683 | A1 | 3/2015 | Lepere et al. |
| 2015/0323647 | A1 | 11/2015 | Jones et al. |
| 2015/0331113 | A1 | 11/2015 | Stettner et al. |
| 2016/0274589 | A1 | 9/2016 | Templeton et al. |
| 2016/0320487 | A1 | 11/2016 | Wong |
| 2016/0327646 | A1 | 11/2016 | Scheim et al. |
| 2016/0349359 | A1 | 12/2016 | Nevet |
| 2016/0370460 | A1 | 12/2016 | Takahashi et al. |
| 2017/0057510 | A1 | 3/2017 | Herbach et al. |
| 2018/0284277 | A1* | 10/2018 | LaChapelle ............. G01S 17/89 |
| 2018/0284279 | A1 | 10/2018 | Campbell et al. |
| 2018/0329037 | A1 | 11/2018 | Bozchalooi et al. |

FOREIGN PATENT DOCUMENTS

| | | | |
|---|---|---|---|
| CN | 105182361 | A | 12/2015 |
| EP | 0835460 | B1 | 3/2006 |
| EP | 1832897 | A1 | 9/2007 |
| EP | 3159711 | A1 | 4/2017 |
| JP | 2016540198 | A | 12/2016 |
| WO | 2017/046010 | A1 | 3/2017 |
| WO | 2017/68199 | A1 | 4/2017 |

OTHER PUBLICATIONS

International Search Report and Written Opinion for corresponding PCT application No. PCT/US2018/036275, dated Oct. 2, 2018.
Written Opinion and International Search Report for PCT application No. PCT/US2018/036227, dated Sep. 1, 2018.

* cited by examiner

FIRST RANGES 502

| DETECTION TIME | CORRESPONDING RANGE |
|---|---|
| Tn0 = 133ns | 20m |
| Tn1 = 133ns | 20m |
| Tn2 = 133ns | 20m |
| Tn3 = 133ns | 20m |
| Tn4 = 133ns | 20m |
| Tn5 = 133ns | 20m |

SECOND RANGES 504

| DETECTION TIME | CORRESPONDING RANGE |
|---|---|
| Tf0 = 533ns | 80m |
| Tf1 = 533ns | 80m |
| Tf2 = 533ns | 80m |
| Tf3 = 533ns | 80m |
| Tf4 = 533ns | 80m |
| Tf5 = 533ns | 80m |

AN OBJECT IS ~20m AWAY ACCORDING TO FIRST RANGES 502 AND ~80m AWAY ACCORDING TO SECOND RANGES 504

*RANGE AMBIGUITY*

FIRST RANGES 802

| DETECTION PERIOD | DETECTION TIME | CORRESPONDING RANGE |
|---|---|---|
| A | A = 350ns | 52.5m |
| B | --- | --- |
| C | C = 350ns | 52.5m |
| D | --- | --- |
| E | E = 350ns | 52.5m |
| F | --- | --- |
| G | G = 350ns | 52.5m |

SECOND RANGES 804

| DETECTION PERIOD | DETECTION TIME | CORRESPONDING RANGE |
|---|---|---|
| A | --- | --- |
| B | --- | --- |
| C | B = 133ns | 20m |
| D | --- | --- |
| E | D = 133ns | 20m |
| F | --- | --- |
| G | F = 133ns | 20m |

NEARBY OBJECT IS ~52.5m AWAY ACCORDING TO FIRST RANGES 802 AND ~20m AWAY ACCORDING TO SECOND RANGES 804 ⇒ *RANGE AMBIGUITY*

FIG. 8B

| DETECTION PERIOD | DETECTION TIME RELATIVE TO PRECEDING EMISSION TIME | CORRESPONDING RANGE |
|---|---|---|
| A | -- | -- |
| B | -- | -- |
| C | B = 533ns (RELATIVE TO EMISSION TIME B) | 80m |
| D | -- | -- |
| E | D = 533ns (RELATIVE TO EMISSION TIME D) | 80m |
| F | -- | -- |
| G | F = 533ns (RELATIVE TO EMISSION TIME F) | 80m |

RANGES 1100

DISTANT OBJECT IS ~80m AWAY ACCORDING TO RANGES 1100

⇒ DISTANT OBJECT IS ~80m AWAY

| DETECTION PERIOD | DETECTION TIME RELATIVE TO PRECEDING EMISSION TIME | CORRESPONDING RANGE |
|---|---|---|
| A | --- | --- |
| B | --- | --- |
| C | B = 533ns (RELATIVE TO EMISSION TIME B) | 80m |
| D | --- | --- |
| E | D = 533ns (RELATIVE TO EMISSION TIME D) | 80m |
| F | --- | --- |
| G | F = 533ns (RELATIVE TO EMISSION TIME F) | 80m |

RANGES 1300

DISTANT OBJECT IS ~80m AWAY ACCORDING TO RANGES 1300

USE RANGES 902 RATHER THAN RANGES 904 FOR OBJECT DETECTION

FIG. 13B

RANGES 1400

| DETECTION PERIOD | DETECTION TIME RELATIVE TO PRECEDING EMISSION TIME | CORRESPONDING RANGE |
|---|---|---|
| A | -- | -- |
| B | -- | -- |
| C | C = 675ns (RELATIVE TO EMISSION TIME B) | 101.35m |
| D | -- | -- |
| E | E = 725ns (RELATIVE TO EMISSION TIME D) | 108.8m |
| F | -- | -- |
| G | G = 750ns (RELATIVE TO EMISSION TIME F) | 112.6m |

RANGES 1400 ARE SCATTERED (COMPARED TO RANGES 1300)

⇒ *USE RANGES 902 RATHER THAN RANGES 904 FOR OBJECT DETECTION*

FIG. 14B

LIGHT DETECTION AND RANGING (LIDAR) DEVICE RANGE ALIASING RESILIENCE BY MULTIPLE HYPOTHESES

CROSS-REFERENCE TO RELATED APPLICATIONS

This application is a continuation of U.S. patent application Ser. No. 15/638,607, filed Jun. 30, 2017, which is incorporated herein by reference.

BACKGROUND

A vehicle can be configured to operate in an autonomous mode in which the vehicle navigates through an environment with little or no input from a driver. Such an autonomous vehicle can include one or more sensors that are configured to detect information about the environment in which the vehicle operates. One such sensor is a light detection and ranging (LIDAR) device.

A LIDAR device can estimate distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmitted pulse and the reception of the reflected pulse.

A LIDAR device may thus include a laser, or set of lasers, and may rapidly and repeatedly scan across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

One challenge in using LIDARs can be range aliasing. Range aliasing relates to the appearance of ambiguous echoes, such as when a system cannot disambiguate between a signal scattered from one particular range and a signal scattered from other ranges based on the generated data. For example, in the context of LIDARs, range aliasing can refer a return signal from outside a LIDAR's maximum unambiguous range being interpreted to be within the LIDAR's maximum unambiguous range.

SUMMARY

This disclosure relates generally to sensors, and in particular to systems and methods that provide range aliasing resilience for sensors.

Example implementations may relate to generating multiple range hypotheses during operation of a LIDAR device. Once generated, the multiple range hypotheses could be used by a computing system, e.g., onboard or remote, to disambiguate multiple return signals received during a listening/detection period, associate with each or a subset of the return signals a range that has a greater likelihood of representing a physical state of the environment, and/or to detect an object positioned outside of a nominal unambiguous detection range of the LIDAR device. For example, an alternate range hypothesis (e.g., a range hypothesis other than a default range hypothesis) could be used by the computing system to detect an object positioned outside a maximum unambiguous detection range of the LIDAR device.

As a further example, consider a scenario in which a LIDAR device emits a first pulse, listens for return signals during a first detection period, emits a second pulse, and listens for return signals during a second detection period. Under one hypothesis, any return signals detected during a detection period is associated with the pulse emitted immediately preceding the detection period. For example, any return signals detected during the first detection period is associated with the first pulse, and any return signals detected during the second detection period is associated with the second pulse. Accordingly, under this hypothesis, which may be referred to herein as the default range hypothesis, a detected return signal is associated with the most recently emitted pulse, and the difference between the time the most recently emitted pulse was emitted and the time the return signal was detected is used to compute the distance the pulse traveled. This distance is associated with a range and bearing of the object that reflected the pulse.

Under an alternate hypothesis, the detected return signal is not from the most recently emitted pulse. For example, a subset of return signals detected during the second detection period may be associated with the first pulse rather than the second pulse, and the distance the pulse traveled is calculated based on the difference between the time the first pulse was emitted and the time the return signal was detected.

As a further example, consider a scenario in which, during a detection period (e.g., the second detection period), a LIDAR device detects return light pulses that actually correspond to more than one emitted light pulses (e.g., the first pulse and the second pulse). This can create ambiguity as to whether a given return light pulse corresponds to the pulse emission occurring immediately before the detection period (e.g., the second pulse), or whether the given return light pulse corresponds to a pulse emission that occurred earlier in time, e.g., before a previous detection period (e.g., the first pulse). This ambiguity can arise, for example, when a return light pulse is detected after being reflected off an object positioned outside a nominal detection range of a LIDAR device.

In accordance with the disclosed implementations, the computing system could operate the LIDAR device to emit light pulses in accordance with a time sequence that includes a time-varying dither and, once return light pulses are detected, could generate two or more range hypotheses.

For instance, after the LIDAR device detects return light pulses, the computing system may determine (i) a first set of ranges in accordance with a time delay relative to corresponding emission times of a plurality of first emitted light pulses and (ii) a second set of ranges in accordance with a time delay relative to corresponding emission times of a plurality of second emitted light pulses.

In some examples, the first set of ranges could correspond to a "close range hypothesis" and the second set of ranges could correspond to a "far range hypothesis." In the "close range hypothesis," for each detected light pulse, a respective range is determined in accordance with a time delay relative to an emission time of a light pulse associated with the detection period during which the light pulse was detected. For example, in the scenario above, the close range hypothesis may correspond to the default range hypothesis. In the "far range hypothesis," for each detected light pulse, a respective range is determined in accordance with a time delay relative to an emission time of a light pulse associated with a preceding detection period (e.g., a detection period that precedes in time the detection period during which the light pulse was detected). For example, in the scenario above, the far range hypothesis may correspond to the alternate range hypothesis. However, as further discussed herein, it should be understood that other range hypotheses are possible as well.

Based on one or more factors, the computing system could then select between using the first set of ranges as a basis for object detection and using the second set of ranges as a basis for object detection. By way of example, the computing system may select the set having ranges that more closely resemble a known object rather than selecting the set having ranges that do not resemble a known object and/or may select the set that includes ranges that are substantially similar to one another rather than selecting the set that includes ranges that are substantially different from one another, among other options.

Furthermore, as noted, the present disclosure could apply in the context of disambiguating between multiple light pulses detected during the same detection period and/or in the context of detecting an object positioned outside the nominal detection range of the LIDAR device. In particular, a LIDAR device could sometimes detect multiple light pulses respectively during each of a plurality of detection periods, and the computing system could determine how these return light pulses should be used as basis for object detection.

For instance, each detection period may include detection of a first return light pulse that corresponds to the emitted light pulse associated with that detection period (e.g., the light pulse emitted immediately prior to that detection period) and may also include detection of a second return light pulse that reflected off an object positioned outside of the nominal unambiguous detection range and thus corresponds to an emitted light pulse associated with another detection period (e.g., the light pulse emitted prior to a preceding detection period).

In accordance with the disclosed implementations, in order to determine how such return light pulses should be used as basis for object detection, a system could emit light pulses in accordance with a time sequence that includes a time-varying dither, and generate and utilize multiple range hypotheses. For example, the system may determine a first set of ranges according to a close range hypothesis for the first return light pulses as well as a second set of ranges according to a close range hypothesis for the second return light pulses. Additionally, the system may determine a third set of ranges according to an alternate range hypothesis (e.g., a far range hypothesis) for the second return light pulses. With this information, the computing system could then detect an object positioned outside the nominal unambiguous detection range of a LIDAR device and/or could disambiguate between multiple return light pulses detected during the same detection period(s).

For instance, the computing system could determine whether or not the set of third ranges assembles a point cloud indicative of at least one known object. If so, then the computing system could use that set of third ranges as basis for object detection. This, in turn, can enable detection of objects positioned outside the nominal unambiguous detection range of the LIDAR device.

Moreover, if the set of third ranges assembles a point cloud indicative of at least one known object, then the computing system could determine that the alternate range hypothesis for the second return light pulses is likely correct. Namely, that the second return light pulses likely each respectively correspond to an alternate preceding pulse emission rather than to a nominal pulse emission. And based on the determination that the alternate range hypothesis for the second return light pulses is likely correct, the computing system may determine that the close range hypothesis for the second return light pulses is likely incorrect. Thus, the computing system could responsively determine that the computing system should use, for purposes of object detection, the first set of ranges associated with the first return light pulses rather than the second set of ranges associated with the second return light pulses, thereby resolving range ambiguity. Other examples are also possible.

In one aspect, a method is disclosed. The method involves operating, by a computing system, a Light Detection and Ranging (LIDAR) device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse. The method also involves making a determination, by the computing system, that the LIDAR device detected return light pulses during corresponding detection periods for each of two or more emitted light pulses. The method additionally involves, in response to making the determination, determining, by the computing system, that (i) the detected return light pulses have detection times relative to corresponding emission times of a plurality of first emitted light pulses that are indicative of a first set of ranges and (ii) the detected return light pulses have detection times relative to corresponding emission times of a plurality of second emitted light pulses that are indicative of a second set of ranges. The method further involves selecting, by the computing system, between using the first set of ranges as a basis for object detection and using the second set of ranges as a basis for object detection. The method yet further involves engaging, by the computing system, in object detection in accordance with the selecting.

In another aspect, a computing system is disclosed. The computing system includes one or more processors, a non-transitory computer readable medium, and program instructions stored on the non-transitory computer readable medium and executable by the one or more processors. In particular, the program instructions may be executable to operate a Light Detection and Ranging (LIDAR) device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse. The program instructions may also be executable to make a determination that the LIDAR device detected return light pulses during corresponding detection periods for each of two or more emitted light pulses. The program instructions may additionally be executable to, in response to making the determination, determine that (i) the detected return light pulses have detection times relative to corresponding emission times of a plurality of first emitted light pulses that are indicative of a first set of ranges and (ii) the detected return light pulses have detection times relative to corresponding emission times of a plurality of second emitted light pulses that are indicative of a second set of ranges. The program instructions may further be executable to select between using the first set of ranges as a basis for object detection and using the second set of ranges as a basis for object detection. The program instructions may yet further be executable to engage in object detection in accordance with the selecting.

In yet another aspect, another method is disclosed. The method involves operating, by a computing system, a Light Detection and Ranging (LIDAR) device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse. The method also involves determining, by the computing system, that the LIDAR device detected a set of multiple return light pulses during corresponding detection periods for each of a plurality of first emitted light pulses, where each set of multiple return light pulses includes at least a respective first return light pulse and a respective second return light pulse. The method additionally involves making a determination, by the computing system, that the first return light pulses correspond to the plurality of first emitted light pulses and that the second return light pulses potentially correspond to a plurality of second emitted light pulses. The method further involves, in response to making the determination, determining, by the computing system, that the second return light pulses have detection times relative to corresponding emission times of the plurality of second emitted light pulses that are indicative of a particular set of ranges. The method yet further involves making a further determination, by the computing system, of whether or not to use the particular set of ranges as a basis for object detection. The method yet further involves engaging, by the computing system, in object detection in accordance with the further determination.

In yet another aspect, another method is disclosed. The method involves operating, by a computing system, a Light Detection and Ranging (LIDAR) device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse. The method also involves determining, by the computing system, that the LIDAR device detected a set of multiple return light pulses during corresponding detection periods for each of a plurality of first emitted light pulses, where each set of multiple return light pulses includes at least a respective first return light pulse and a respective second return light pulse. The method additionally involves determining, by the computing system, that (i) the first return light pulses have detection times relative to corresponding emission times of the plurality of first emitted light pulses that are indicative of a first set of ranges, (ii) the second return light pulses have detection times relative to corresponding emission times of the plurality of first emitted light pulses that are indicative of a second set of ranges, and (iii) the second return light pulses have detection times relative to corresponding emission times of a plurality of second emitted light pulses that are indicative of a third set of ranges. The method further involves, based on the third set of ranges, selecting, by the computing system, between using the first set of ranges as a basis for object detection and using the second set of ranges as a basis for object detection. The method yet further involves engaging, by the computing system, in object detection in accordance with the selecting.

In yet another aspect, a method for operating an autonomous vehicle is disclosed. The method involves receiving a signal associated with a reflection, by an object, of a light pulse emitted by a LIDAR device of the autonomous vehicle. The method also involves calculating a first distance to the object based on a first time, the first time corresponding to a prior light pulse emitted by the LIDAR device of the autonomous vehicle. The method additionally involves calculating a second distance to the object based on a second time, the second time corresponding to a different prior light pulse emitted by the LIDAR device of the autonomous vehicle. The method further involves operating the autonomous vehicle based on a selection between the first distance and second distance.

In yet another aspect, another system is disclosed. The system may include means for operating a Light Detection and Ranging (LIDAR) device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse. The system may also include means for making a determination that the LIDAR device detected return light pulses during corresponding detection periods for each of two or more emitted light pulses. The system may additionally include means for, in response to making the determination, determining that (i) the detected return light pulses have detection times relative to corresponding emission times of a plurality of first emitted light pulses that are indicative of a first set of ranges and (ii) the detected return light pulses have detection times relative to corresponding emission times of a plurality of second emitted light pulses that are indicative of a second set of ranges. The system may further include means for selecting between using the first set of ranges as a basis for object detection and using the second set of ranges as a basis for object detection. The system may yet further include means for engaging in object detection in accordance with the selecting.

In yet another aspect, another system is disclosed. The system may include means for operating a Light Detection and Ranging (LIDAR) device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse. The system may also include means for determining that the LIDAR device detected a set of multiple return light pulses during corresponding detection periods for each of a plurality of first emitted light pulses, where each set of multiple return light pulses includes at least a respective first return light pulse and a respective second return light pulse. The system may additionally include means for making a determination that the first return light pulses correspond to the plurality of first emitted light pulses and that the second return light pulses potentially correspond to a plurality of second emitted light pulses. The system may further include means for, in response to making the determination, determining that the second return light pulses have detection times relative to corresponding emission times of the plurality of second emitted light pulses that are indicative of a particular set of ranges. The system may yet further include means for making a further determination of whether or not to use the particular set of ranges as a basis for object detection. The system may yet further include means for engaging in object detection in accordance with the further determination.

In yet another aspect, another system is disclosed. The system may include means for operating a Light Detection and Ranging (LIDAR) device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse. The system may also include means for determining that the LIDAR device detected a set of multiple return light pulses during corresponding detection periods for each of a plurality of first emitted light pulses, where each set of multiple return light pulses includes at least a respective first return light pulse and a respective second return light pulse. The system may additionally include means for determining that (i) the first return light pulses have detection times relative to corresponding emission times of the plurality of first emitted light pulses that are indicative of a first set of ranges, (ii) the second return light pulses have detection times relative to corresponding emission times of the plurality of first emitted light pulses that are indicative of a second set of ranges, and (iii) the second return light pulses have detection times relative to corresponding emission times of a plurality of second emitted light pulses that are indicative of a third set of ranges. The system may further include means for, based on the third set of ranges, selecting between using the first set of ranges as a basis for object detection and using the second set of ranges as a basis for object detection. The system may yet further include means for engaging in object detection in accordance with the selecting.

In yet another aspect, another system is disclosed. The system may include means for receiving a signal associated with a reflection, by an object, of a light pulse emitted by a LIDAR device of an autonomous vehicle. The system may also include means for calculating a first distance to the object based on a first time, the first time corresponding to a prior light pulse emitted by the LIDAR device of the autonomous vehicle. The system may additionally include means for calculating a second distance to the object based on a second time, the second time corresponding to a different prior light pulse emitted by the LIDAR device of the autonomous vehicle. The system may further include means for operating an autonomous vehicle based on a selection between the first distance and second distance.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 8B shows range ambiguity with respect to the third emission time sequence, according to an example embodiment.

FIG. 13B shows selection of ranges to use for object detection, according to an example embodiment.

FIG. 14B shows another selection ranges to use for object detection, according to an example embodiment.

DETAILED DESCRIPTION

Figure 1:
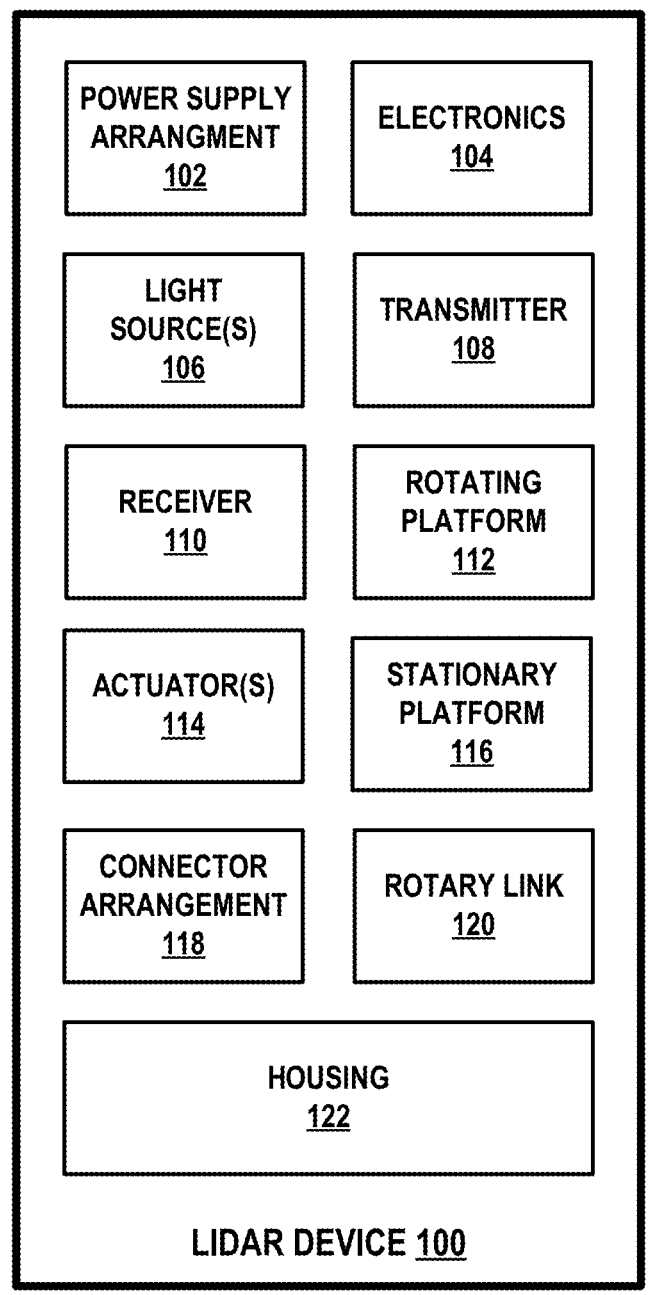
FIG. 1 is a simplified block diagram of a LIDAR device, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

There are continued efforts to improve autonomous operation in which a vehicle navigates through an environment with little or no input from a driver. Such efforts include development of vehicles equipped with remote sensing capabilities and possibly accident-avoidance systems. For instance, various sensors, such as a LIDAR device, may be included in a vehicle to detect objects in an environment of the vehicle and to thereby facilitate autonomous operation and/or accident avoidance.

Generally, a LIDAR device can help estimate distance(s) to environmental features while scanning through a scene to assemble a "point cloud" indicative of reflective surfaces in the environment. Individual points in the point cloud can be determined by emitting a light pulse and detecting a returning light pulse, if any, reflected from an object in the environment, and determining the distance to the object according to the time delay between the emitted light pulse and the detection of the reflected returning light pulse. A LIDAR can include laser(s) or other light sources. The laser(s), or the LIDAR as a whole, can rapidly and repeatedly scan across a scene to provide continuous real-time information on distances to reflective objects in the scene. With this arrangement, combining the measured distances and the orientation of the laser(s) while measuring each distance allows for associating a three-dimensional position with each returning light pulse. In this way, a three-dimensional map of points indicative of locations of reflective features in the environment can be generated for the entire scanning zone.

When a computing system (e.g., in a vehicle) operates a LIDAR device, the computing system may operate the LIDAR device to emit and detect light pulses in accordance with certain timing. For example, the computing system may operate the LIDAR device to emit light pulses at emission times in accordance with an emission time sequence, such as a periodic sequence (e.g., emission of a light pulse once every microsecond). In this example, the computing system may also operate the LIDAR device to detect return light pulses in accordance with a detection time sequence. The detection time sequence may have a detection period intended to detect light pulses returned from an object located within a certain range of the LIDAR. This detection period may be referred to herein as the corresponding detection period or the nominal detection period or the default detection period, and this range may be referred to herein as the nominal unambiguous detection range or nominal detection range. For instance, a corresponding detection period for a given light pulse may begin immediately following or at some time after emission of that given light pulse, and may end before or after emission of a subsequent light pulse. This corresponding detection period could be arranged for detection of a return light pulse that corresponds to the given emitted light pulse reflecting off an object located within the nominal detection range of the LIDAR to result in that corresponding return light pulse. The nominal detection range spans a minimum distance, $x_0$, to a maximum distance $x_m$, from the LIDAR. The minimum distance, $x_0$, may be 0 meters and maximum distance $x_m$, may be 60 meters, for example. In other instances, the minimum distance, $x_0$, may be a distance>0 m away from the LIDAR where object detection is unlikely or would not be an input in the maneuvering of the vehicle, for example. For example, if the LIDAR is mounted beneath an aircraft, $x_0$ may be 2 meters. Other distances are also contemplated.

In one embodiment, when the LIDAR device detects return light pulses, the computing system could generate a range hypothesis for each detected light pulse. Specifically, the computing system may determine, for each detected light pulse, a range hypothesis according to a time delay relative to an emission time of a most recently emitted light pulse. This range hypothesis may be referred to herein as the close range hypothesis or the default range hypothesis.

A light pulse that is reflected off an object positioned outside the nominal detection range would not be detected by the LIDAR device within the nominal detection period. In some cases, the LIDAR device may not detect such a light pulse if the light pulse's intensity is significantly attenuated before arriving at the LIDAR device, among other possibilities.

In some situations, however, the LIDAR device may nonetheless detect a light pulse that is reflected off an object positioned outside the nominal detection range. For example, the object at issue may be a retroreflective object (e.g., a large freeway road sign) positioned beyond the nominal detection range. When a light pulse reflects off a retroreflective object located beyond the nominal detection range, the return light pulse may be detected by the LIDAR device during a detection period after than the nominal detection period, giving rise to range aliasing or range ambiguity. In another example, the object at issue may be an object positioned closer to the LIDAR device than the nominal detection range's minimal distance. Consequently, in some scenarios, when a light pulse reflects off that closer object, the LIDAR device may detect that light pulse during a detection period before the nominal detection period, also giving rise to range aliasing.

To help with this problem, the computing system could apply a pseudo-random dither to respective emission timing of some, but not all, emitted light pulses, so as to respectively shift each such respective emission timing away from periodicity by a pseudo-random duration. With this arrangement, if the LIDAR device detects light pulses that reflected off object(s) positioned within the nominal detection range and the computing system generates a close range hypothesis based on these detections, the close range hypothesis could still resemble a known object and thus the computing system could still end up using this close range hypothesis for object detection. However, if the LIDAR device detects light pulses that reflected off object(s) positioned outside the nominal detection range and the computing system generates a close range hypothesis based on these detections, the close range hypothesis may not resemble a known object due to the above-mentioned pseudo-random shifts (e.g., the ranges of the close range hypothesis may be substantially different from one another). Therefore, the computing system could determine that the close range hypothesis is incorrect and may not use this close range hypothesis for that set of light pulses for object detection.

Although application of pseudo-random dither could allow the computing system to determine whether or not to use a close range hypothesis for object detection, it may still be unclear in various situations which range(s) to use as basis for object detection. For instance, when light pulses reflect off an object positioned outside the nominal detection range, the computing system could discount the close range hypothesis, but still may not determine the range(s) associated with that object, and thus may not detect that object even though detection of that object before it enters LIDAR's the nominal detection range may be useful.

In accordance with one exemplary embodiment of this disclosure, to help resolve range ambiguity, a computing system could operate a LIDAR device to emit light pulses in accordance with a time sequence that includes a time-varying dither, and, once return light pulses are detected, could generate and evaluate multiple range hypotheses. As such, disclosed are methods and systems for generating multiple range hypotheses and for using these range hypotheses for determining the appropriate or higher confidence or higher likelihood range(s) to use as basis for object detection.

In some examples, one of the range hypotheses could be a close range hypotheses, and the computing system could generate one or more alternate range hypotheses in addition to the close range hypothesis. In other examples, instead of generating a close range hypothesis, the computing system could generate two or more alternate range hypotheses.

Various alternate range hypotheses are possible. By way of example, for each detected light pulse, the computing system could determine a range based on the difference between the detection time and a time a light pulse was emitted prior to the last emitted light pulse. In this example, the alternate range hypothesis could be referred to as a far range hypothesis, as the determined range correspond to the possibility of an object being positioned beyond the maximum unambiguous detection range.

As such, when the computing system determines that the LIDAR device detected return light pulses during two or more detection periods, the computing system may determine (i) a first set of ranges in accordance with a time delay relative to corresponding emission times of a plurality of first emitted light pulses and (ii) a second set of ranges in accordance with a time delay relative to corresponding emission times of a plurality of second emitted light pulses.

Based on one or more factors, the computing system could then select between using the first set of ranges as a basis for object detection and using the second set of ranges as a basis for object detection. For example, the computing system may determine that the first set of ranges closely resembles a known object and that the second set of ranges does not resemble any known objects, and the system may responsively select the first set of ranges to be used as basis for object detection. In another example, the system may determine that the second set includes ranges that are substantially similar to one another and that the first set include ranges that are substantially different from one another, and the system may responsively select the second set of ranges to be used as basis for object detection.

In this way, the computing system may determine the appropriate ranges to use for basis for object detection, even when detected return light pulse(s) are light pulses that reflect off an object positioned outside the nominal detection range, and therefore correspond to light pulse(s) emitted prior to the most recently emitted light pulse, for example.

II. EXAMPLE ARRANGEMENT OF A LIDAR DEVICE

Referring now to the Figures, FIG. 1 is a simplified block diagram of a LIDAR device 100, according to an example embodiment. As shown, the LIDAR device 100 includes a power supply arrangement 102, electronics 104, light source(s) 106, at least one transmitter 108, at least one receiver 110, a rotating platform 112, actuator(s) 114, a stationary platform 116, a connector arrangement 118, a rotary link 120, and a housing 122. In other embodiments, the LIDAR device 100 may include more, fewer, or different components. Additionally, the components shown may be combined or divided in any number of ways.

Power supply arrangement 102 may be configured to supply power to various components of the LIDAR device 100. In particular, the power supply arrangement 102 may include or otherwise take the form of at least one power source disposed within the LIDAR device 100 and connected to various components of the LIDAR device 100 in any feasible manner, so as to supply power to those components. Additionally or alternatively, the power supply arrangement 102 may include or otherwise take the form of a power adapter or the like that is configured to receive power from one or more external power sources (e.g., from a power source arranged in a vehicle to which the LIDAR device 100 is coupled) and to supply that received power to various components of the LIDAR device 100 in any feasible manner. In either case, any type of power source may be used such as, for example, a battery.

Electronics 104 may include one or more electronic components and/or systems each arranged to help facilitate certain respective operations of the LIDAR device 100. In practice, these electronics 104 may be disposed within the LIDAR device 100 in any feasible manner. For instance, at least some of the electronics 104 may be disposed within a central cavity region of the rotary link 120. Nonetheless, the electronics 104 may include various types of electronic components and/or systems.

For example, the electronics 104 may include various wirings used for transfer of control signals from a computing system to various components of the LIDAR device 100 and/or for transfer of data from various components of the LIDAR device 100 to the computing system. Generally, the data that the computing system receives may include sensor data based on detections of light by the receiver 110, among other possibilities. Moreover, the control signals sent by the computing system may operate various components of the LIDAR device 100, such as by controlling emission of light by the transmitter 106, controlling detection of light by the receiver 110, and/or controlling the actuator(s) 114 to rotate the rotating platform 112, among other possibilities.

In some arrangements, the electronics 104 may also include a computing system. This computing system may have one or more processors, data storage, and program instructions stored on the data storage and executable by the one or more processor to facilitate various operations. With this arrangement, the computing system may thus be configured to carry operations described herein, such as those of methods described below. Additionally or alternatively, the computing system may communicate with an external computing system, control system, or the like (e.g., a computing system arranged in a vehicle to which the LIDAR device 100 is coupled) so as to help facilitate transfer of control signals and/or data between the external system and various components of the LIDAR device 100.

In other arrangements, however, the electronics 104 may not include a computing system. Rather, at least some of the above-mentioned wirings may be used for connectivity to an external computing system. With this arrangement, the wirings may help facilitate transfer of control signals and/or data between the external computing system and the various components of the LIDAR device 100. Other arrangements are possible as well.

Further, one or more light sources 106 can be configured to emit, respectively, a plurality of light beams and/or pulses having wavelengths within a wavelength range. The wavelength range could, for example, be in the ultraviolet, visible, and/or infrared portions of the electromagnetic spectrum. In some examples, the wavelength range can be a narrow wavelength range, such as provided by lasers.

In practice, one of the light sources 106 may be a laser diode configured to emit pulses of light. In particular, a laser diode may be a semiconductor device including a p-n junction with an active region in which oppositely polarized, energized charge carriers (e.g., free electrons and/or holes) recombine while current flows through the device across the p-n junction. The recombination results in emission of light due to a change in energy state of the charge carriers. When the active region is heavily populated by such energized pairs (e.g., the active region may have a population inversion of energized states), stimulated emission across the active region may produce a substantially coherent wave front of light that is then emitted from the laser diode. Recombination events, and the resulting light emission, occur in response to current flowing through the device, and so applying a pulse of current to the laser diode results in emission of a pulse of light from the laser diode.

As such, the present disclosure will be generally described herein in the context of a laser diode being used as the primary light source 106. In some arrangements, however, the one or more light sources 106 may additionally or alternatively include fiber lasers, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), and/or any other device configured to selectively transmit, reflect, and/or emit light to provide the plurality of emitted light beams and/or pulses.

Furthermore, transmitter 108 may be configured to emit light into an environment. In particular, the transmitter 108 may include an optical arrangement that is arranged to direct light from a light source 106 toward the environment. This optical arrangement may include any feasible combination of mirror(s) used to guide propagation of the light throughout physical space and/or lens(es) used to adjust certain characteristics of the light, among other optical components. For instance, the optical arrangement may include a transmit lens arranged to collimate the light, thereby resulting in light having rays that are substantially parallel to one another. Moreover, the lens may be shaped to spread or otherwise scatter light in a particular manner, such as by causing the vertical light spread of +7° away from a horizontal axis to −18° away from the horizontal axis (e.g., the horizontal axis ideally being parallel to a ground surface in the environment) for example.

As noted, the LIDAR device 100 may include at least one receiver 110. The receiver 110 may be respectively configured to at least detect light having wavelengths in the same wavelength range as the one of the light emitted from the transmitter 108. In doing so, the receiver 110 may detect light with a particular resolution. For example, the receiver 110 may be configured to detect light with a 0.036° (horizontal)×0.067° (vertical) angular resolution. Moreover, the receiver 110 may be configured to scan the environment with a particular FOV. For example, the receiver 110 may be arranged to focus incoming light within a range of +7° away from the above-mentioned horizontal axis to −18° away from the horizontal axis. In this way, the receiver 110 allows for detection of light along a range of +7° to −18°, which matches the above-mentioned exemplary vertical spread of emitted light that the transmitter 108 provides. It is noted that this resolution and FOV are described for exemplary purposes only and are not meant to be limiting.

In an example implementation, the receiver 110 may have an optical arrangement that allows the receiver 110 to provide the resolution and FOV as described above. Generally, such an optical arrangement may be arranged to provide an optical path between at least one optical lens and a photodetector array.

More specifically, the receiver 110 may include an optical lens arranged to focus light reflected from one or more objects in the environment of the LIDAR device 100 onto detectors of the receiver 110. To do so, the optical lens may have certain dimensions (e.g., approximately 10 cm×5 cm) as well as a certain focal length (e.g., approximately 35 cm). Moreover, the optical lens may be shaped so as to focus incoming light along a particular vertical FOV as described above (e.g., +7° to −18°). Such shaping of the first receiver's optical lens may take on one of various forms (e.g., spherical shaping) without departing from the scope of the present disclosure.

Furthermore, as noted, the receiver 110 may have a photodetector array, which may include two or more detectors each configured to convert detected light (e.g., in the above-mentioned wavelength range) into an electrical signal indicative of the detected light. In practice, such a photodetector array could be arranged in one of various ways. For example, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner. For example, the photodetector array may include a 13×16 array of detectors. It is noted that this photodetector array is described for exemplary purposes only and is not meant to be limiting.

Generally, the detectors of the array may take various forms. For example, the detectors may take the form of photodiodes, avalanche photodiodes (e.g., geiger mode and/or linear mode avalanche photodiodes), phototransistors, cameras, active pixel sensors (APS), charge coupled devices (CCD), cryogenic detectors, and/or any other sensor of light configured to receive focused light having wavelengths in the wavelength range of the emitted light. Other examples are possible as well.

Further, as noted, the LIDAR device 100 may include a rotating platform 112 that is configured to rotate about an axis. In order to rotate in this manner, one or more actuators 114 may actuate the rotating platform 112. In practice, these actuators 114 may include motors, pneumatic actuators, hydraulic pistons, and/or piezoelectric actuators, among other possibilities.

In an example implementation, the transmitter 108 and the receiver 110 may be arranged on the rotating platform 112 such that each of these components moves relative to the environment based on rotation of the rotating platform 112. In particular, each of these components could be rotated relative to an axis so that the LIDAR device 100 may obtain information from various directions. In this manner, the LIDAR device 100 may have a horizontal viewing direction that can be adjusted by actuating the rotating platform 112 to different directions.

With this arrangement, a computing system could direct an actuator 114 to rotate the rotating platform 112 in various ways so as to obtain information about the environment in various ways. In particular, the rotating platform 112 could rotate at various extents and in either direction. For example, the rotating platform 112 may carry out full revolutions such that the LIDAR device 100 provides a 360° horizontal FOV of the environment. Thus, given that the receiver 110 may rotate based on rotation of the rotating platform 112, the receiver 110 may have a horizontal FOV (e.g., 360° or less) and also a vertical FOV as described above.

Moreover, the rotating platform 112 could rotate at various rates so as to cause LIDAR device 100 to scan the environment at various refresh rates. For example, the LIDAR device 100 may be configured to have a refresh rate of 15 Hz (e.g., fifteen complete rotations of the LIDAR device 100 per second). In this example, assuming that the LIDAR device 100 is coupled to a vehicle as further described below, the scanning thus involves scanning a 360° FOV around the vehicle fifteen times every second. Other examples are also possible. For example, the rotating platform 112 could swivel the LIDAR device so that it scans back and forth within a smaller angle horizontal FOV.

Yet further, as noted, the LIDAR device 100 may include a stationary platform 116. In practice, the stationary platform 116 may take on any shape or form and may be configured for coupling to various structures, such as to a top of a vehicle for example. Also, the coupling of the stationary platform 116 may be carried out via any feasible connector arrangement 118 (e.g., bolts, screws, and/or adhesives). In this way, the LIDAR device 100 could be coupled to a structure so as to be used for various purposes, such as those described herein.

Furthermore, the LIDAR device 100 may also include a rotary link 120 that directly or indirectly couples the stationary platform 116 to the rotating platform 112. Specifically, the rotary link 120 may take on any shape, form and material that provides for rotation of the rotating platform 112 about an axis relative to the stationary platform 116. For instance, the rotary link 120 may take the form of a shaft or the like that rotates based on actuation from an actuator 114, thereby transferring mechanical forces from the actuator 114 to the rotating platform 112. Moreover, as noted, the rotary link 120 may have a central cavity in which electronics 104 and/or one or more other components of the LIDAR device 100 may be disposed. Other arrangements are possible as well.

Yet further, as noted, the LIDAR device 100 may include a housing 122. In practice, the housing 122 may take on any shape and form. For example, the housing 122 can be a dome-shaped housing, among other possibilities. Moreover, the housing 122 may be arranged in various ways relative to other components of the LIDAR device 100. It is noted that this housing is described for exemplary purposes only and is not meant to be limiting.

In an example implementation, the housing 122 may be coupled to the rotating platform 112 such that the housing 122 is configured to rotate about the above-mentioned axis based on rotation of the rotating platform 112. With this implementation, the transmitter 108, the receiver 110, and possibly other components of the LIDAR device 100 may each be disposed within the housing 122. In this manner, the transmitter 108 and the receiver 110 may rotate along with this housing 122 while being disposed within the housing 122.

Moreover, the housing 122 may have an aperture formed thereon, which could take on any feasible shape and size. In this regard, the transmitter 108 could be arranged within the housing 122 so as to emit light into the environment through the aperture. In this way, the transmitter 108 may rotate along with the aperture due to corresponding rotation of the housing 122, thereby allowing for emission of light into various directions. Also, the receiver 110 could be arranged within the housing 122 so as to detect light that enters the housing 122 from the environment through the aperture. In this way, the receiver 110 may rotate along with the aperture due to corresponding rotating of the housing 122, thereby allowing for detection of the light incoming from various directions along the horizontal FOV.

Yet further, the housing 122 may be composed of a material that is at least partially non-transparent, except for the aperture, which could be composed of a transparent material. In this way, light could propagate through the aperture, thereby allowing for scanning of the environment. But due to the housing 122 being at least partially non-transparent, the housing 122 may block at least some light from entering the interior space of the housing 122 and thus may help mitigate thermal effects. For instance, the housing 122 may block sun rays from entering the interior space of the housing 122, which may help avoid overheating of various components of the LIDAR device 100 due to those sun rays. Moreover, due to various components of the LIDAR device 100 being disposed within the housing 122 and due to the housing 122 rotating along with those components, the housing 122 may help protect those components from various environmental hazards, such as rain and/or snow, among others.

In other implementations, however, the housing 122 may be an exterior stationary housing that does not rotate with the LIDAR device 100. For example, the exterior stationary housing could be coupled to a vehicle and the LIDAR device could also be coupled to the vehicle while being configured to rotate within the exterior stationary housing. In this situation, the exterior stationary housing would likely be transparent so as to allow for propagation of light through the exterior stationary housing and thus for scanning of the environment by the LIDAR device 100. Moreover, the LIDAR device 100 may also include an aperture through which light may propagate and such an aperture may be on an interior housing of the LIDAR device 100, which may rotate within the exterior stationary housing along with other components of the LIDAR device 100. Other implementations are possible as well.

III. ILLUSTRATIVE IMPLEMENTATION OF THE LIDAR DEVICE

Figure 2A:
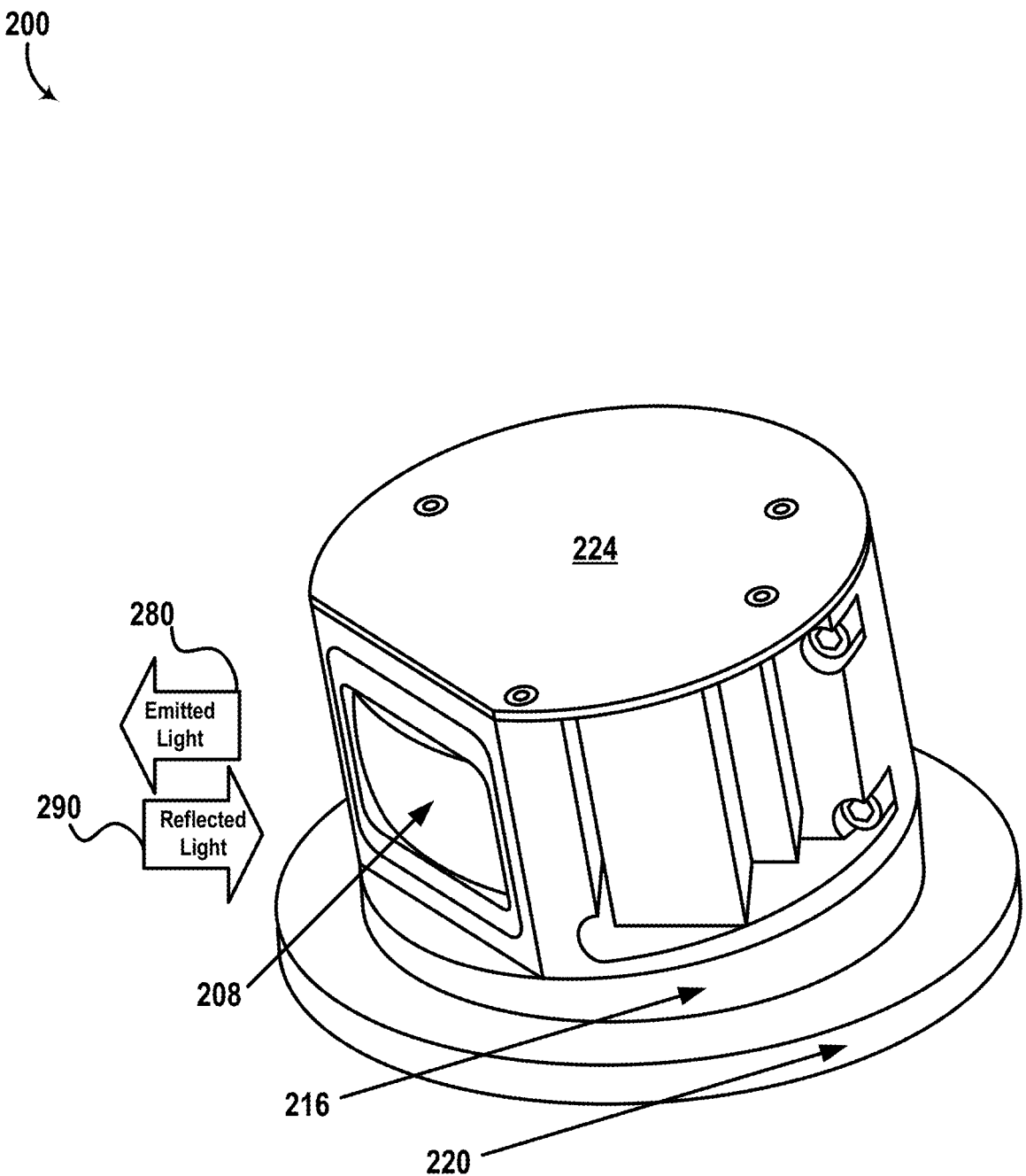
FIG. 2A illustrates a LIDAR device, according to an example embodiment.

FIG. 2A illustrates a LIDAR device 200, according to an example embodiment. LIDAR 200 may be similar to LIDAR 100. For example, as shown, LIDAR device 200 includes a lens 208, a rotating platform 216, a stationary platform 220, and a housing 224 which may be similar, respectively, to optical element 108, rotating platform 216, stationary platform 120, and housing 124. Additionally, as shown, light beams 280 emitted by LIDAR device 200 propagate from lens 108 along a pointing direction of LIDAR device 200 toward an environment of LIDAR device 200, and reflect off one or more objects in the environment as reflected light 290.

In some examples, housing 224 can be configured to have a substantially cylindrical shape and to rotate about an axis of LIDAR device 200. In one example, housing 224 can have a diameter of approximately 10 centimeters. Other examples are possible. In some examples, the axis of rotation of LIDAR device 200 is substantially vertical. For instance, by rotating housing 224 that includes the various components a three-dimensional map of a 360-degree view of the environment of LIDAR device 200 can be determined. Additionally or alternatively, in some examples, LIDAR device 200 can be configured to tilt the axis of rotation of housing 224 to control a field of view of LIDAR device 200. Thus, in some examples, rotating platform 216 may comprise a movable platform that may tilt in one or more directions to change the axis of rotation of LIDAR device 200.

In some examples, lens 208 can have an optical power to both collimate the emitted light beams 280, and focus the reflected light 290 from one or more objects in the environment of LIDAR device 200 onto detectors in LIDAR device 200. In one example, lens 208 has a focal length of approximately 120 mm. Other example focal lengths are possible. By using the same lens 208 to perform both of these functions, instead of a transmit lens for collimating and a receive lens for focusing, advantages with respect to size, cost, and/or complexity can be provided. Alternatively, LIDAR 200 may include separate transmit and receive lenses.

Figure 2B:
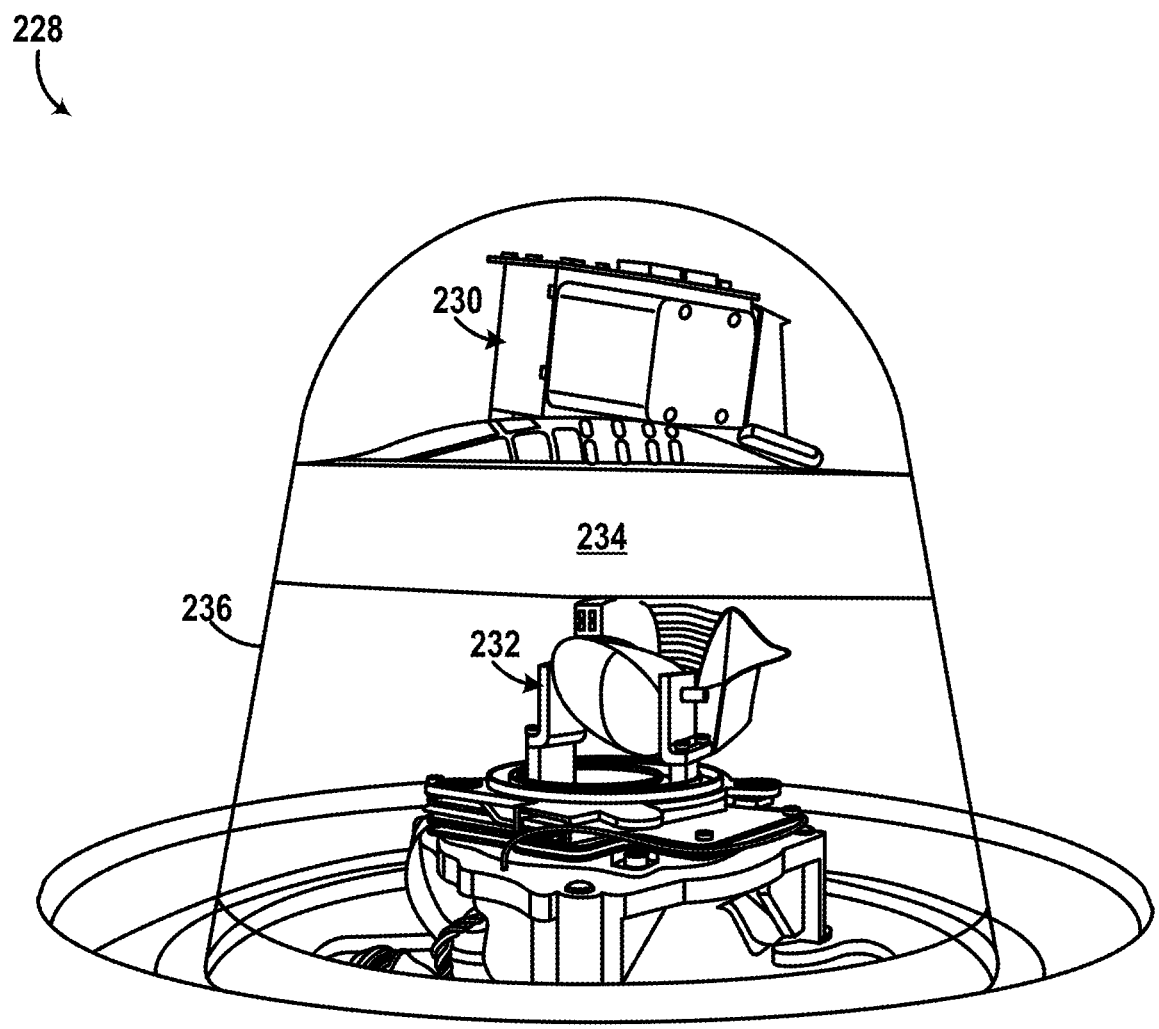
FIG. 2B illustrates another LIDAR system, according to an example embodiment.

FIG. 2B illustrates another possible implementation of a LIDAR system, according to an example embodiment. As shown, a LIDAR system 228 could include a first LIDAR 230, a second LIDAR 232, a dividing structure 234, and light filter 236.

In some examples, the first LIDAR 230 may be configured to scan an environment around a vehicle by rotating about an axis (e.g., vertical axis, etc.) continuously while emitting one or more light pulses and detecting reflected light pulses off objects in the environment of the vehicle, for example. In some embodiments, the first LIDAR 230 may be configured to repeatedly rotate about the axis to be able to scan the environment at a sufficiently high refresh rate to quickly detect motion of objects in the environment. For instance, the first LIDAR 230 may have a refresh rate of 10 Hz (e.g., ten complete rotations of the first LIDAR 230 per second), thereby scanning a 360-degree FOV around the vehicle ten times every second. Through this process, for instance, a 3D map of the surrounding environment may be determined based on data from the first LIDAR 230. In one embodiment, the first LIDAR 230 may include a plurality of light sources that emit 64 laser beams having a wavelength of 905 nm. In this embodiment, the 3D map determined based on the data from the first LIDAR 230 may have a 0.2° (horizontal)×0.3° (vertical) angular resolution, and the first LIDAR 230 may have a 360° (horizontal)×20° (vertical) FOV of the environment. In this embodiment, the 3D map may have sufficient resolution to detect or identify objects within a medium range of 100 meters from a vehicle, for example. However, other configurations (e.g., number of light sources, angular resolution, wavelength, range, etc.) are possible as well.

Unlike the first LIDAR 230, in some embodiments, the second LIDAR 232 may be configured to scan a narrower FOV of the environment around a vehicle. For instance, the second LIDAR 232 may be configured to rotate (horizontally) for less than a complete rotation about a similar axis. Further, in some examples, the second LIDAR 232 may have a lower refresh rate than the first LIDAR 230. Through this process, a vehicle may determine a 3D map of the narrower FOV of the environment using the data from the second LIDAR 232. The 3D map in this case may have a higher angular resolution than the corresponding 3D map determined based on the data from the first LIDAR 230, and may thus allow detection/identification of objects that are further than the medium range of distances of the first LIDAR 230, as well as identification of smaller objects within the medium range of distances. In one embodiment, the second LIDAR 232 may have a FOV of 8° (horizontal)× 15° (vertical), a refresh rate of 4 Hz, and may emit one narrow beam having a wavelength of 1550 nm. In this embodiment, the 3D map determined based on the data from the second LIDAR 232 may have an angular resolution of 0.1° (horizontal)×0.03° (vertical), thereby allowing detection/identification of objects within a range of around three hundred meters from a vehicle. However, other configurations (e.g., number of light sources, angular resolution, wavelength, range, etc.) are possible as well.

In some examples, a vehicle may be configured to adjust a viewing direction of the second LIDAR 232. For example, while the second LIDAR 232 has a narrow horizontal FOV (e.g., 8 degrees), the second LIDAR 232 may be mounted to a stepper motor (not shown) that allows adjusting the viewing direction of the second LIDAR 232 to pointing directions other than that shown in FIG. 1B. Thus, in some examples, the second LIDAR 232 may be steerable to scan the narrow FOV along any pointing direction from a vehicle.

The dividing structure 234 may be formed from any solid material suitable for supporting the first LIDAR 230 and/or optically isolating the first LIDAR 230 from the second LIDAR 232. Example materials may include metals, plastics, foam, among other possibilities.

The light filter 236 may be formed from any material that is substantially transparent to light having wavelengths with a wavelength range, and substantially opaque to light having wavelengths outside the wavelength range. For example, the light filter 236 may allow light having the first wavelength of the first LIDAR 230 (e.g., 905 nm) and the second wavelength of the second LIDAR 232 (e.g., 1550 nm) to propagate through the light filter 236. As shown, the light filter 236 is shaped to enclose the first LIDAR 230 and the second LIDAR 232. Thus, in some examples, the light filter 236 may also be configured to prevent environmental damage to the first LIDAR 230 and the second LIDAR 232, such as accumulation of dust or collision with airborne debris, among other possibilities. In some examples, the light filter 236 may be configured to reduce visible light propagating through the light filter 236. In turn, the light filter 236 may improve an aesthetic appearance of a vehicle by enclosing the first LIDAR 230 and the second LIDAR 232, while reducing visibility of the components of the sensor unit 228 from a perspective of an outside observer, for example. In other examples, the light filter 236 may be configured to allow visible light as well as the light from the first LIDAR 230 and the second LIDAR 232.

In some embodiments, portions of the light filter 236 may be configured to allow different wavelength ranges to propagate through the light filter 236. For example, an upper portion of the light filter 236 above the dividing structure 234 may be configured to allow propagation of light within a first wavelength range that includes the first wavelength of the first LIDAR 230. Further, for example, a lower portion of the light filter 236 below the dividing structure 234 may be configured to allow propagation of light within a second wavelength range that includes the second wavelength of the second LIDAR 232. In other embodiments, the wavelength range associated with the light filter 236 may include both the first wavelength of the first LIDAR 230 and the second wavelength of the second LIDAR 232.

FIGS. 3A to 3D next collectively illustrate implementation of a LIDAR device in a vehicle 300, specifically illustrating an implementation of the example LIDAR device 200 in the vehicle 300. Although vehicle 300 is illustrated as a car, other embodiments are possible. Furthermore, although the example vehicle 300 is shown as a vehicle that may be configured to operate in autonomous mode, the embodiments described herein are also applicable to vehicles that are not configured to operate autonomously. Thus, the example vehicle 300 is not meant to be limiting.

Figure 3A:
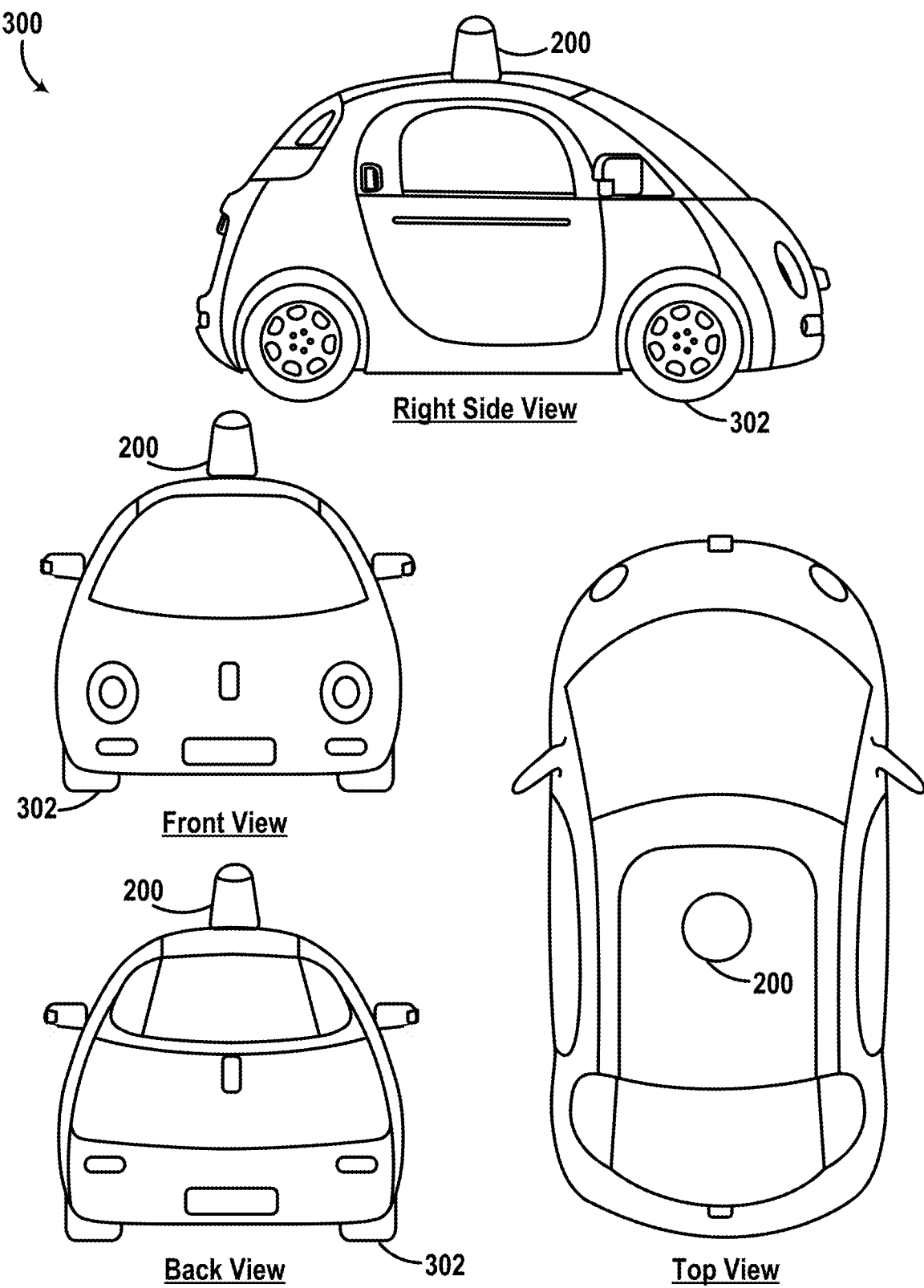
FIG. 3A shows several views of a LIDAR device being positioned on top of a vehicle, according to an example embodiment.

In particular, FIG. 3A shows a Right Side View, Front View, Back View, and Top View of the vehicle 300. As shown, the vehicle 300 includes the LIDAR device 200 being positioned on a top side of the vehicle 300 opposite a bottom side on which wheels 302 of the vehicle 300 are located. Although the LIDAR device 200 is shown and described as being positioned on the top side of the vehicle 300, the LIDAR device 200 could be positioned on any part feasible portion of the vehicle without departing from the scope of the present disclosure.

Figure 3B:
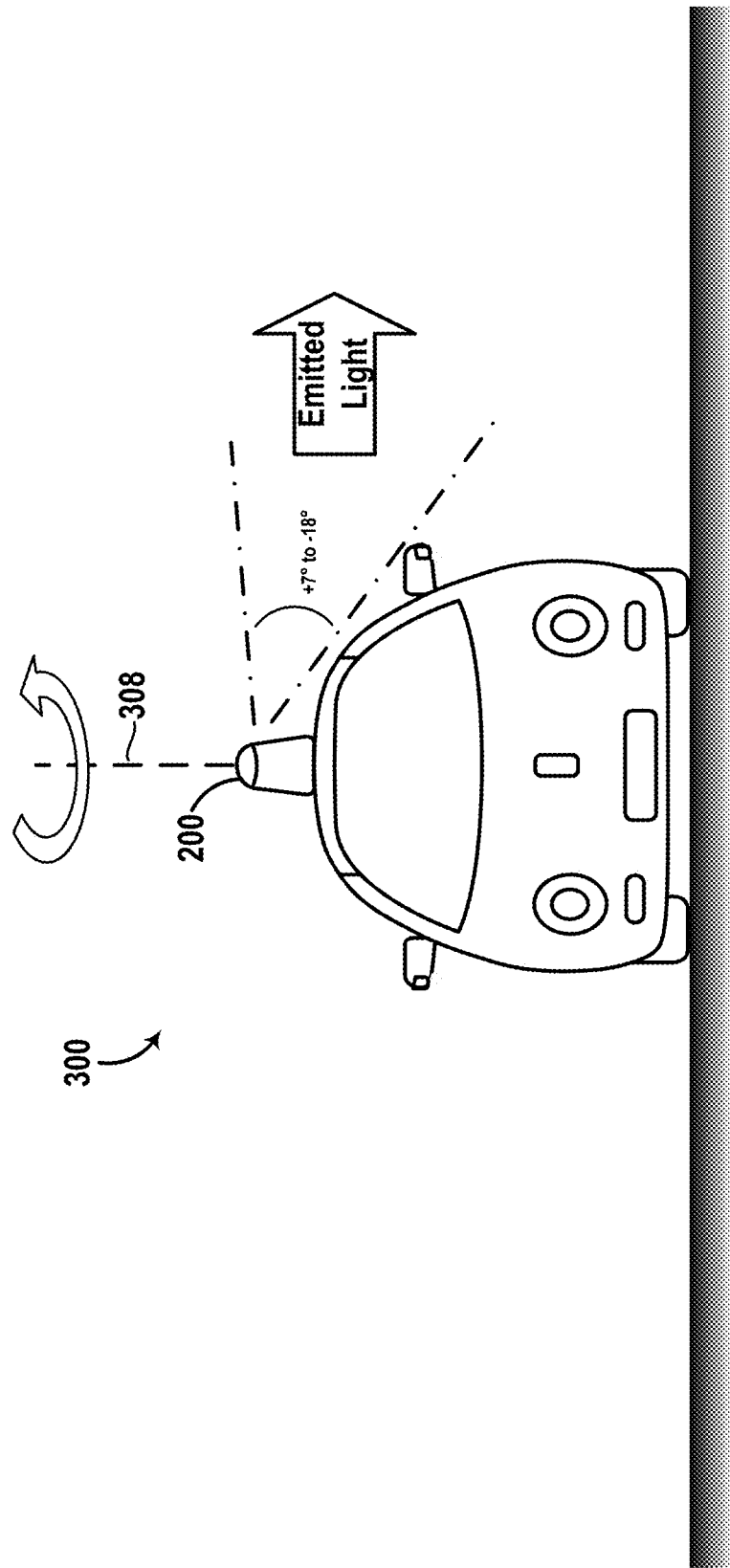
FIG. 3B shows emission of light by a LIDAR device positioned on top of the vehicle, according to an example embodiment.
Figure 3C:
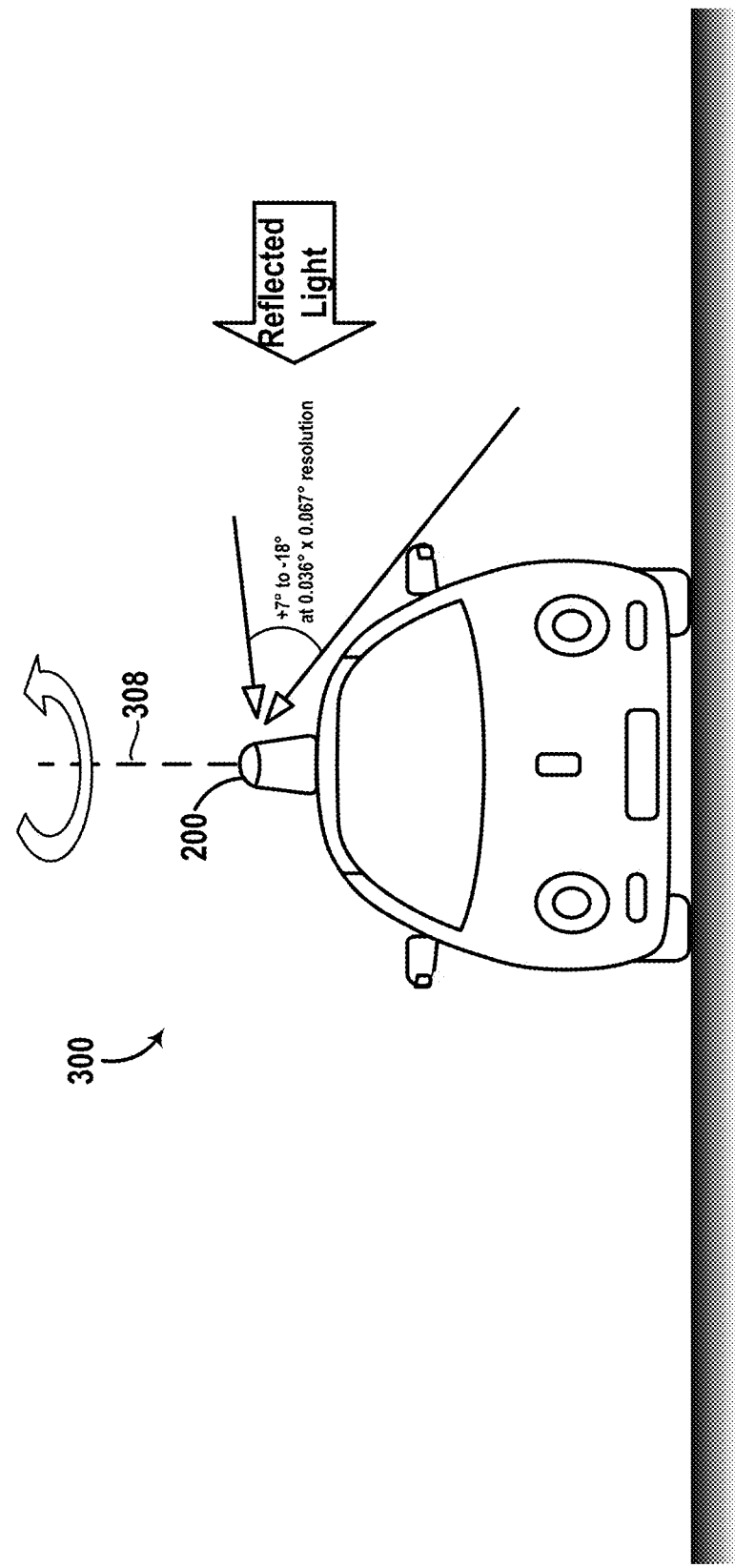
FIG. 3C shows detection of reflected light by a LIDAR device positioned on top of the vehicle, according to an example embodiment.

Moreover, FIGS. 3B to 3C next show that the LIDAR device 200 may be configured to scan an environment around the vehicle 300 (e.g., at a refresh rate of 15 Hz) by rotating about a vertical axis 308 while emitting one or more light pulses and detecting reflected light pulses off objects in the environment of the vehicle 300, for example.

More specifically, FIG. 3B shows that the LIDAR device 200 emits light with the above-mentioned vertical spread of +7° to −18°. In this way, the light emissions can be emitted toward regions of the environment that are relatively close to the vehicle 300 (e.g., a lane marker) and/or towards regions of the environment that are further away from the vehicle 300 (e.g., a road sign ahead of the vehicle).

Further, FIG. 3C shows that the LIDAR device 200 may detect reflected light with the above-mentioned vertical FOV of +7° to −18° and do so at a resolution of 0.036°×0.067°. In this way, the LIDAR device 200 may detect light reflected off regions of the environment that are relatively close to the vehicle 300 and/or light reflected off regions of the environment that are further away from the vehicle 300.

Figure 3D:
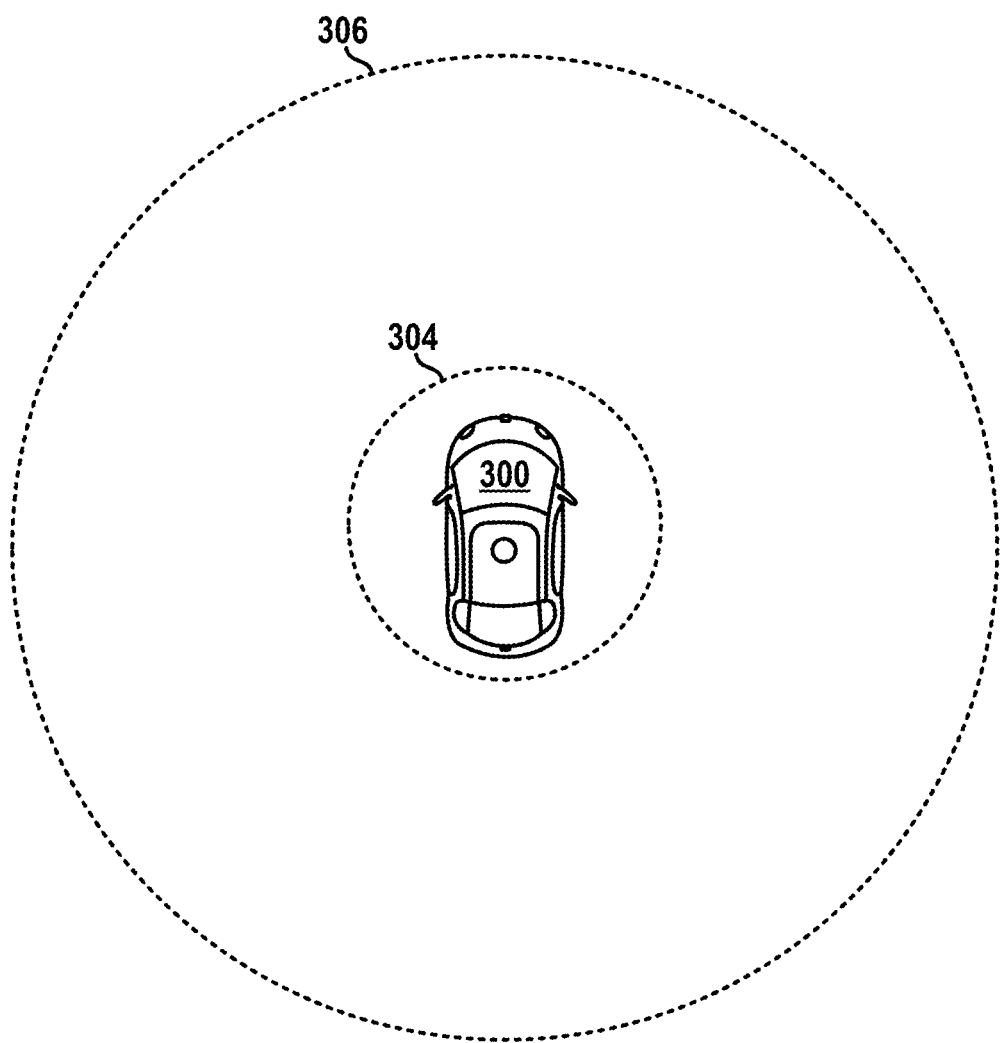
FIG. 3D shows a scanning range of a LIDAR device positioned on top of the vehicle, according to an example embodiment.

Generally, these detection distances are illustrated by way of example in FIG. 3D. In particular, FIG. 3D illustrates a top view of the vehicle 300 in the above-described scenario where the vehicle 300 uses the LIDAR device 200 for scanning a surrounding environment. Accordingly, the horizontal FOV of the LIDAR device 200 may span 360° in all directions around the vehicle 300.

As shown in FIG. 3D, the LIDAR device 200 may be suitable for detection and/or identification of objects within a range of distances to the vehicle 300. More specifically, objects outside of contour 304 and within a range of distances defined by the contour 306 may be properly detected/identified using the data from the LIDAR device 200. It is noted that these contours are not to scale but are illustrated as shown for convenience of description.

IV. NOMINAL DETECTION RANGE AND RANGE AMBIGUITY

Given that a LIDAR device may be suitable for detection of objects within a range of distances, the LIDAR device may have a nominal detection range that spans from a minimum detection range to a maximum unambiguous detection range. For a given detection period of the LIDAR device, the maximum unambiguous detection range may define the greatest distance at which an object can be positioned away from the LIDAR device and be detected by the LIDAR device within a designated detection period, e.g., the nominal detection period. Signals reflected from objects past the maximum unambiguous detection range may be too attenuated to be reliably detected. The minimum detection range may define the minimum distance at which an object should be positioned away from the LIDAR device in order to be detected by the LIDAR device within the designated detection period. Signals reflected from objects closer than the minimum distance may return to the LIDAR device before the designated detection period begins.

More specifically, a computing system may operate the LIDAR device to emit and detect light pulses in accordance with certain timing. For example, the computing system may operate the LIDAR device to emit light pulses at emission times in accordance with an emission time sequence, which could be predefined or pseudo-random. This emission time sequence may then establish a detection time sequence according to which the LIDAR device detects return light pulses.

For instance, once the computing system operates the LIDAR device to emit a given light pulse, a corresponding detection period for the given light pulse may begin immediately following or at some time after emission of that given light pulse, and may end before or after emission of a subsequent light pulse, among other options. During this corresponding detection period, the LIDAR device could then detect a given return light pulse that corresponds to the given emitted light pulse, such as when the given emitted light pulse reflects off an object within the nominal detection range to result in that return light pulse. After the LIDAR device detects the given return light pulse, the computing system could then determine a specific range associated with the given return light pulse according to a time delay relative to the emission time of the given emitted light pulse.

As discussed above, a detection period may establish a nominal detection range that spans from a minimum detection range to a maximum unambiguous detection range.

In particular, the time difference between the emission time of a light pulse and the end time of the detection period may correspond to a maximum time delay that a return light pulse from that emitted light pulse could have in order to still be detected by the LIDAR device during the detection period. For instance, if a detection period begins 1 nanosecond after emission of a light pulse and ends 400 nanoseconds (ns) after emission of that light pulse, in order for a return light pulse from that emitted light pulse to be detected by the LIDAR device during the nominal detection period, this light pulse should return to the LIDAR device within 400 ns. Further, because a computing system could determine a distance to an object according to a time delay between an emitted light pulse and detection of a reflected returning light pulse, the maximum time delay may establish the greatest distance at which an object could be positioned away from the LIDAR device, such that the LIDAR device could still detect during the detection period a light pulse that reflected off this object and then returned to the LIDAR. Generally, this greatest distance may define the maximum unambiguous detection range for the emitted light pulse.

Additionally, the time difference between emission time of a light pulse and the start time of the detection period may correspond to a minimum time delay that a return light pulse should have in order to be detected by the LIDAR device during the nominal detection period. For instance, if a detection period starts 50 nanoseconds (ns) after emission of a light pulse, in order for a return light pulse to be detected by the LIDAR device during that detection period after the light pulse is emitted by the LIDAR device, this light pulse may have to return to the LIDAR device after no less than 50 ns. Further, because a computing system could determine a distance to an object according to a time delay between an emitted light pulse and detection of a reflected returning light pulse, the minimum time delay may establish the minimum distance at which an object should be positioned away from the LIDAR device, such that the LIDAR device could still detect during the detection period a light pulse that reflected off this object and then returned to the LIDAR. Generally, this minimum distance may define the minimum detection range for the detection period.

In some cases, different detection periods could have different respective nominal detection ranges. For example, as the duration of a detection period increases, a maximum detection range for the detection period may increase, and vice versa. Thus, detection periods that are of longer durations may have greater respective maximum unambiguous detection ranges and detection periods that are of shorter durations may have smaller respective maximum unambiguous detection ranges.

Given this, in another aspect, a nominal detection range could define the distances at which an object can be positioned away from the LIDAR device and be reliably detected by the LIDAR device when taking all detection periods of the LIDAR device into consideration. In particular, if a LIDAR device is operated such that each detection period is the same, that detection period may establish a nominal detection range of the LIDAR device. But if a LIDAR device is operated such that some or all detection periods are different compared to one another, then the detection period that provides for the greatest maximum time delay may establish a maximum detection range of the LIDAR device, and the detection period that provides for the smallest minimum time delay may establish a minimum detection range of the LIDAR device.

With this arrangement, if a light pulse is reflected off an object positioned outside the nominal detection range, a computing system may not determine a distance associated with that light pulse or could determine an incorrect distance associated with that light pulse.

By way of example, in many situations, if a light pulse is reflected off an object positioned beyond a maximum unambiguous detection range, the LIDAR device may not detect such a light pulse, as this light pulse may experience a significant attenuation in its intensity before arriving at the LIDAR device. In some situations, however, the LIDAR device may nonetheless detect that returning light pulse. For instance, the object positioned beyond the maximum unambiguous detection range may be a retroreflective object, such as a large road sign located beyond the maximum unambiguous detection range. A return light pulse that has reflected off such a retroreflective object may be detected by the LIDAR device during a subsequent detection period. As a result, without range aliasing resilience, the computing system may erroneously determine the retroreflective object is closer than it physically is from the LIDAR in calculating the distance the light traveled based on the emission time of a later emitted pulse because it was not expected to receive an un-attenuated return signal from an object located past the maximum unambiguous detection range.

In another example, in some situations, if a light pulse is reflected off an object positioned closer than a minimum detection range, the LIDAR device may or may not detect such a light pulse. But if the LIDAR device does detect such a light pulse, that light pulse may arrive at the LIDAR device before start of the detection period, and thus the LIDAR device may not detect that light pulse in the detection period associated with that light pulse. As a result, the computing system may not determine a distance associated with this light pulse according to a time delay relative to an emission time of that light pulse.

Figure 4A:
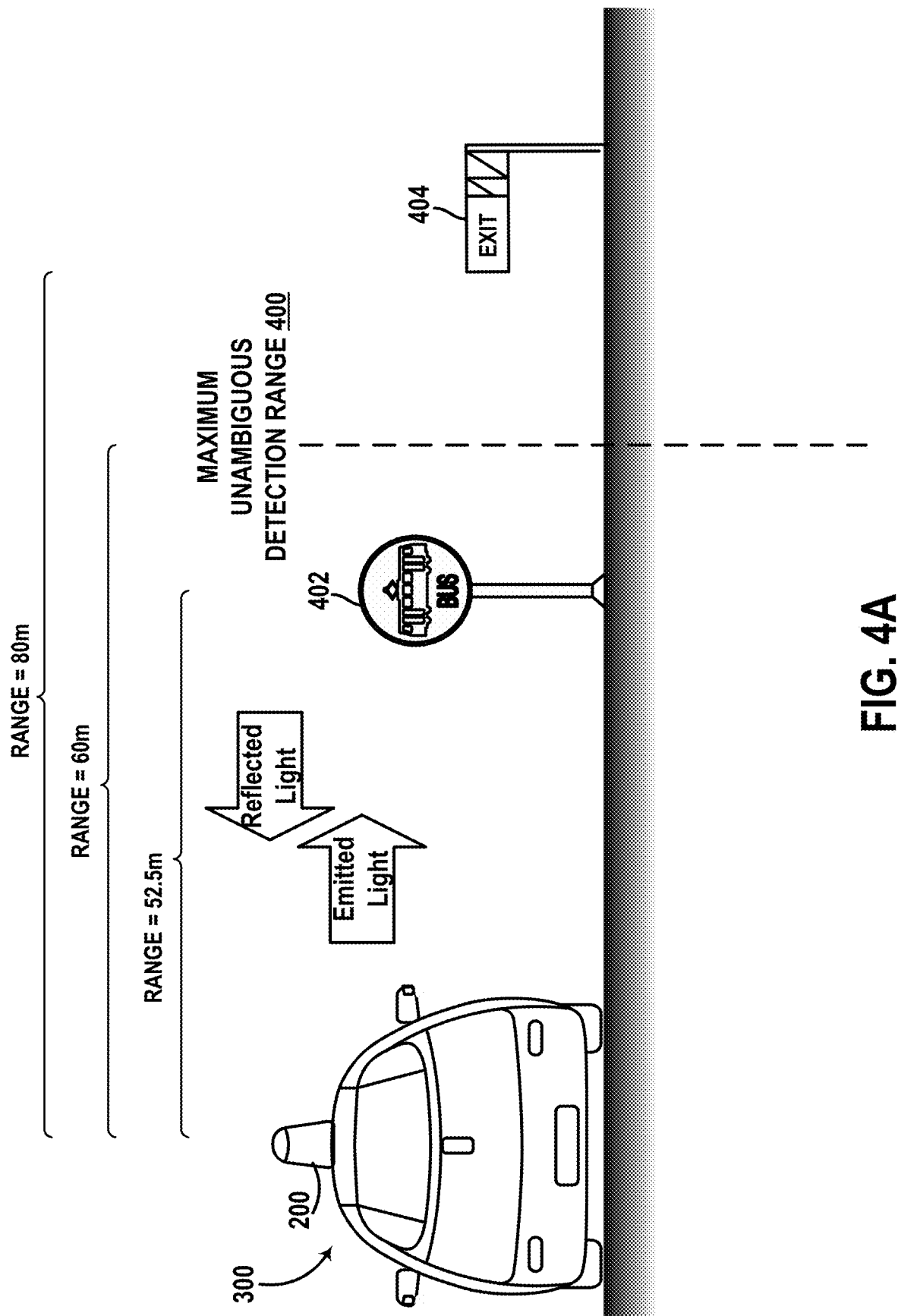
FIG. 4A shows a nominal unambiguous detection range of a LIDAR device positioned on top of the vehicle, according to an example embodiment.
Figure 4B:
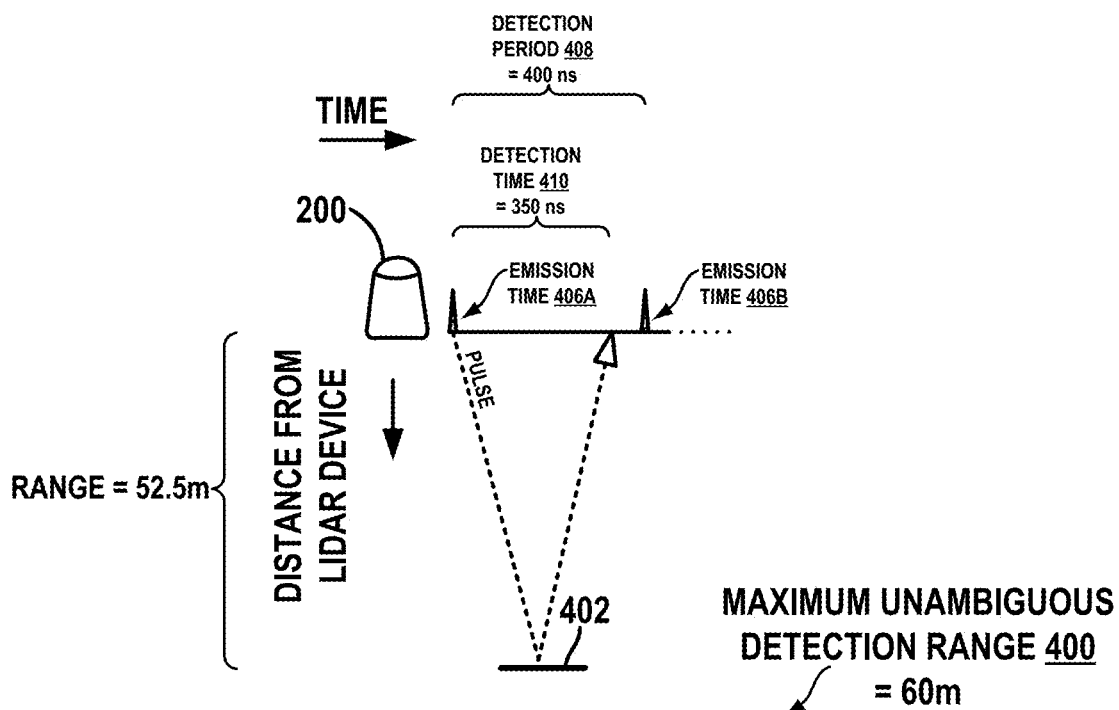
FIG. 4B shows a pulse reflected off an object positioned within a nominal unambiguous detection range of a LIDAR device, according to an example embodiment.
Figure 4C:
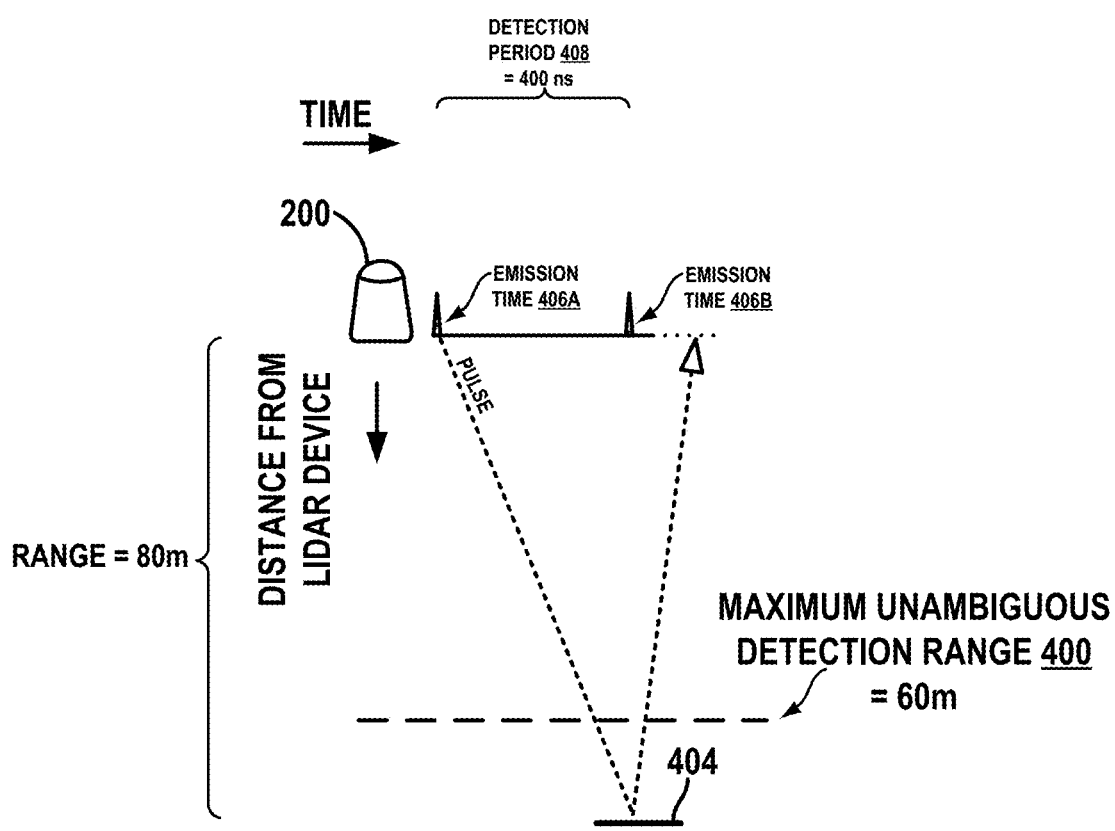
FIG. 4C shows a pulse reflected off an object positioned outside a nominal unambiguous detection range of a LIDAR device, according to an example embodiment.

FIGS. 4A-4C illustrate a nominal detection range of the LIDAR device 200. In particular, FIGS. 4A-4C show that the LIDAR device 200 may have a nominal detection range that spans from a minimum detection range of 0 meters to a maximum unambiguous detection range 400 of 60 meters (60 m). In this example, this maximum unambiguous detection range 400 is established by the detection period 408 that starts following an emission time 406A of a light pulse and ends at a subsequent emission time 406B of a subsequent light pulse. As shown, the detection period 408 has a duration of 400 ns, which leads to the maximum unambiguous detection range 400 to be at approximately 60 m away from the LIDAR device 200 (maximum unambiguous detection range*2=speed of pulse*detection period=~299,792, 458 m/s*400 ns).

Further, FIGS. 4A-4C illustrate that a nearby object 402 (e.g., a nearby road sign) could be positioned within the maximum unambiguous detection range 400 and that a distant object 404 (e.g., a retroreflective "freeway entrance" road sign) could be positioned outside of the maximum detection range 400. In this regard, FIG. 4B shows that a pulse reflected off the nearby object 402 would return to the LIDAR device 200 before the end of the detection period 408 and would do so at a detection time 410 of 350 ns after the emission time 406A. This detection time 410 corresponds to a range of 52.5 m, which is the distance at which the nearby object 402 is positioned away from the LIDAR device 200. In contrast, distant object 404 is positioned at a distance of 80 m away from the LIDAR device 200, which is a distance that exceeds the maximum detection range 400 of 60 m. Therefore, as shown in FIG. 4C, a pulse reflected off the distant object 404 would return to the LIDAR device 200 after the end of the detection period 408 and thus would not be detected by the LIDAR device 200 during that detection period 408. Other illustrations are possible as well.

When an emitted light pulse is reflected off a retroreflective object positioned beyond the maximum unambiguous detection range, the LIDAR device may detect this light pulse at a time after the device has stopped listening for return signal from that emitted light pulse and instead during a time the device is listening for return signals from a subsequently emitted light pulse, which may lead to range aliasing, thereby leading to false object detection, among other outcomes.

Figure 5A:
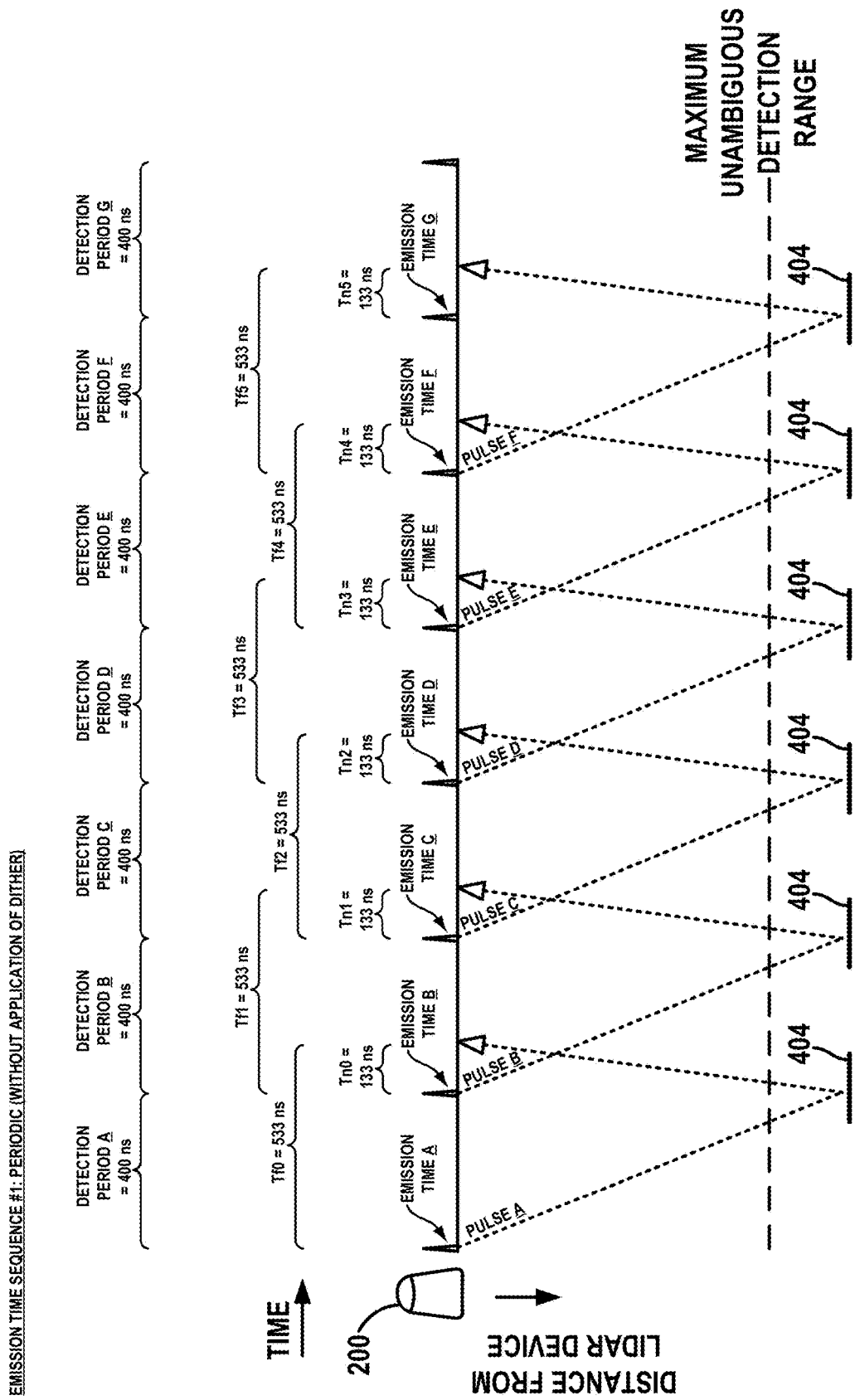
FIG. 5A shows a first emission time sequence that does not include application of dither and also shows multiple possible detection times for each of a plurality of detected return lights pulses, according to an example embodiment.
Figure 5B:
FIG. 5B shows range ambiguity with respect to the first emission time sequence, according to an example embodiment.

FIGS. 5A to 5B illustrate an example detection of return light pulses.

In particular, FIG. 5A shows light pulses A-F emitted respectively at emission times A-F in accordance with a periodic emission time sequence #1 that does not include application of dither. These periodic emission times establish detection periods A-F each of the same 400 ns duration. As shown, light pulses A-F each reflect off the distant object 404 and, as a result, are each respectively detected during a subsequent detection period.

Generally, the computing system could determine candidate ranges associated with detected light pulses A-F without accounting for the possibility of large retroreflective objects located outside the maximum unambiguous detection range. For instance, the computing system may determine that the LIDAR device 200 detected light pulse A at a detection time Tn0 of 133 ns relative to emission time B, which corresponds to a range of 20 m as shown in FIG. 5B. And as indicated by detection times Tn1 to Tn5, a similar approach could be used for determining ranges associated with light pulses B-F, thereby resulting in first ranges 502 corresponding to a close range hypothesis of an object being positioned at 20 m away from the LIDAR device 200.

Given this, the computing system determines ranges 502 that are the same as one another and, as a result, could determine that these ranges 502 should be used as basis for object detection. However, this close range hypothesis is inaccurate, as light pulses A-F in fact reflected off the distant object 404 that is positioned beyond the maximum unambiguous detection range of the LIDAR device 200. Thus, use of this close range hypothesis for object detection could lead to a false detection of a nearby object.

In one embodiment, the computing system may determine that the LIDAR device 200 detected light pulse A at a detection time Tf0 of 533 ns relative to emission time A, which corresponds to a range of 80 m as shown in FIG. 5B. And as indicated by detection times Tf1 to Tf5, a similar approach could be used for determining ranges associated with light pulses B-F, thereby resulting in second ranges 504 corresponding to a far range hypothesis of an object being positioned at 80 m away from the LIDAR device 200. This far range hypothesis is accurate, as light pulses A-F in fact reflected off the distant object 404 that is positioned beyond the maximum detection range of the LIDAR device 200.

In some instances, although this far range hypothesis is accurate, the computing system may be unable to disambiguate between the close and far hypothesis if a time-varying dither is not also applied. Specifically, the computing system may determine a close range hypothesis including that ranges 502 are the same as one another and that this indicates an object is positioned at 20 m away from the LIDAR device 200. Additionally, the computing system may determine a far range hypothesis including that ranges 504 are the same as one another and that this indicates an object is positioned at 80 m away from the LIDAR device 200. As a result, the computing system may determine that an object could be positioned at 20 m away from the LIDAR device 200 or at 80 m away from the LIDAR device 200, but may be unable to determine which of these determinations is in fact accurate without additional information, thereby leading to range ambiguity. Additional information that may allow the computing system to disambiguate between the two ranges could include information that the detected object is likely or unlikely to be of a size that would be detected at the farther distance. For example, if the object is shaped like a sign, it may be possible the object is farther away. If the object is shaped like a small animal, it may be unlikely. Other illustrations are also possible.

V. USING MULTIPLE RANGE HYPOTHESES AND APPLICATION OF TIME-VARYING DITHER TO OVERCOME RANGE AMBIGUITY

Figure 6:
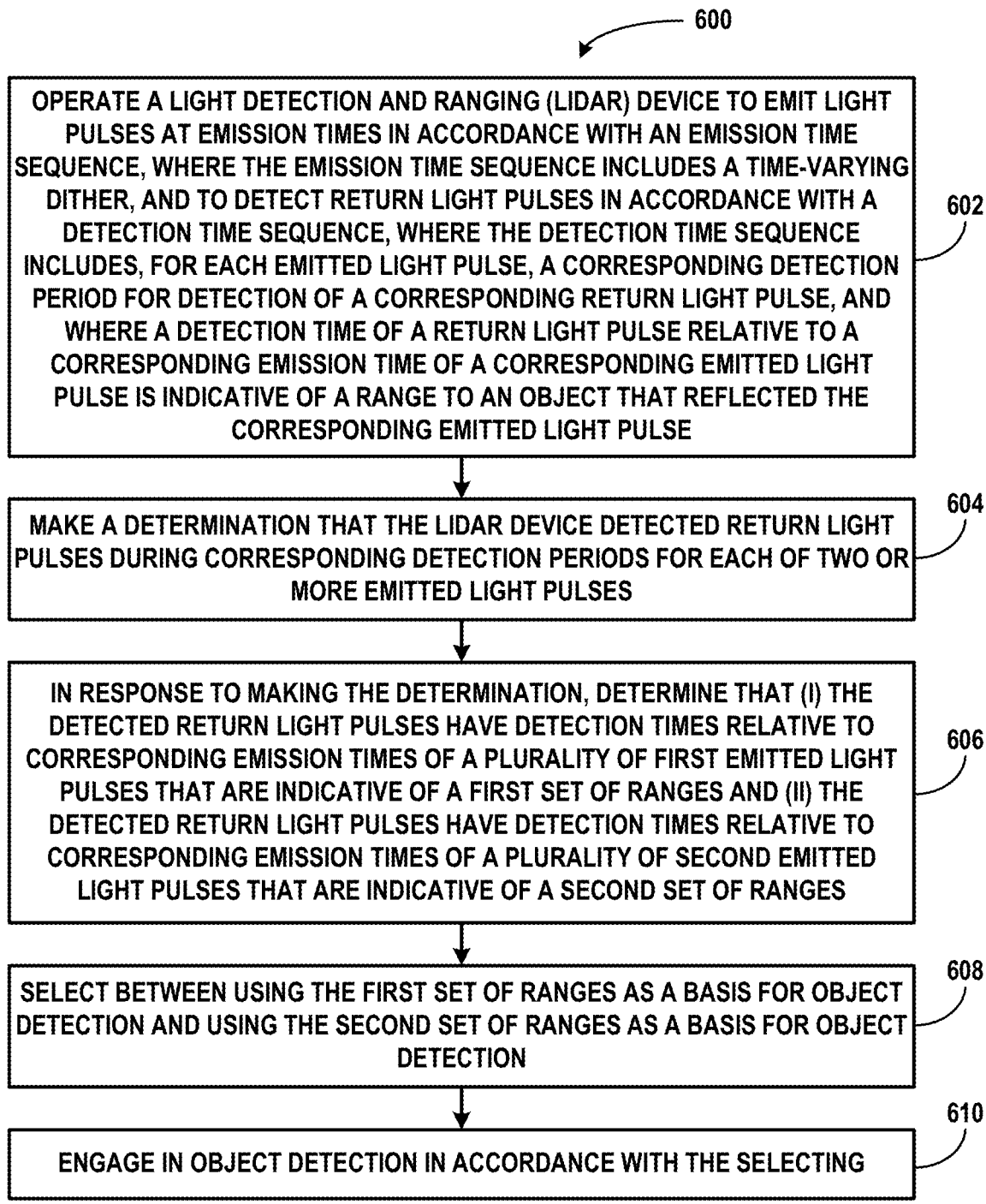
FIG. 6 is a flowchart illustrating a method for disambiguating between ranges associates with detected return light pulses, according to an example embodiment.

FIG. 6 is a flowchart illustrating a method 600, according to an example implementation. In particular, method 600 may be implemented to help resolve range ambiguity encountered in one or more of various situations.

Method 600 shown in FIG. 6 (and other processes and methods disclosed herein) presents a method that can be implemented within an arrangement involving, for example, the LIDAR device 100 of FIG. 1, vehicle 300 shown in FIGS. 3A-3D, and/or vehicle 1700 shown in FIG. 17 and further described below (or more particularly by one or more components or subsystems thereof, such as by a processor and a non-transitory computer-readable medium having instructions that are executable to cause the device to perform functions described herein). Additionally or alternatively, method 600 may be implemented within any other arrangements and systems.

Method 600 and other processes and methods disclosed herein may include one or more operations, functions, or actions as illustrated by one or more of blocks 602-610. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 involves operating a LIDAR device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse.

As noted, a computing system could operate a LIDAR device to emit and detect light pulses in accordance with certain timing.

For instance, the computing system could operate the LIDAR device to emit light pulses in accordance with an emission time sequence that includes application of a time-varying dither. In practice, application of dither may involve pseudo-random deviation of a periodic signal away from periodicity, such as by application of noise to the signal, among other possibilities. In this regard, the computing system may apply pseudo-random dither to respective emission timing of some, but not all, emitted light pulses, so as to respectively shift each such respective emission timing away from periodicity by a pseudo-random duration. With this implementation, as noted, due to the shifts in periodicity, the computing system could potentially discount an incorrect close range hypothesis.

Furthermore, the emission time sequence may help establish a detection time sequence according to which the LIDAR device detects return light pulses. Generally, this detection time sequence may include a corresponding detection period respectively for each emitted light. In particular, a corresponding detection period for a given light pulse may begin immediately following or at some time after emission of that given light pulse, and may end before or after emission a subsequent light pulse. During this corresponding detection period, the LIDAR device could detect a given return light pulse that corresponds to the given emitted light pulse, such as when the given emitted light pulse reflects off an object to result in that return light pulse. After the LIDAR device detects the given return light pulse at a certain detection time, the computing system could then determine a range to an object that reflected the given emitted light pulse. As discussed, the computing system could determine this range according to a time delay between the detection time of the given return light pulse and the emission time of the given emitted light pulse.

At block 604, method 600 involves making a determination that the LIDAR device detected return light pulses during corresponding detection periods for each of two or more emitted light pulses.

Generally, a computing system could make a determination that the LIDAR device detected one or more return light pulses respectively during each of two or more detection periods. For instance, a plurality of emitted light pulses could each respectively have a corresponding detection period. For each such corresponding detection period, the computing system could determine that the LIDAR device detected one or more return light pulses. In practice, some or all of these light pulses could be light pulses that reflected off object(s) positioned outside a nominal detection range of the LIDAR device. Additionally or alternatively, some or all of these light pulses could be light pulses that reflected off nearby object(s) positioned within the nominal detection range.

At block 606, method 600 involves, in response to making the determination, determining that (i) the detected return light pulses have detection times relative to corresponding emission times of a plurality of first emitted light pulses that are indicative of a first set of ranges and (ii) the detected return light pulses have detection times relative to corresponding emission times of a plurality of second emitted light pulses that are indicative of a second set of ranges.

Once the computing system determines that the LIDAR device detected several return light pulses, the computing system may responsively generate two or more range hypotheses for these detected return light pulses, at least one of which would be an alternate range hypothesis. For example, the computing system could generate a close range hypothesis and one or more alternate range hypotheses. In another example, the computing system could generate two or more alternate range hypotheses. Other examples are also possible.

When generating a close range hypothesis, the computing system may determine a range respectively for each detected return light pulse according to a time delay relative to an emission time of a most recently emitted light pulse. As discussed, for a given return light pulse detected during a given detection period, the most recently emitted light pulse may be the one that corresponds to the given detection period during which the given return light pulse was detected. For example, in FIG. 5A, for the return light pulse A detected during detection period B, the most recently emitted light pulse is pulse B which corresponds to the detection period B during which the return light pulse A was detected. As such, the computing system generates a close range hypothesis to determine whether or not the detected return light pulses reflected off a nearby object positioned within the nominal detection range of the LIDAR device. In this example, the computing system, e.g., part of or coupled to device 200, generates a close range hypothesis that the detected light pulse A was emitted at the time light pulse B was emitted, reflected off an object positioned within the LIDAR devices' nominal detection range, and therefore returned within detection period B as it did.

Further, when generating an alternate range hypothesis, the alternate range hypothesis could be a far range hypothesis or could be a "proximate" range hypothesis.

Specifically, the computing system may generate a far range hypothesis that the detected return light pulses reflected off a distant object positioned beyond the maximum unambiguous detection range of the LIDAR device. When generating a far range hypothesis, the computing system may determine a range respectively for each detected return light pulse according to a time delay relative to an emission time of a previously emitted light pulse. In one case, for a given return light pulse detected during a given detection period having a corresponding emitted light pulse, the previously emitted light pulse may be one that immediately precedes in time the emitted light pulse corresponding to the given detection period. In other cases, however, the previously emitted light pulse may be a two times previous light pulse or a three times previous light pulse, and so on.

The computing system may generate a proximate range hypothesis that the detected return light pulses reflected off a proximate object positioned closer than the minimum detection range of the LIDAR device. For example, consider an embodiment in which at time t0, a light pulse P0 is emitted, and at a time t1, the LIDAR begins to watch for reflections of P0's light. Further, at at time t2, a light pulse P1 is emitted, while the LIDAR continues to watching for reflections of P0's light. Then, at a time t3, the LIDAR stops watching for reflections of P0's light, and begins to watch for reflections of P1's light. In this example, if an unexpected object is located closer than the minimum detection range of the LIDAR device, it may reflect back P1's light before t3. In one an embodiment, the computing system may generate a proximate range hypothesis that determines the range of the object that reflected P1's light based on the emission time of P1, even though the reflection was received during the period in which the LIDAR was watching for reflections of P0, e.g., because the system is aware that there is an offset before detection periods begin and an overlap between detection periods and emissions. Accordingly, when generating a proximate range hypothesis, the computing system may determine a range respectively for each detected return light pulse according to a time delay relative to an emission time of a subsequently emitted light pulse. This subsequently emitted light pulse may be an emitted light pulse that corresponds to a detection period following the one during which a given light pulse was detected.

As such, for instance, the computing system may determine (i) a first set of ranges in accordance with a time delay relative to corresponding emission times of a plurality of first emitted light pulses and (ii) a second set of ranges in accordance with a time delay relative to corresponding emission times of a plurality of second emitted light pulses. The first set of ranges may correspond to a close range hypotheses and the second set ranges may correspond to an alternate range hypothesis. Alternatively, the first set may correspond to an alternate range hypotheses and the second set may correspond to a close range hypothesis, or the first set may correspond to a first alternate range hypotheses and the second set may correspond to a second alternate range hypothesis. Other combinations of range hypotheses are possible as well. In any case, the first and second emitted pulses may be different from one another, as at least one of the second emitted pulses would be different from each of the plurality of first emitted pulses.

At block 608, method 600 involves selecting between using the first set of ranges as a basis for object detection and using the second set of ranges as a basis for object detection. And at block 610, method 600 involves engaging in object detection in accordance with the selecting.

Once the computing system generates two or more range hypotheses for the detected return light pulses, the computing system may then determine which one of these range hypotheses is correct and thus which ranges should be used as a basis for object detection. In accordance with the present disclosure, the computing system could do so based on comparison to known object(s) and/or based on consideration of similarity of ranges in a given hypothesis, among other possibilities.

In one example, the computing system may determine that the first set of ranges closely resembles a known object and/or that the second set of ranges does not resemble any known objects, and the system may responsively select the first set of ranges to be used as basis for object detection. Alternatively, the computing system may determine that the second set of ranges closely resembles a known object and/or that the first set of ranges does not resemble any known objects, and the system may responsively select the second set of ranges to be used as basis for object detection.

In this example, the computing system could determine whether or not a set of ranges is representative of one or more known objects, such as based on object recognition techniques. For instance, the computing system could have stored on or otherwise have access to a plurality of point clouds each respectively indicative of a known object (e.g., road sign(s)). Therefore, the computing system could assemble a point cloud based on a particular set of ranges, and could then determine whether or not this assembled point cloud matches at least one of the plurality of point clouds. If the assembled point cloud substantially matches at least one of the plurality of point clouds, then the computing system may determine that the particular set of ranges is representative of at least one known object. Otherwise, the computing system may determine that the particular set of ranges is not representative of at least one known object.

In another example, the computing system may determine that the first set includes ranges that are substantially similar to one another and/or that the second set includes ranges that are substantially different from one another, and the system may responsively select the first set of ranges to be used as basis for object detection. Alternatively, the computing system may determine that the second set includes ranges that are substantially similar to one another and/or that the first set includes ranges that are substantially different from one another, and the system may responsively select the second set of ranges to be used as basis for object detection.

In this example, the computing system could determine whether or not ranges in a set are substantially similar to one another. For instance, if the computing system determines that ranges of a set substantially match one another (e.g., within a threshold tolerance), then the computing system may responsively determine that ranges of the set are substantially similar to one another. Otherwise, the computing system may responsively determine that ranges of the set are not substantially similar to one another. In another instance, the computing system may determine whether or not a difference between the smallest range in the set and the greatest range in the set exceeds a threshold difference (e.g., established via additional engineering input). If the computing system determines that this difference exceeds the threshold difference, then then computing system may responsively determine that ranges of the set are not substantially similar to one another. But if the computing system determines that this difference does not exceeds the threshold difference, then the computing system may responsively determine that ranges of the set are substantially similar to one another. Other instances and examples are also possible.

In a situation in which the return light pulses are detected during corresponding detection periods for each of the plurality of first emitted light pulses and thus in which the first set corresponds to a close range hypothesis, the set of ranges that the computing system ends up selecting may indicate whether the detected return light pulses reflected off nearby object(s) or whether the detected return light pulses reflected off distant and/or proximate object(s) positioned outside the nominal detection range of the LIDAR device.

In particular, if the computing system selects use of the first set of ranges as a basis for object detection, then the detected return light pulses are light pulses that reflected off one or more nearby objects positioned within the nominal detection range of the LIDAR device. But if the computing system selects use of the second set of ranges as a basis for object detection, then the detected return light pulses are light pulses that reflected off one or more objects positioned outside the nominal detection range of the LIDAR device. Other example situations are also possible.

In one embodiment, after the computing system selects a set of ranges to use as a basis for object detection, the computing system may then engage in object detection accordingly. Generally, engaging in object detection could involve detecting presence of an object, determining a distance of the object away from the LIDAR device, and/or identifying the object, among other possibilities.

In particular, if the computing system determines that the first set of ranges should be used as a basis for object detection, the computing system may responsively use the first set of ranges rather than the second set of ranges as basis for object detection. For instance, the computing system may determine based on the first set of ranges that an object is positioned at a certain range away from the LIDAR device. The computing system could determine this certain range to be one of the ranges of the first set or could determine this certain range to be an average of the ranges of the first set, among other possibilities. Additionally or alternatively, the computing system could assemble a point cloud based on the first set of ranges and could use this point cloud as basis for identifying the object in accordance with object recognition technique(s).

However, if the computing system determines that the second set of ranges should be used as a basis for object detection, the computing system may responsively use the second set of ranges rather than the first set of ranges as basis for object detection. For instance, the computing system may determine based on the second set of ranges that an object is positioned at a certain range away from the LIDAR device. The computing system could determine this certain range to be one of the ranges of the second set or could determine this certain range to be an average of the ranges of the second set, among other possibilities. Additionally or alternatively, the computing system could assemble a point cloud based on the second set of ranges and could use this point cloud as basis for identifying the object in accordance with object recognition technique(s). Other instances are also possible.

Given this implementation, the computing system could determine the appropriate ranges to use for basis for object detection, even when one or more detected return light pulses are light pulses that reflect off proximate and/or distant object(s) and are received before or after detections period associated with their emitted light pulses began or ended.

Figure 7A:
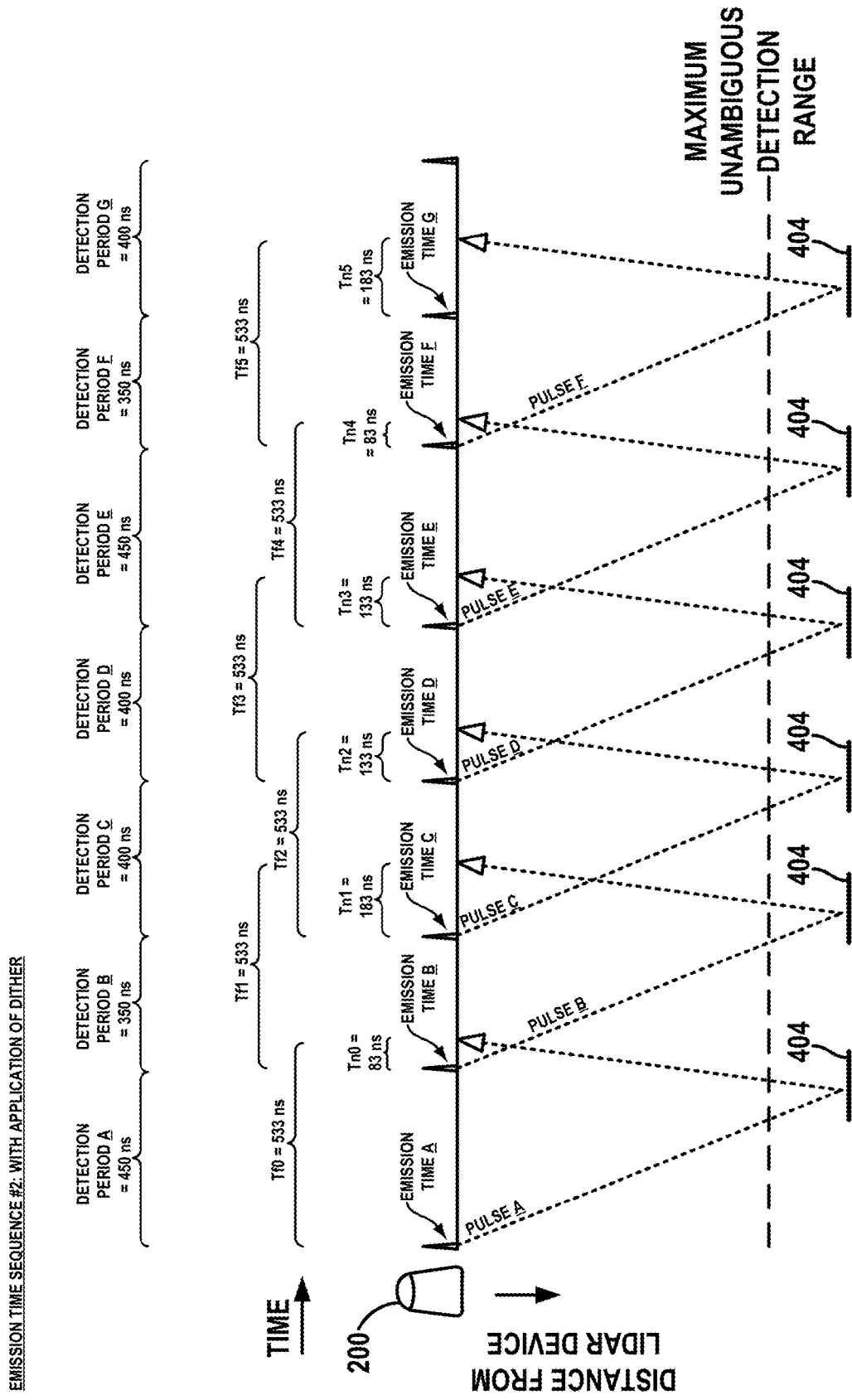
FIG. 7A shows a second emission time sequence that includes application of dither and also shows multiple possible detection times for each of a plurality of detected return lights pulses, according to an example embodiment.
Figure 7B:
FIG. 7B shows selection of ranges to use for object detection, according to an example embodiment.

FIGS. 7A to 7B next illustrate how multiple range hypotheses and application of dither can together help a computing system select ranges to use as a basis for object detection.

In particular, FIG. 7A shows light pulses A-F emitted respectively at emission times A-F in accordance with an emission time sequence #2 that includes application of dither. These emission times establish detection periods A-F of various durations. In line with FIGS. 5A-5B, light pulses A-F each reflect off the distant object 404 and, as a result, are each respectively detected during a subsequent detection period.

In this case, however, when the computing system determines candidate ranges associated with detected light pulses A-F in accordance with a close range hypothesis, the ranges may be substantially different from one another due to the application of dither. For instance, the computing system may determine that the LIDAR device 200 detected light pulse A at a detection time Tn0 of 83 ns relative to emission time B, which corresponds to a range of 12.5 m as shown in FIG. 7B. But the computing system may determine that the LIDAR device 200 detected light pulse B at a detection time Tn1 of 183 ns relative to emission time C, which corresponds to a range of 27.5 m as shown in FIG. 7B. And as shown in FIG. 7A-7B, a similar approach may be used for determining ranges respectively with regards to detection time Tn2, Tn3, Tn4, and Tn5.

Given this, as shown in FIG. 7B, the computing system determines a close range hypothesis including ranges 702 that are substantially different from one another and, as a result, could determine that these ranges 702 should not be used as basis for object detection. The determination to not use ranges 702 would be correct, as light pulses A-F in fact reflected off the distant object 404 that is positioned beyond the maximum unambiguous detection range of the LIDAR device 200. Thus, avoiding use of the close range hypothesis for object detection could help avoid a false detection of a nearby object.

Moreover, the computing system could additionally determine candidate ranges associated with detected light pulses A-F in accordance with a far range hypothesis. For instance, the computing system may determine that the LIDAR device 200 detected light pulse A at a detection time Tf0 of 533 ns relative to emission time A, which corresponds to a range of 80 m as shown in FIG. 7B. And as indicated by detection times Tf1 to Tf5, a similar approach could be used for determining ranges associated with light pulses B-F, thereby resulting in second ranges 704 corresponding to a far range hypothesis of an object being positioned at 80 m away from the LIDAR device 200.

Given this, as shown in FIG. 7B, the computing system determines a far range hypothesis including ranges 704 that are substantially similar to one another and, as a result, could determine that these ranges 704 should be used as basis for object detection. This far range hypothesis is accurate, as light pulses A-F in fact reflected off the distant object 404 that is positioned beyond the maximum unambiguous detection range of the LIDAR device 200. Therefore, the computing system determines the appropriate ranges to use as a basis for object detection. Other illustrations are also possible.

VI. ADDITIONAL APPLICATIONS AND CONSIDERATIONS a. Range Ambiguity Involving Multiple Detections in the Same Detection Period In practice, a computing system could encounter range ambiguity in situations other than those described above, such as when the LIDAR device detects multiple return light pulses respectively during one or more detection periods.

More specifically, when a LIDAR device detects a light pulse that reflected off an object positioned outside the nominal detection range, the LIDAR device may detect this light pulse at a detection time after the end of a detection period that corresponds to that light pulse or at a detection time before start of a detection period that corresponds to that light pulse, which may lead to range ambiguity in the context of multiple light pulse detection in the same detection period.

For instance, referring again to FIG. 4C, the LIDAR device 200 may detect the light pulse emitted at emission time 406A during a detection period that corresponds to another light pulse emitted at emission time 406B and therefore during a detection period that follows detection period 408. This scenario could lead to the computing system determining that the LIDAR device detected multiple return light pulses during the same detection period, and thus the computing system determining two possible time delays relative to an emitted light pulse that corresponds to this detection period. Consequently, this scenario may lead to ambiguity as it may be unclear which of these return light pulses corresponds to the detection period and thus which of these return light pulses to use as basis for determining a distance to an object.

Figure 8A:
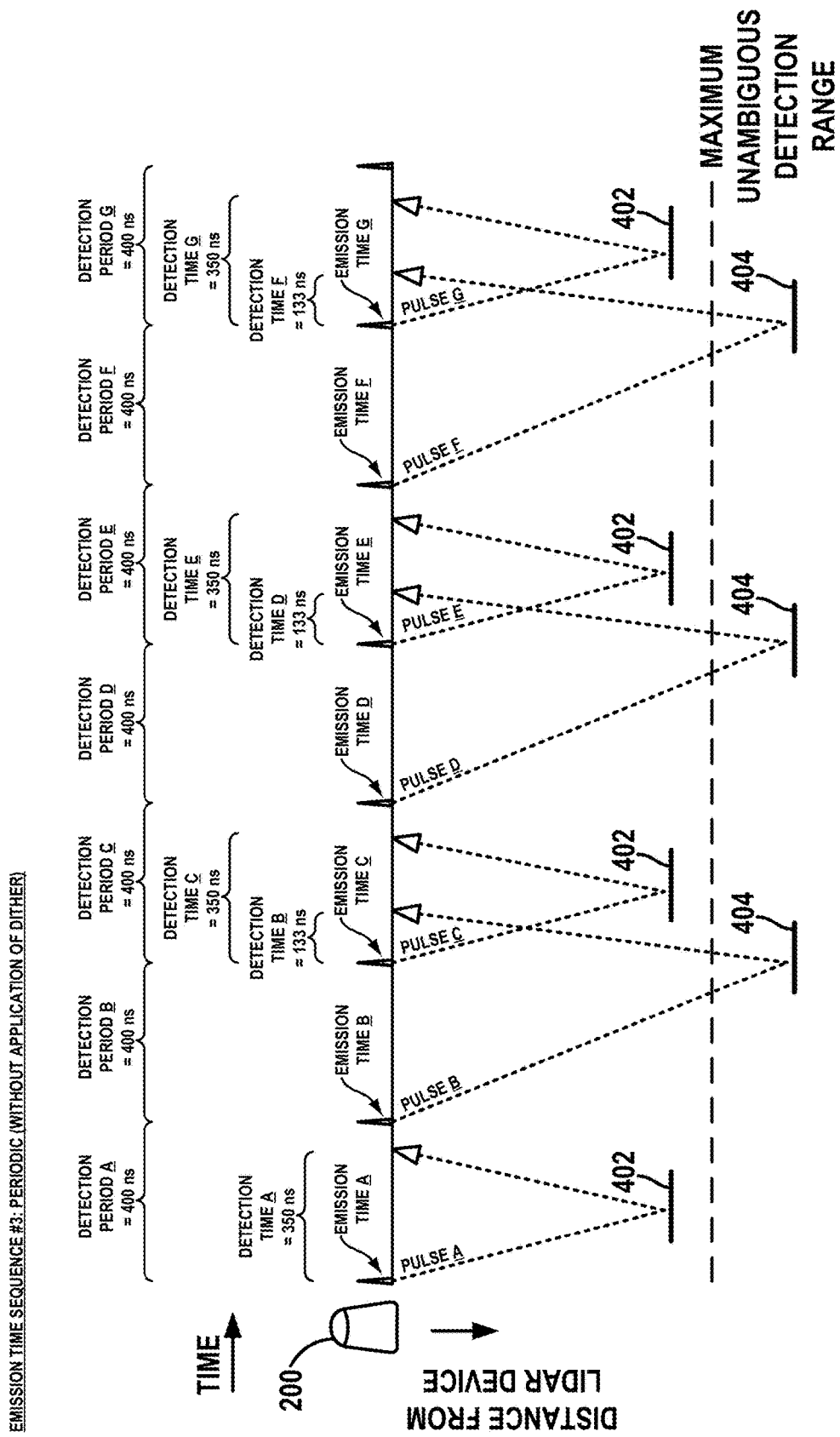
FIG. 8A shows a third emission time sequence that does not include application of dither, according to an example embodiment.

By way of example, FIGS. 8A-8B illustrate how a LIDAR device could detect multiple return light pulses during the same detection period and how such detection of multiple return light pulses during the same detection period may lead to ambiguity. In particular, FIG. 8A shows light pulses A-G emitted respectively at emission times A-G in accordance with a periodic emission time sequence #3. In line with the discussion above, these periodic emission times establish detection periods A-G each of the same 400 ns duration. As shown, light pulses A, C, E, and G reflect off the nearby object 402 and are thus respectively detected by the LIDAR device 200 in their corresponding detection periods A, C, E, and G. However, light pulses B, D, and F reflect off the distant object 404 and, as a result, are each respectively detected during a subsequent detection period.

Consequently, the LIDAR device 200 ambiguously detects multiple return light pulses respectively during each such subsequent detection period. For instance, light pulse B is detected by the LIDAR device 200 during detection period C, which is established for detection of light pulse C rather than for detection of light pulse B. In this regard, the LIDAR device 200 detects light pulse B at a detection time B of 133 ns relative to emission time C, which corresponds to a range of 20 m, and also detects light pulse C at a detection time C of 350 ns relative to emission time C, which corresponds to a range of 52.5 m. A similar situation is encountered with regards to detection of light pulses D and E during detection period E as well as with regards to detection of light pulses F and G during detection period G.

As such, the computing system could generate a close range hypothesis based on detection of light pulses A, C, E, and G, which includes ranges 802 each having a value of 52.5 m. Additionally, the computing system may generate a close range hypothesis based on detection of light pulses B, D, and F, which includes ranges 804 each having a value of 20 m. And given these possible sets of ranges 802 and 804, the computing system operating LIDAR device 200 may be unable to determine with certainty whether an object is positioned at 52.5 m away from the LIDAR device 200 and/or whether an object is positioned at 20 m away from the LIDAR device 200, thereby leading to range ambiguity. Other illustrations are also possible.

To help resolve the issue of range ambiguity, a time-varying dither can be applied to the emission time sequence. In practice, as noted, application of dither may involve pseudo-random deviation of a periodic signal away from periodicity, such as by application of noise to the signal, among other possibilities. In this regard, the computing system may apply pseudo-random dither to respective emission timing of some, but not all, emitted light pulses, so as to respectively shift each such respective emission timing away from periodicity by a pseudo-random duration. With this implementation, the LIDAR device could still possibly detect multiple return light pulses respectively during each of a plurality of detection periods. But due to the shifts in periodicity, the computing system could potentially determine which one of these return light pulses corresponds to the respective detection period and which one does not correspond to the respective detection period.

More specifically, for each respective detection period that begins at a respective emission time, the computing system could determine a first range associated with a first return light pulse according to a time delay relative to the respective emission time and could determine a second range associated with a second return light pulse also according to a time delay relative to the respective emission time. Once the computing system determines the first set of first ranges and the second set of second ranges, one of these sets is less likely than the other to resemble a recognizable object due to the above-mentioned shifts, which could help the computing system determine which ranges to use for purposes of object detection. For instance, if the second return light pulses are those that reflected off the distant object, then the second set is less likely than the first set to resemble a recognizable object. Therefore, the computing system could determine that ranges of the second set are randomly scattered and thus responsively determine that ranges of the first set should be used for purposes of object detection.

Figure 9A:
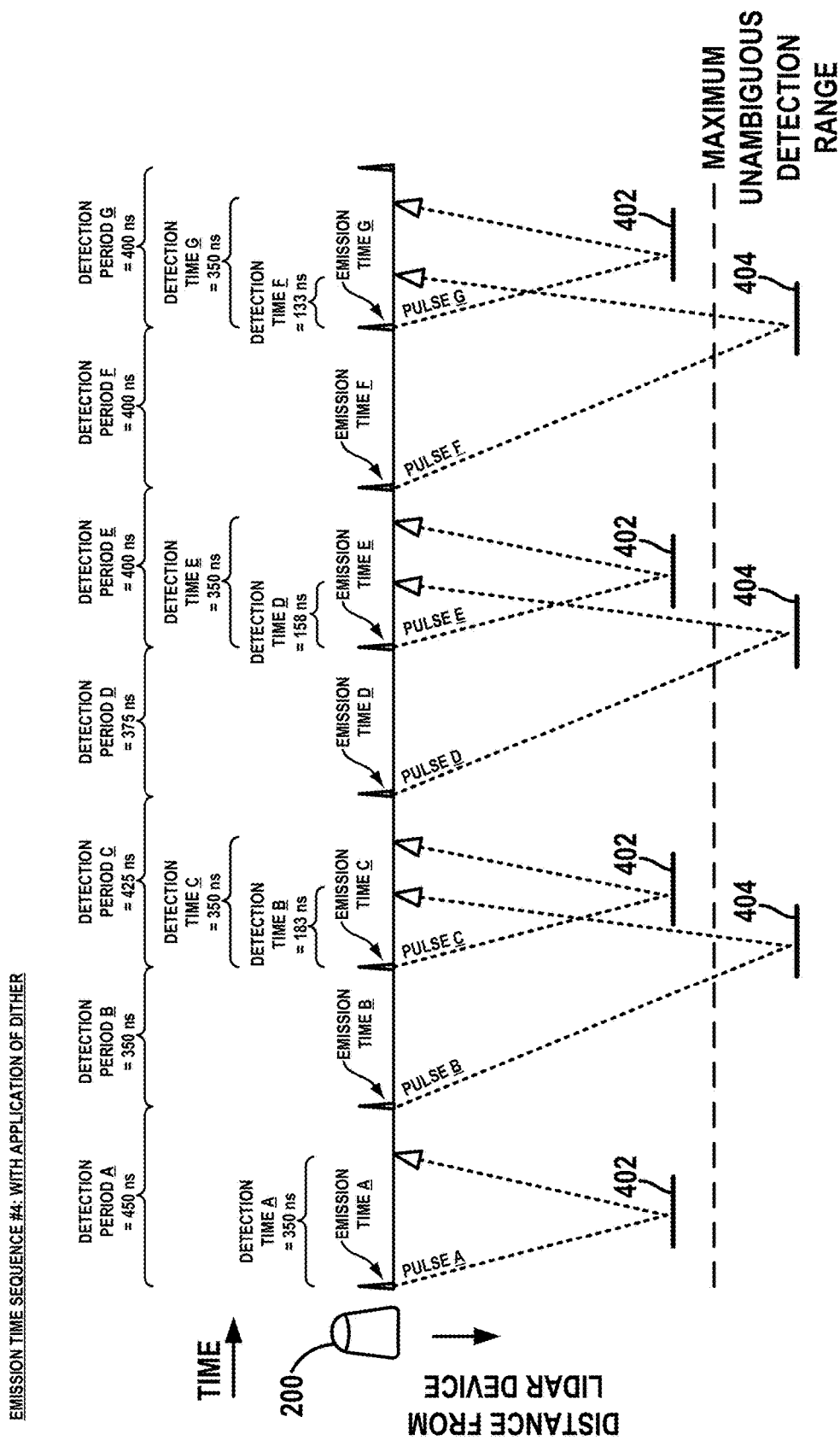
FIG. 9A shows a fourth emission time sequence that includes application of dither, according to an example embodiment.
Figure 9B:
FIG. 9B shows mitigation of range ambiguity due to the fourth emission time sequence, according to an example embodiment.

FIGS. 9A-9B next illustrate how application of dither could help resolve range ambiguity. In particular, FIG. 9A shows light pulses emitted respectively at emission times A-G in accordance with a non-periodic emission time sequence #4 that includes application of dither. In line with the discussion above, these periodic emission times establish detection periods A-G, some of which are of the same duration and some of which are of different durations. As with emission time sequence #3, light pulses A, C, E, and G reflect off the nearby object 402 and, as a result, are each respectively detected by the LIDAR device 200 in their corresponding detection periods A, C, E, and G. Also, as with emission time sequence #3, light pulses B, D, and F reflect off the distant object 404 and, as a result, are each respectively detected during a subsequent detection period. In this case, however, due application of dither, the computing system could potentially disambiguate between multiple return light pulses detected during the same detection period.

More specifically, FIGS. 9A-9B show that the range corresponding to detection of light pulses A, C, E, and G is at 52.5 m away from the LIDAR device 200. But FIGS. 9A-9B also show that, due to application of dither, the ranges corresponding to light pulses B, D, and F are substantially different from one another. Namely, the LIDAR device 200 detected light pulse B at a detection time B of 183 ns relative to emission time C, which corresponds to a range of 27.5 m, detected light pulse D at a detection time D of 158 ns relative to emission time E, which corresponds to a range of 23 m, and detected light pulse F at a detection time F of 133 ns relative to emission time G, which corresponds to a range of 20 m. In this way, the computing system determines a first set of ranges 902 that are the same or similar to one another, as well as a second set of ranges 904 that are substantially different from one another. As such, the computing system could determine that ranges 904 are randomly scattered and thus responsively determine that ranges 902 should be used for purposes of object detection. Other illustrations are possible as well.

Although the approach of this embodiment can help overcome range ambiguity, there may be certain deficiencies. For example, when the computing system determines two or more possible sets of ranges in line with the discussion above, in some cases, each such set of ranges could resemble a recognizable object. In such cases, the computing system may not be able to determine with a high level of certainty which of these sets of ranges to use for purposes of object detection. Moreover, whether or not the computing system is able to disambiguate between multiple return light pulses with a high level of certainty, the existing implementation does not provide for detection of an object positioned outside the nominal detection range, such as of a distant object that reflects light pulses and causes the range ambiguity.

b. Using an Alternate Range Hypothesis to Detect a Distant Object

Figure 10:
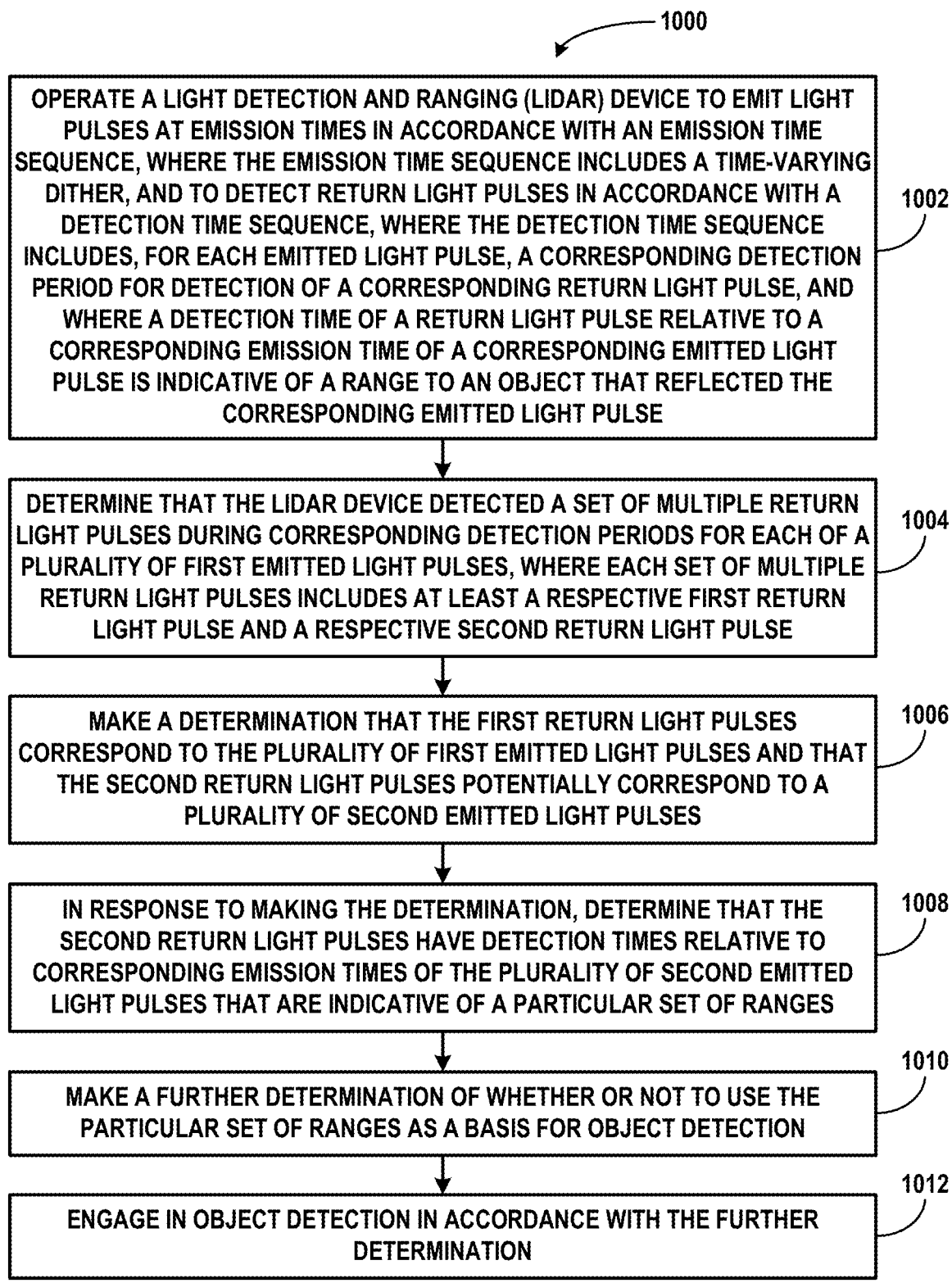
FIG. 10 is a flowchart illustrating a method for detecting an object positioned outside a nominal unambiguous detection range of a LIDAR device, according to an example embodiment.

FIG. 10 is a flowchart illustrating a method 1000, according to an example implementation. In particular, method 1000 may be implemented to generate an alternate range hypothesis and then use that alternate range hypothesis to detect an object positioned outside the nominal detection range of a LIDAR device. Although method 1000 is generally described in the context of generating a far range hypothesis, it should be understood that method 1000 may additionally or alternatively apply in the context of generating a proximate range hypothesis.

At block 1002, method 1000 involves operating a LIDAR device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse.

In line with the discussion above, a computing system could operate a LIDAR device to emit and detect light pulses in accordance with certain timing. For instance, the computing system could operate the LIDAR device to emit light pulses in accordance with an emission time sequence including a time-varying dither. As discussed, the emission time sequence may help establish a detection time sequence according to which the LIDAR device detects return light pulses. Generally, this detection time sequence may include a corresponding detection period respectively for each emitted light.

In particular, a corresponding detection period for a given light pulse may begin immediately following or at some time after emission of that given light pulse, and may end before or after emission a subsequent light pulse. During this corresponding detection period, the LIDAR device could detect a given return light pulse that corresponds to the given emitted light pulse, such as when the given emitted light pulse reflects off an object to result in that return light pulse. After the LIDAR device detects the given return light pulse at a certain detection time, the computing system could then determine a range to an object that reflected the given emitted light pulse. As discussed, the computing system could determine this range according to a time delay between the detection time of the given return light pulse and the emission time of the given emitted light pulse.

At block 1004, method 1000 involves determining that the LIDAR device detected a set of multiple return light pulses during corresponding detection periods for each of a plurality of first emitted light pulses, where each set of multiple return light pulses includes at least a respective first return light pulse and a respective second return light pulse.

In line with the discussion above, a computing system could determine that the LIDAR device detected multiple return light pulses respectively during two or more detection periods. For instance, a plurality of first emitted light pulses could each respectively have a corresponding detection period. But due to reflection of one or more light pulses off proximate and/or distant object(s), the LIDAR device could instead end up detecting multiple return light pulses respectively during each such corresponding detection. As such, for each such corresponding detection period, the computing system could determine that the LIDAR device detected at least a respective first return light pulse as well as a respective second return light pulse. Moreover, in each corresponding detection period, one of these return light pulses may be a pulse that reflected off an object positioned outside the nominal detection range of the LIDAR device, and the other one of these return light pulses may be a pulse that reflected off an object positioned within the nominal detection range that is thus associated with the detection period at issue. Other scenarios are possible as well.

At block 1006, method 1000 involves making a determination that the first return light pulses correspond to the plurality of first emitted light pulses and that the second return light pulses potentially correspond to a plurality of second emitted light pulses.

In accordance with the present disclosure, once the computing system determines that the LIDAR device detected multiple return light pulses respectively during two or more detection periods, the computing system may determine which of these return light pulses correspond to the plurality of first emitted light pulses. Namely, the computing system may determine which of these return light pulses reflected off object(s) within the nominal detection range. In some embodiments, the computing system could do so by using any of the above-described implementations for resolving range ambiguity and/or could do so in accordance with the approach for resolving range ambiguity described herein in association with method 1200, among other options. In any case, for sake of simplicity, an assumption could be made that the computing system determined that the above-mentioned first return light pulses correspond to the plurality of first emitted light pulses, and thus that the ranges corresponding to these first return light pulses should be used for purposes of object detection.

After or while determining that the first return light pulses correspond to the plurality of first emitted light pulses, the computing system may determine that the above-mentioned second return light pulses potentially correspond to a plurality of second emitted light pulses. In particular, rather than disregarding or discarding detection of the second return light pulses after disambiguating between the multiple return light pulses, the computing system may select a plurality of second emitted light pulses to which the second return light pulses could potentially correspond. For instance, for each second return light pulse, the computing system could respectively select a previously emitted light pulse, which may be a light pulse that corresponds to a detection period that precedes (e.g., immediately precedes) the one during which the second return light pulse was actually detected. As a result, at least one of the second emitted light pulses that is used to calculate a range for a return light pulse could be different from each of the plurality of first emitted light pulses.

By way of example, referring again to FIG. 8A, return light pulses A, C, E, and G are respectively detected at their corresponding detection periods and could therefore be considered to be the first return light pulses that correspond to the plurality of first emitted light pulses. As a result, return light pulses B, D, and F could therefore be considered to be the second return light pulses that reflected off a distant object and thus were detected during a subsequent detection period in line with the discussion above.

In this example, for each of return light pulses B, D, and F, the computing system could respectively select a previously emitted light pulse, which may corresponds to a detection period that precedes the one during which the return light pulse was actually detected. For instance, the computing system could select emitted light pulses B, D, and F, which respectively correspond to detection periods B, D, and F. As shown, detection periods B, D, and F are those that actually correspond to light pulses B, D, and F. Other examples are possible as well.

At block 1008, method 1000 involves, in response to making the determination, determining that the second return light pulses have detection times relative to corresponding emission times of the plurality of second emitted light pulses that are indicative of a particular set of ranges.

Once the computing system selects or otherwise determines the plurality of second emitted light pulses that potentially correspond to the detected second return light pulses, the computing system could responsively generate a far range hypothesis for the second return light pulses. Specifically, for each second return light pulse, the computing system could respectively determine an associated range according to a time delay relative to an emission time of one of the plurality of second emitted light pulses, which may be an emitted light pulse corresponding to a detection period that precedes the one during which the second return light pulse was detected. In this way, the computing system may determine associated ranges to result in a particular set of ranges that is considered to be one possible alternate range hypothesis for the second return light pulses.

Figure 11A:
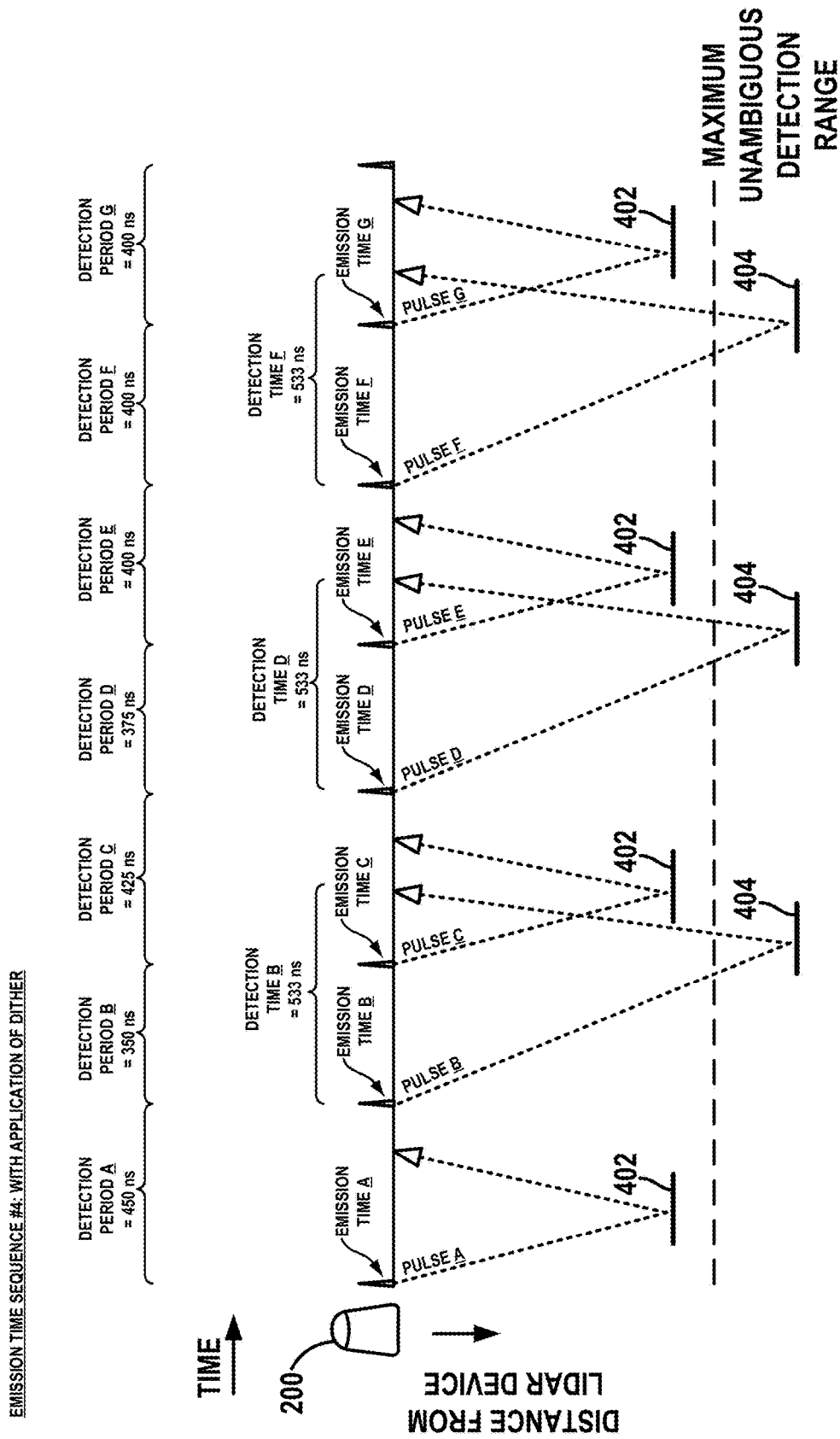
FIG. 11A shows comparison of detection times relative to preceding emission times, according to an example embodiment.
Figure 11B:
FIG. 11B shows detection of a distant object positioned outside a nominal unambiguous detection range of a LIDAR device, according to an example embodiment.

By way of example, FIGS. 11A-11B illustrate determination of a far range hypothesis. In particular, FIG. 11A shows the emission time sequence #4 introduced in FIG. 9A. But in this case, assuming again that return light pulses B, D, and F are considered to be the second return light pulses, the computing system respectively determines ranges corresponding to these light pulses according to a time delay relative to an emission time of a previously emitted light pulse. Namely, as shown in FIG. 11A, the computing system determines that return light pulses B has a detection time of 533 ns relative to emission time B, that return light pulses D has a detection time of 533 ns relative to emission time D, and that return light pulses F has a detection time of 533 ns relative to emission time F. And as shown in FIG. 11B, these detection times of return light pulses B, D, F each have a corresponding range of 80 m. Therefore, these corresponding ranges result in a particular set of ranges 1100 considered to be a far range hypothesis. Other examples are also possible.

At block 1010, method 1000 involves making a further determination of whether or not to use the particular set of ranges as a basis for object detection. At block 1012, method 1000 involves engaging in object detection in accordance with the further determination.

As noted above, the computing system could use an alternate range hypothesis as basis to detect an object positioned outside a nominal detection range of a LIDAR device. In particular, once the computing system determines the particular set of ranges considered to be an alternate range hypothesis for the second return light pulses, the computing system could determine whether or not the particular set of range should be used as a basis for object detection. The computing system could do so in various ways.

In one example, the computing system could determine whether or not the particular set of ranges is representative of one or more known objects. As noted, the computing system could do so based on object recognition techniques. In this example, if the computing system determines that the particular set of ranges is representative of one or more known objects, the computing system may responsively determine that the particular set of ranges should be used as a basis for further object detection. For instance, in line with the discussion above, the computing system could assemble a point cloud based on the particular set of ranges, and could then determine that this assembled point cloud matches at least one of the plurality of point clouds stored by the computing system. In response to determining this match, the computing system could then use the assembled point cloud as basis for identifying the distant object and/or could establish a certain range at which the object represented by the assembled point cloud is positioned (e.g., the certain range could be established to be an average of the ranges of the particular set), among other options. However, if the computing system determines that the particular set of ranges is not representative of at least one known object, the computing system may responsively determine that the particular set of range should not be used as a basis for further object detection.

In another example, the computing system may determine whether or not ranges of the particular set are substantially similar to one another. In this example, if the computing system determines that ranges of the particular set are substantially similar to one another, the computing system may responsively determine that the particular set of range should be used as a basis for object detection. However, if the computing system determines that ranges of the particular set are not substantially similar to one another, the computing system may responsively determine that the particular set of ranges should not be used as a basis for object detection.

In accordance with the present disclosure, if the computing system determines that the particular set of range should not be used as a basis for object detection, the computing system may not use the particular set of ranges as basis for object detection. For instance, the computing system could discard or disregard signals as noise or the ranges of the particular set as unreliable, among other options.

However, if the computing system determines that the particular set of range should be used as a basis for object detection, the computing system may then engage in object detection accordingly. Generally, engaging in object detection could involve detecting presence of an object, determining a distance of the object away from the LIDAR device, and/or identifying the object, among other possibilities.

For instance, the computing system may determine based on the particular set of ranges that a distant object is positioned at a certain range away from the LIDAR device.

The computing system could determine this certain range to be one of the ranges of the particular set or could determine this certain range to be an average of the ranges of the particular set, among other possibilities. Additionally or alternatively, if the computing system has not already done so as part of the process of determining whether or not the particular set of range should be used as a basis for object detection, the computing system could assemble a point cloud based on the particular set of ranges. And the computing system could use this point cloud as basis for identifying the distant object in accordance with object recognition technique(s). Other examples are possible as well.

In this way, an alternate range hypothesis could help provide additional information indicative of an object being positioned outside the nominal detection range of a LIDAR device. Such additional information could be used by the computing system to optimize navigation decisions for a vehicle that operates in an autonomous mode, among other outcomes.

FIGS. 11A-11B further illustrate how an alternate range hypothesis could help with detection of object(s) positioned outside the nominal detection range of a LIDAR device. As noted above, the particular set of ranges 1100 is considered to be a far range hypothesis. Thus, based on a determination that ranges of the particular set of ranges 1100 are equal or substantially similar to one another, the computing system could determine that ranges of the particular set of ranges 1100 should be used as basis for object detection. Accordingly, as shown, the computing system could determine that a distant object is positioned at about 80 m away from the LIDAR device 200, which is an accurate determination as object 404 is in fact shown in FIG. 4A to be positioned at 80 m away from the LIDAR device 200. Other illustrations are also possible.

Figure 12:
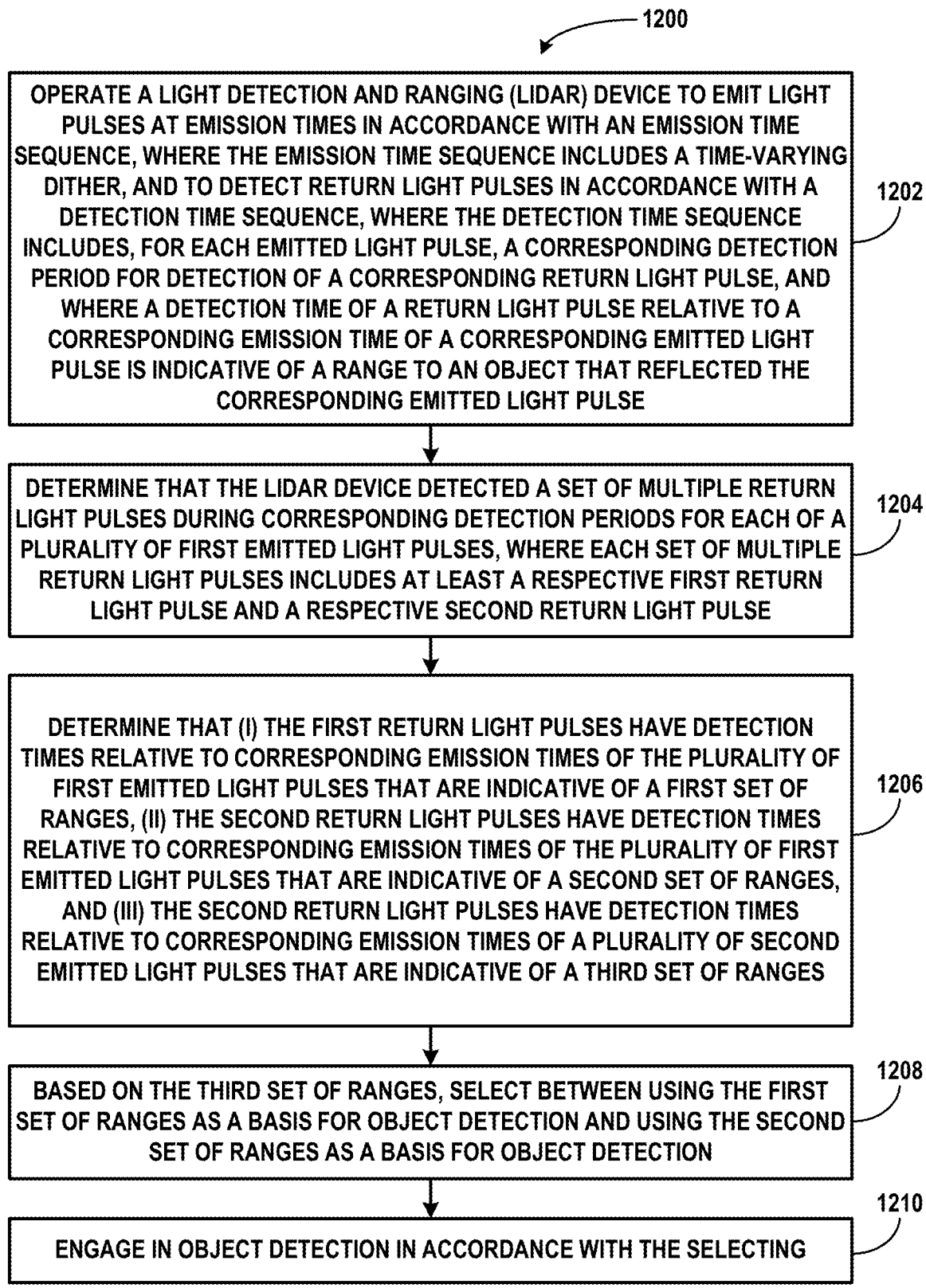
FIG. 12 is a flowchart illustrating a method for disambiguating between multiple return light pulses detected during the same detection period, according to an example embodiment.

In a further aspect, when a LIDAR device is positioned on a vehicle, a computing system could use the vehicle's speed as an additional factor for evaluating a range hypothesis. In particular, when a vehicle moves towards an object and a LIDAR device detects return light pulses reflected off that object, the detection time of those return pulses tends to get shorter over time as the vehicle approaches the object, and thus ranges determined based on these detection times may decrease as the vehicle approaches the object. In practice, such decrease in determined range over time may be predictable based on the vehicle's speed. Thus, when the computing system generates a range hypothesis based on the detection times of such pulses, the computing system could determine whether or not ranges of the hypothesis decrease over time as would be expected based on the vehicle's speed. If so, then the computing system may responsively determine that the range hypothesis is correct. Otherwise, the computing system may responsively determine that the range hypothesis is incorrect. Other aspects are possible as well.

c. Using an Alternate Range Hypothesis to Disambiguate Between Multiple Return Light Pulses Respectively Detected During a Plurality of Detection Periods FIG. 12 is a flowchart illustrating a method 1200, according to an example implementation. In particular, method 1200 may be implemented to generate an alternate range hypothesis and then use that alternate range hypothesis to disambiguate with a higher level of certainty between multiple return light pulses respectively detected during a plurality of detection periods. Although method 1200 is generally described in the context of generating a far range hypothesis, it should be understood that method 1200 may additionally or alternatively apply in the context of generating a proximate range hypothesis.

At block 1202, method 1200 involves operating a LIDAR device to emit light pulses at emission times in accordance with an emission time sequence, where the emission time sequence includes a time-varying dither, and to detect return light pulses in accordance with a detection time sequence, where the detection time sequence includes, for each emitted light pulse, a corresponding detection period for detection of a corresponding return light pulse, and where a detection time of a return light pulse relative to a corresponding emission time of a corresponding emitted light pulse is indicative of a range to an object that reflected the corresponding emitted light pulse.

As noted above, a computing system could operate a LIDAR device to emit and detect light pulses in accordance with certain timing. For instance, the computing system could operate the LIDAR device to emit light pulses in accordance with an emission time sequence including a time-varying dither. As discussed, the emission time sequence may help establish a detection time sequence according to which the LIDAR device detects return light pulses. Generally, this detection time sequence may include a corresponding detection period respectively for each emitted light pulse.

In particular, a corresponding detection period for a given light pulse may begin immediately following or at some time after emission of that given light pulse, and may end before or after emission a subsequent light pulse. During this corresponding detection period, the LIDAR device could detect a given return light pulse that corresponds to the given emitted light pulse, such as when the given emitted light pulse reflects off an object to result in that return light pulse. After the LIDAR device detects the given return light pulse at a certain detection time, the computing system could then determine a range to an object that reflected the given emitted light pulse. The computing system could determine this range according to a time delay between the detection time of the given return light pulse and the emission time of the given emitted light pulse.

At block 1204, method 1200 involves determining that the LIDAR device detected a set of multiple return light pulses during corresponding detection periods for each of a plurality of first emitted light pulses, where each set of multiple return light pulses includes at least a respective first return light pulse and a respective second return light pulse.

As noted above, a computing system could determine that the LIDAR device detected multiple return light pulses respectively during one or more detection periods. For instance, a plurality of first emitted light pulses could each respectively have a corresponding detection period. But due to reflection of one or more light pulses off object(s) positioned outside the nominal detection range, the LIDAR device could instead end up detecting multiple return light pulses respectively during each such corresponding detection period. As such, for each such corresponding detection period, the computing system could determine that the LIDAR device detected at least a respective first return light pulse as well as a respective second return light pulse. Moreover, in each corresponding detection period, one of these return light pulses is a pulse that reflected off an object positioned outside the nominal detection range of the LIDAR device, and the other one of these return light pulses is a pulse that reflected off an object positioned within the nominal detection range that is thus associated with the detection period at issue. Other scenarios are possible as well.

At block 1206, method 1200 involves determining that (i) the first return light pulses have detection times relative to corresponding emission times of the plurality of first emitted light pulses that are indicative of a first set of ranges, (ii) the second return light pulses have detection times relative to corresponding emission times of the plurality of first emitted light pulses that are indicative of a second set of ranges, and (iii) the second return light pulses have detection times relative to corresponding emission times of a plurality of second emitted light pulses that are indicative of a third set of ranges.

In line with the discussion above, when the computing system determines that the LIDAR device detected multiple return light pulses respectively during a plurality of detection periods, the computing system may determine, respectively for each detected return light pulse, a corresponding range according to a time delay relative to a most recently emitted light pulse.

For instance, as noted, the plurality of first emitted light pulses could each respectively have a corresponding detection period and, for each such corresponding detection period, the computing system could determine that the LIDAR device detected at least a respective first return light pulse as well as a respective second return light pulse. For each respective first return light pulse, the computing system could then determine a corresponding first range according to a time delay relative to emission time of the first emitted light corresponding to the detection period during which the respective first return light pulse was detected. Additionally, for each respective second return light pulse, the computing system could then determine a corresponding second range according to a time delay relative to emission time of the first emitted light corresponding to the detection period during which the respective second return light pulse was detected. In this way, the determined first ranges result in a first set of ranges and the determined second ranges result in a second set of ranges.

Further in line with the discussion above, when the computing system determines such first and second sets of ranges, these sets may give rise to range ambiguity, as it may be unclear which of these sets should be used for purposes of object detection. Although the above-mentioned existing implementation could sometimes help overcome this range ambiguity, in accordance with the present disclosure, a computing system further could generate an alternate range hypothesis, to further assist in disambiguating the range ambiguity between by the first and second sets of ranges.

More specifically, the computing system may select a plurality of second emitted light pulses to which the second return light pulses could potentially correspond. For example, for each second return light pulse, the computing system could respectively select a previously emitted light pulse, which may be a light pulse that corresponds to a detection period that precedes (e.g., immediately precedes) the one during which the second return light pulse was actually detected. As a result, at least one of the second emitted light pulses that is used to calculate a range for a return light pulse could be different from each of the plurality of first emitted light pulses.

Once the computing system selects or otherwise determines the plurality of second emitted light pulses that potentially correspond to the detected second return light pulses, the computing system could responsively generate an alternate range hypothesis for the second return light pulses. Specifically, for each second return light pulse, the computing system could respectively determine an associated range according to a time delay relative to an emission time of one of the plurality of second emitted light pulses, which may be an emitted light pulse corresponding to a detection period that precedes the one during which the second return light pulse was detected. In this way, the computing system may determine associated ranges to result in a third set of ranges that is considered to be one possible alternate range hypothesis for the second return light pulses. Moreover, if this alternate range hypothesis is a far range hypothesis, the ranges of the third set may be greater than ranges of the above-mentioned second set, despite both sets of ranges being associated with the second return light pulses.

At block 1208, method 1200 involves, based on the third set of ranges, selecting between using the first set of ranges as a basis for object detection and using the second set of ranges as a basis for object detection. And at block 1210, method 1200 involves engaging in object detection in accordance with the selecting.

More specifically, in accordance with the present disclosure, the computing system may use the generated alternate range hypothesis to help overcome range ambiguity, and the computing system could do so in various ways.

In one example, the computing system could determine whether or not the third set of ranges is representative of one or more known objects, and could do so as discussed above, for instance.

In this example, if the computing system determines that the third set of ranges is representative of one or more known objects, then the computing system could responsively determine that the generated alternate range hypothesis for the second return light pulses is likely correct. Based on a determination that the generated alternate range hypothesis for the second return light pulses is likely correct, the computing system may determine that the close range hypothesis for the second return light pulses, which includes the second set of ranges, is likely incorrect. Therefore, in response to determining that the third set of ranges is representative of one or more known objects, the computing system may determine that the computing system should use, for purposes of object detection, the first set of ranges associated with the first return light pulses rather than the second set of ranges associated with the second return light pulses.

In contrast, if the computing system determines that the third set of ranges is not representative of any known object, then the computing system could responsively determine that the generated alternate range hypothesis for the second return light pulses is likely incorrect. Based on a determination that the generated alternate range hypothesis for the second return light pulses is likely incorrect, the computing system may determine that the close range hypothesis for the second return light pulses, which includes the second set of ranges, is likely correct. Therefore, in response to determining that the third set of ranges is not representative of any known object, the computing system may determine that the computing system should use, for purposes of object detection, the second set of ranges associated with the second return light pulses rather than the first set of ranges associated with the first return light pulses.

In another example, the computing system may determine whether or not ranges of the third set are substantially similar to one another, and could do so as discussed above, for instance.

In this example, if the computing system determines that the third set of ranges are substantially similar to one another, then the computing system could responsively determine that the generated alternate range hypothesis for the second return light pulses is likely correct. Based on a determination that the generated alternate range hypothesis for the second return light pulses is likely correct, the computing system may determine that the close range hypothesis for the second return light pulses, which includes the second set of ranges, is likely incorrect. Therefore, in response to determining that the third set of ranges are substantially similar to one another, the computing system may determine that the computing system should use, for purposes of object detection, the first set of ranges associated with the first return light pulses rather than the second set of ranges associated with the second return light pulses.

In contrast, if the computing system determines that the third set of ranges are not substantially similar to one another, then the computing system could responsively determine that the generated alternate range hypothesis is likely incorrect. Based on a determination that the generated alternate range hypothesis for the second return light pulses is likely incorrect, the computing system may determine that the close range hypothesis for the second return light pulses, which includes the second set of ranges, is likely correct. Therefore, in response to determining that the third set are not substantially similar to one another, the computing system may determine that the computing system should use, for purposes of object detection, the second set of ranges associated with the second return light pulses rather than the first set of ranges associated with the first return light pulses. Other examples are also possible.

In accordance with the present disclosure, if the computing system determines that the first set of ranges should be used as a basis for object detection, the computing system may responsively use the first set of ranges rather than the second set of ranges as basis for object detection. For instance, the computing system may determine based on the first set of ranges that a nearby object is positioned at a certain range away from the LIDAR device. The computing system could determine this certain range to be one of the ranges of the first set or could determine this certain range to be an average of the ranges of the first set, among other possibilities. Additionally or alternatively, the computing system could assemble a point cloud based on the first set of ranges and could use this point cloud as basis for identifying the nearby object in accordance with object recognition technique(s).

However, if the computing system determines that the second set of ranges should be used as a basis for object detection, the computing system may responsively use the second set of ranges rather than the first set of ranges as basis for object detection. For instance, the computing system may determine based on the second set of ranges that a nearby object is positioned at a certain range away from the LIDAR device. The computing system could determine this certain range to be one of the ranges of the second set or could determine this certain range to be an average of the ranges of the second set, among other possibilities. Additionally or alternatively, the computing system could assemble a point cloud based on the second set of ranges and could use this point cloud as basis for identifying the nearby object in accordance with object recognition technique(s). Other instances are also possible.

In some implementations, assuming that the alternate range hypothesis generated for the second return light pulses could be referred to as a second alternate range hypothesis, the computing system could additionally generate a first alternate range hypothesis for the first return light pulses and could use this first alternate range hypothesis to help overcome range ambiguity. Namely, the computing system could use this first alternate range hypothesis as further basis to determine whether to use the first or second set of ranges for purposes of object detection.

In particular, the computing system could make a comparison between the first alternate range hypothesis and the second alternate range hypothesis, and could then determine whether to use the first or second set of ranges for purposes of object detection based on the comparison.

In one example, the comparison could be a determination of whether a first far range hypothesis more closely resembles known object(s) than a second far range hypothesis, or vice versa. For instance, if the computing system determines that the first far range hypothesis is representative of one or more known objects and that the second far range hypothesis is not representative of any known object, then the computing system may responsively determine the first far range hypothesis more closely resembles known object(s) than the second far range hypothesis. Whereas, if the computing system determines that the second far range hypothesis is representative of one or more known objects and that the first far range hypothesis is not representative of any known object, then the computing system may responsively determine the second far range hypothesis more closely resembles known object(s) than the first far range hypothesis.

However, if the computing system determines that both the first and second far range hypotheses are respectively representative of known object(s), then the computing system could use object recognition technique(s) to determine which of these far range hypotheses more closely resembles known object(s). For instance, the computing system may determine that the first range hypothesis matches a known object with a first level of certainty (e.g., a 25% match) and that the second range hypothesis matches a known object with a second level of certainty (e.g., a 95% match). Based on a determination that the second level of certainty is higher than the first level of certainty, the computing system could responsively determine that the second far range hypothesis more closely resembles a known object compared with the first far range hypothesis. Other instances are possible as well.

In this example, if the computing system determines that the first far range hypothesis more closely resembles known object(s) than the second far range hypothesis, then the computing system may determine that the first far range hypothesis is more likely to be correct than the second range hypothesis. Namely, that the second return light pulses more likely each respectively correspond a most recent detection period and that the first return light pulses more likely each respectively correspond to a preceding detection period. Therefore, in response to determining that the first far range hypothesis more closely resemble known object(s) than the second far range hypothesis, the computing system may determine that the computing system should use, for purposes of object detection, the second set of ranges associated with the second return light pulses rather than the first set of ranges associated with the first return light pulses.

In contrast, if the computing system determines that the second far range hypothesis more closely resembles known object(s) than the first far range hypothesis, then the computing system may determine that the second far range hypothesis is more likely to be correct than the first range hypothesis. Namely, that the first return light pulses more likely each respectively correspond a most recent detection period and that the second return light pulses more likely each respectively correspond to a preceding detection period. Therefore, in response to determining that the second far range hypothesis more closely resemble known object(s) than the first far range hypothesis, the computing system may determine that the computing system should use, for purposes of object detection, the first set of ranges associated with the first return light pulses rather than the second set of ranges associated with the second return light pulses.

In another example, the comparison could be a comparison of how similar ranges of a first far range hypothesis are to one another relative to how similar ranges of a second far range hypothesis are to one another. For instance, the computing system could determine that ranges of the second far range hypothesis match one another and that ranges of the first far range hypothesis are different from one another. As a result, the computing system may responsively determine that ranges of the second far range hypothesis are more similar to one another compared to similarity of ranges in the first far range hypothesis. Other instances are possible as well.

In this example, if the computing system makes a determination that ranges of the first far range hypothesis are more similar to one another compared to similarity of ranges in the second far range hypothesis, then the computing system may determine that the first far range hypothesis is more likely to be correct than the second far range hypothesis. Namely, that the second return light pulses more likely each respectively correspond a most recent detection period and that the first return light pulses more likely each respectively correspond to a preceding detection period. Therefore, in response to making this determination, the computing system may determine that the computing system should use, for purposes of object detection, the second set of ranges associated with the second return light pulses rather than the first set of ranges associated with the first return light pulses.

In contrast, if the computing system makes a determination that ranges of the second far range hypothesis are more similar to one another compared to similarity of ranges in the first far range hypothesis, then the computing system may determine that the second far range hypothesis is more likely to be correct than the first range hypothesis. Namely, that the first return light pulses more likely each respectively correspond a most recent detection period and that the second return light pulses more likely each respectively correspond to a preceding detection period. Therefore, in response to making this determination, the computing system may determine that the computing system should use, for purposes of object detection, the first set of ranges associated with the first return light pulses rather than the second set of ranges associated with the second return light pulses. Other examples are also possible.

In this manner, one or more alternate range hypotheses could help overcome range ambiguity and thus help detect nearby object(s) with a higher level of certainty. Such enhanced detection of nearby object(s) could be used by the computing system to optimize navigation decisions for a vehicle that operates in an autonomous mode, among other outcomes.

FIGS. 13A-13B and 14A-14B next illustrate how one or more alternate range hypotheses could help overcome range ambiguity and thus help detect nearby object(s) with a higher level of certainty.

Figure 13A:
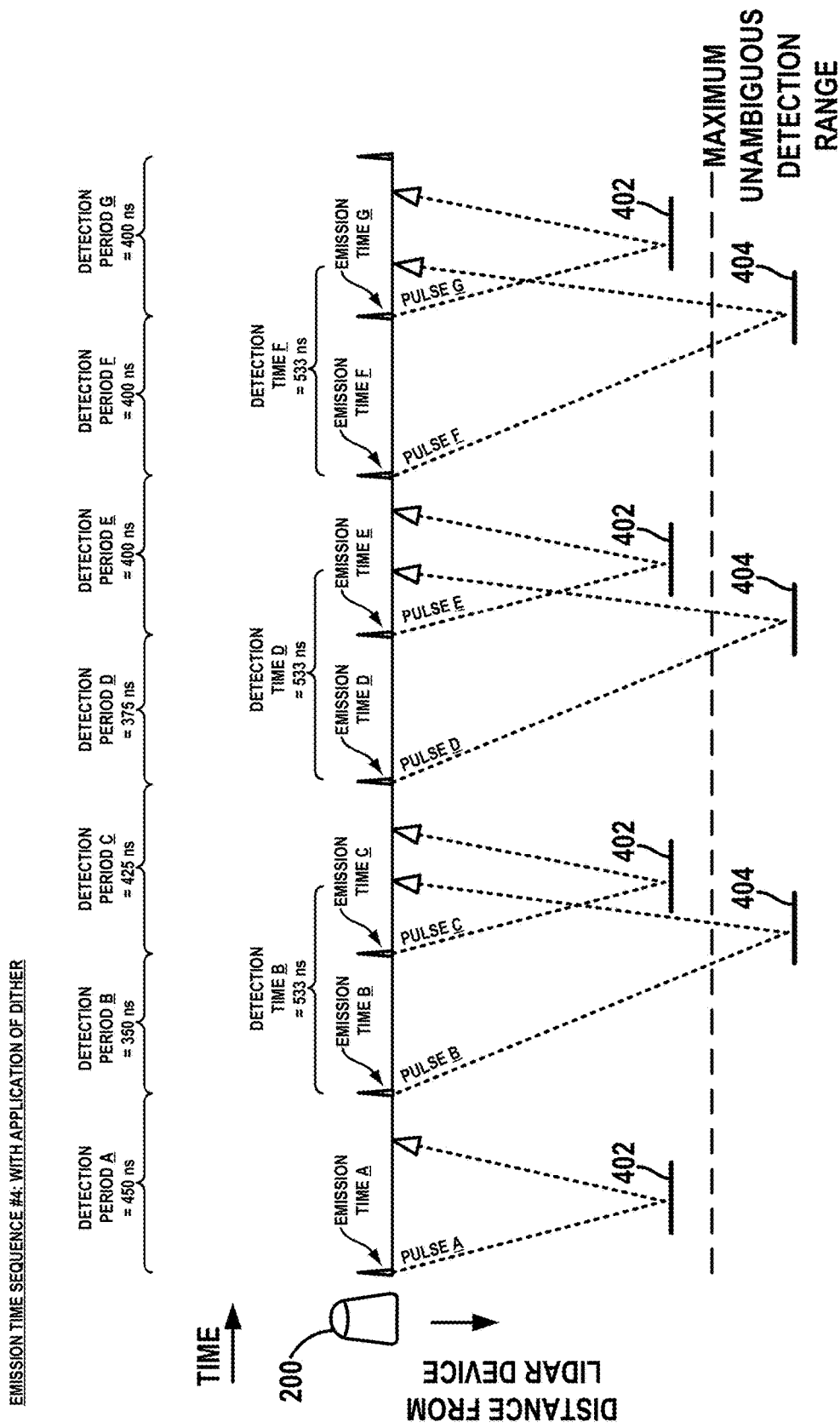
FIG. 13A shows another comparison of detection times relative to preceding emission times, according to an example embodiment.

In particular, FIG. 13A shows the emission time sequence #4 introduced above. Here again, the computing system respectively determines ranges corresponding to light pulses B, D, and F according to a time delay relative to an emission time of a previously emitted light pulse. Namely, as shown in FIG. 13A, the computing system determines that return light pulses B has a detection time of 533 ns relative to emission time B, that return light pulses D has a detection time of 533 ns relative to emission time D, and that return light pulses F has a detection time of 533 ns relative to emission time F. As shown in FIG. 13B, these detection times of return light pulses B, D, F each have a corresponding range of 80 m. Therefore, these corresponding ranges result in a set of ranges 1300 considered to be a far range hypothesis of a distant object being positioned at 80 m away from the LIDAR device.

In this example, the computing system could determine that the far range hypothesis is likely correct based on the ranges 1300 being substantially similar to one another. Based on a determination that the far range hypothesis is likely correct, the computing system may in turn determine that a close range hypothesis associated with return light pulses B, D, and F (e.g., above-mentioned ranges 904) is likely incorrect. Consequently, based on a determination that the far range hypothesis is likely correct, the computing system may responsively determine with a higher level of certainty that a close range hypothesis associated with light pulses A, C, E, and G (e.g., above-mentioned ranges 902) should be used for object detection, thereby resolving the range ambiguity that may arise due to detection of multiple return light pulses respectively in one or more detection periods.

Figure 14A:
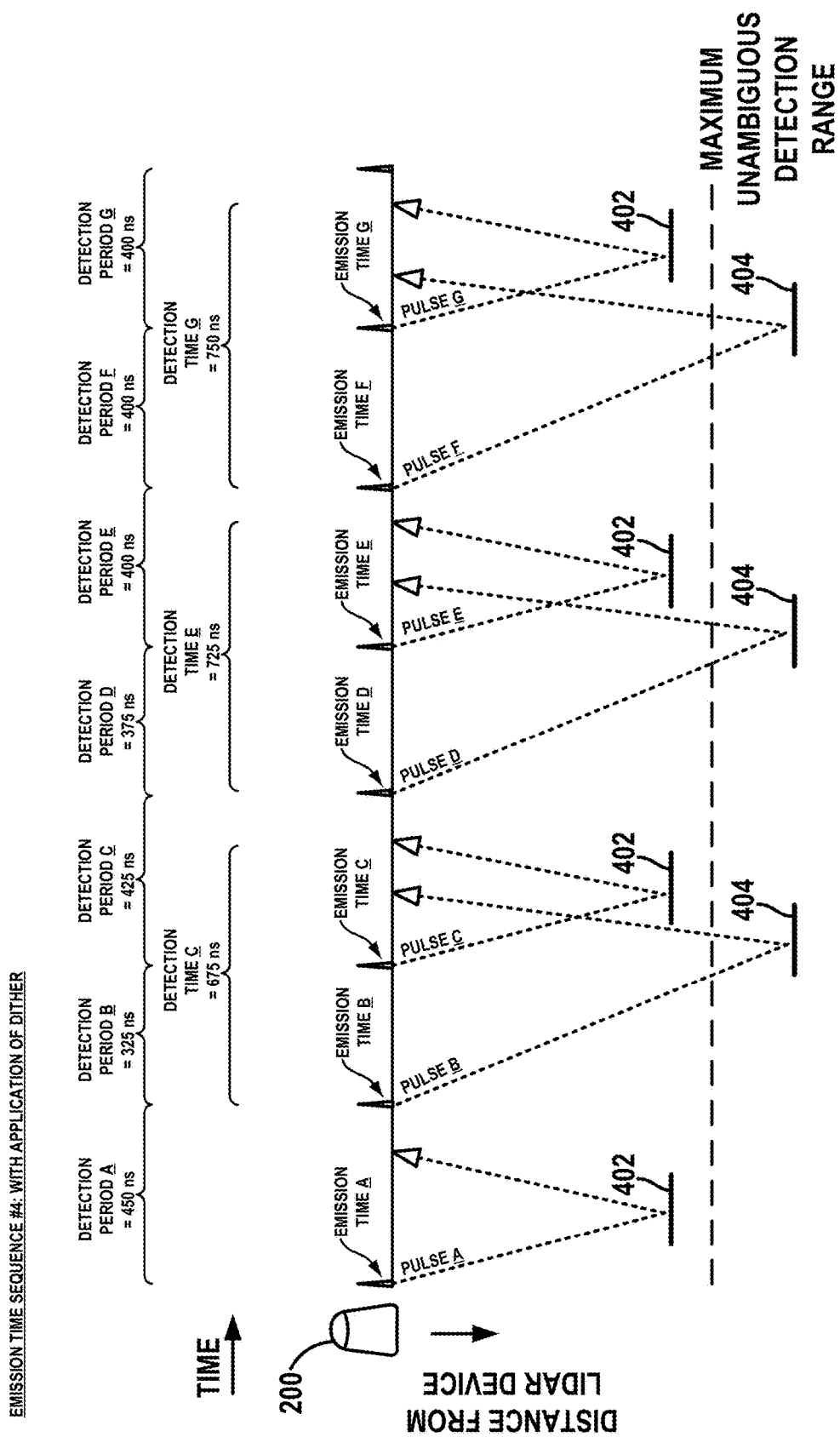
FIG. 14A shows yet another comparison of detection times relative to preceding emission times, according to an example embodiment.

Furthermore, FIGS. 14A-14B illustrate how an additional alternate range hypothesis could help overcome range ambiguity with an even higher level of certainty. In particular, FIG. 14A also shows the emission time sequence #4. But in this case, the computing system respectively determines ranges corresponding light pulses C, E, and G according to a time delay relative to an emission time of a previously emitted light pulse. Namely, as shown in FIG. 14C, the computing system determines that return light pulses C has a detection time of 675 ns relative to emission time B, that return light pulses E has a detection time of 725 ns relative to emission time D, and that return light pulses G has a detection time of 750 ns relative to emission time F. And as shown in FIG. 14B, these detection times of return light pulses C, E, and G respectively have corresponding range of 101.35 m, 108.8 m, and 112.6 m. Therefore, these corresponding ranges result in a set of ranges 1400 considered to be another far range hypothesis.

In this example, the computing system could determine that ranges 1300 are more similar to one another compared to similarity of ranges 1400 (e.g., that ranges 1400 are scattered relative to ranges 1300). Consequently, the computing system could responsively determine with a higher level of certainty that a close range hypothesis associated with light pulses A, C, E, and G (e.g., above-mentioned ranges 902) should be used for object detection, thereby resolving the range ambiguity that may arise due to detection of multiple return light pulses respectively in one or more detection periods. Other illustrations are possible a well.

d. Operating an Autonomous Vehicle Based on a Selected Distance

Figure 15:
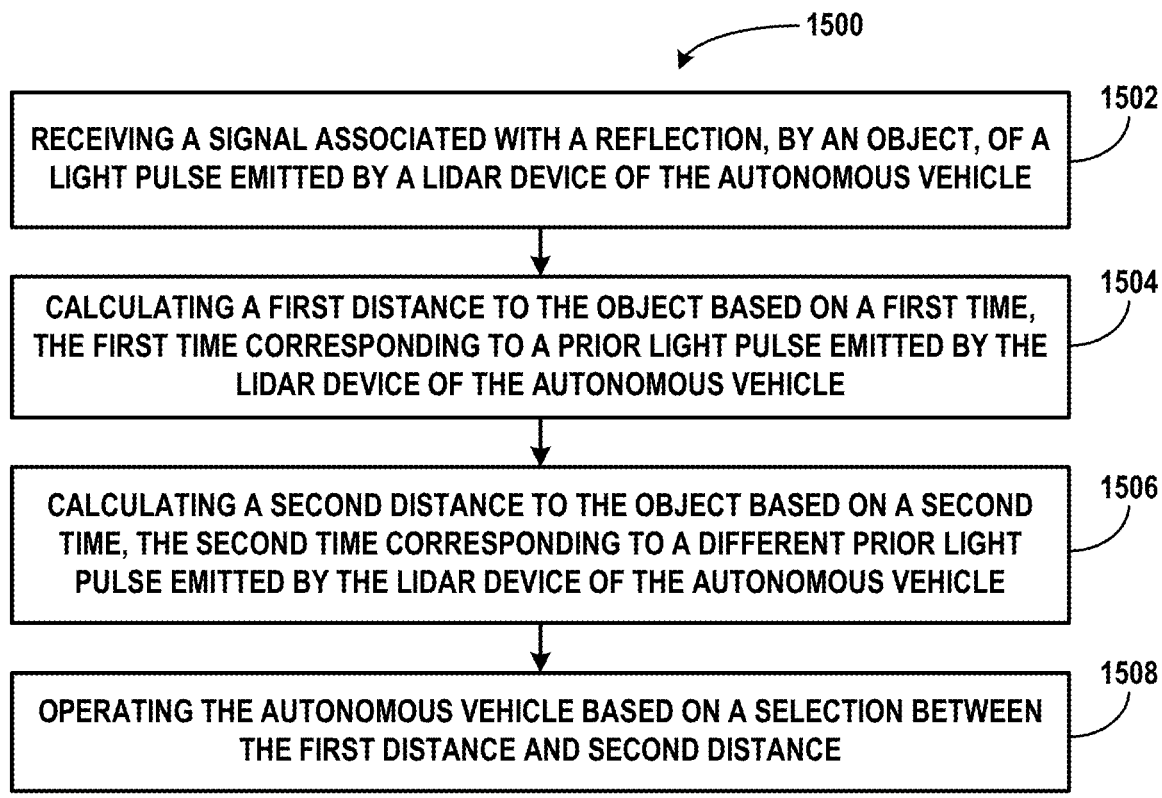
FIG. 15 is a flowchart illustrating a method for operating an autonomous vehicle based on a selected distance, according to an example embodiment.

FIG. 15 is a flowchart illustrating a method 1500, according to an example implementation. In particular, method 1500 may be implemented to select a distance corresponding to a received signal associated with a reflected return light pulse, and to then operate an autonomous vehicle based on the selection. Please note that any of the implementations discussed herein could be applied in the context of method 1500.

At block 1502, method 1500 involves receiving a signal associated with a reflection, by an object, of a light pulse emitted by a LIDAR device of the autonomous vehicle.

At block 1504, method 1500 involves calculating a first distance to the object based on a first time, the first time corresponding to a prior light pulse emitted by the LIDAR device of the autonomous vehicle.

At block 1506, method 1500 involves calculating a second distance to the object based on a second time, the second time corresponding to a different prior light pulse emitted by the LIDAR device of the autonomous vehicle.

At block 1508, method 1500 involves operating the autonomous vehicle based on a selection between the first distance and second distance. For example, the selection between the first distance and second distance could be based on a plurality of received signals associated with respective reflections, by the object, of a plurality of light pulses emitted by the LIDAR device. Generally, one or more of the plurality of light pulses could be emitted according to a timing that deviates from a periodicity by a pseudo-random duration.

VII. CONTROLLING A VEHICLE BASED ON SCANS BY THE LIDAR DEVICE

As noted, a computing system may operate a vehicle based on scans received from the LIDAR device disclosed herein. In particular, the computing system may receive from the LIDAR device scans of an environment around the vehicle. And the computing system may operate the vehicle based at least on the scans of the environment received from the LIDAR device.

More specifically, the computing system may operate the LIDAR device 100 to emit light into the environment. Also, the computing system may receive from the LIDAR device 100 data representative of detections of reflected light. And by comparing detected light beams with emitted light beams, the computing system may determine at least one aspect of one or more objects in the environment.

For example, by comparing a time when a plurality of light beams were emitted by the transmitter of the LIDAR device 100 and a time when the receiver of the LIDAR device 100 detected reflected light, a distance between the LIDAR device 100 and an object in the environment may be determined. In other examples, aspects such as shape, color, material, etc. may also be determined based on various comparisons between emitted light and detected light.

With this arrangement, the computing system could determine a three-dimensional (3D) representation of the environment based on data from the LIDAR device 100. For example, the 3D representation may be generated by the computing system as a 3D point cloud based on the data from the LIDAR device 100. Each point of the 3D cloud, for example, may be associated with a reflected light pulse. As such, the computing system may (e.g., continuously or from time-to-time) generate 3D representations of the environment or portions thereof. And the computing system could then control operation of the vehicle based on evaluation of such 3D representations of the environment.

By way of example, the vehicle may be operated in an autonomous mode. In this example, the computing system may utilize 3D representations to navigate the vehicle (e.g., adjust speed, direction, etc.) safely by avoiding obstacles among other possibilities. The obstacles or objects, for example, may be detected and/or identified using an image processing algorithm or other computing method to analyze the 3D representations and detect and/or identify the various obstacles or objects. As another example, the vehicle may be operated in a partially autonomous or manual mode. In this example, the vehicle may notify a driver or operator of the vehicle of the presence or distance to various objects or changing road conditions (e.g., street lights, street signs, etc.), such as by causing a display or a speaker in the vehicle to present information regarding one or more objects in the environment. Other examples are possible as well.

Figure 16:
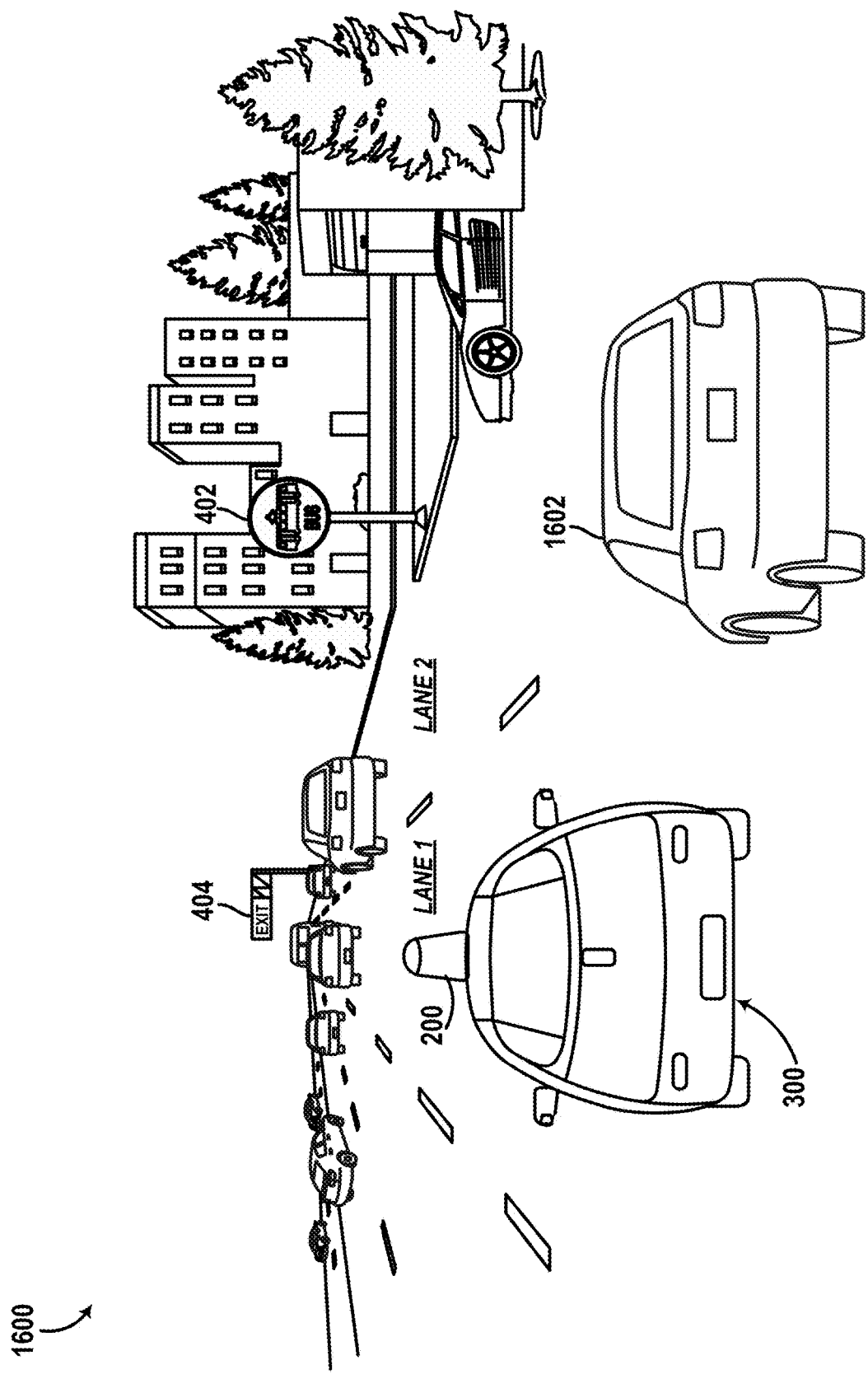
FIG. 16 illustrates operation of a vehicle based on scans of an environment received from a LIDAR device, according to an example embodiment.

FIG. 16 next illustrates example operation of the vehicle 300 based on scans of an environment 1600 received from the LIDAR device 200. In accordance with the present disclosure, the vehicle's computing system may use data received from the LIDAR device 200 to detect and identify distant object(s), such as a road sign 404 for example. In this regard, the computing system may determine based on the data that the road sign 404 is representative of an exit that the vehicle 300 should ideally take in order to arrive at a desired destination. In response to making that determination, the computing system may then operate the vehicle 300 to switch from driving on lane 1 to driving on lane 2.

In practice, the computing system may distinguish between these lanes by recognizing lane markers within 3D representations of the environment 1600. For instance, the vehicle's computing system may use data received from the LIDAR device 200 to detect and identify the nearby lane marker that separates lane 1 from lane 2. Moreover, before operating the vehicle to switch lanes, the computing system may scan the environment to detect and identify objects, so that computing system can operate the vehicle 300 in a way that avoids those detected/identified objects while also operating the vehicle 300 to switch lanes.

For instance, the computing system may use data received from the LIDAR device 200 to detect and identify the nearby vehicle 1602 as well as to detect and identify road sign 402. Based on those detections/identifications, the computing system may operate the vehicle 300 in a way that avoids the vehicle 1602 and road sign 402 while also operating the vehicle 300 to switch from driving on lane 1 to driving on lane 2. Other illustrations are possible as well.

VIII. EXAMPLE ARRANGEMENT OF A VEHICLE

Figure 17:
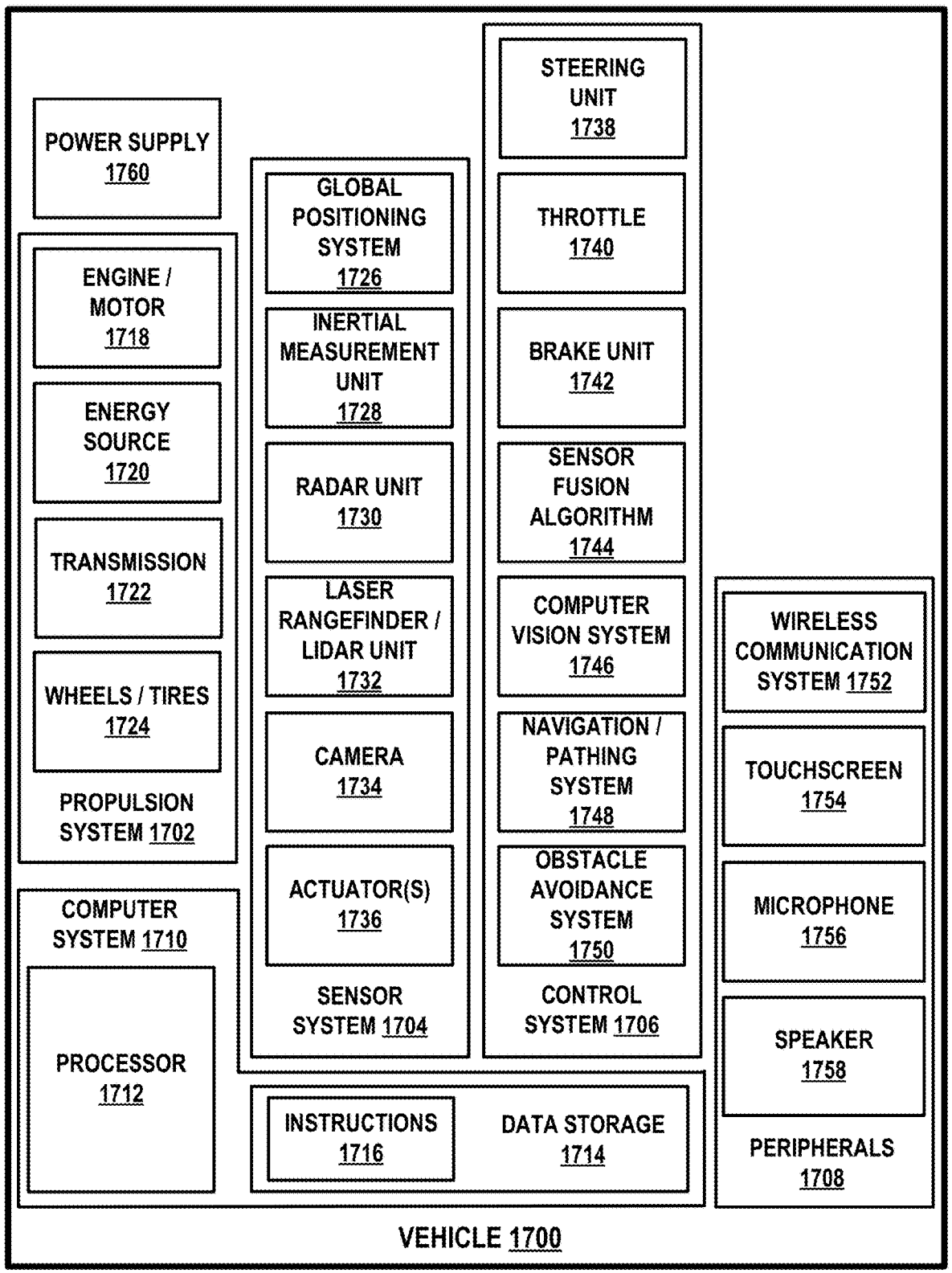
FIG. 17 is a simplified block diagram of a vehicle, according to an example embodiment.

Finally, FIG. 17 is a simplified block diagram of a vehicle 1700, according to an example embodiment. The vehicle 1700 may be similar to the vehicle 300, and may include a LIDAR device similar to the LIDAR device 100. Further, the vehicle 1700 may be configured to perform functions and methods herein such as method 800 and/or method 1000. As shown, the vehicle 1700 includes a propulsion system 1702, a sensor system 1704, a control system 1706 (could also be referred to as a controller 1706), peripherals 1708, and a computer system 1710. Vehicle 1700 may be, for example, a motor vehicle, railed vehicle, watercraft, or aircraft. In other embodiments, the vehicle 1700 may include more, fewer, or different systems, and each system may include more, fewer, or different components.

Additionally, the systems and components shown may be combined or divided in any number of ways. For instance, the control system 1706 and the computer system 1710 may be combined into a single system that operates the vehicle 1700 in accordance with various operations.

The propulsion system 1702 may be configured to provide powered motion for the vehicle 1700. As shown, the propulsion system 1702 includes an engine/motor 1718, an energy source 1720, a transmission 1722, and wheels/tires 1724.

The engine/motor 1718 may be or include any combination of an internal combustion engine, an electric motor, a steam engine, and a Sterling engine. Other motors and engines are possible as well. In some embodiments, the propulsion system 1702 may include multiple types of engines and/or motors. For instance, a gas-electric hybrid car may include a gasoline engine and an electric motor. Other examples are possible.

The energy source 1720 may be a source of energy that powers the engine/motor 1718 in full or in part. That is, the engine/motor 918 may be configured to convert the energy source 1720 into mechanical energy. Examples of energy sources 1720 include gasoline, diesel, propane, other compressed gas-based fuels, ethanol, solar panels, batteries, and other sources of electrical power. The energy source(s) 1720 may additionally or alternatively include any combination of fuel tanks, batteries, capacitors, and/or flywheels. In some embodiments, the energy source 1720 may provide energy for other systems of the vehicle 1700 as well.

The transmission 1722 may be configured to transmit mechanical power from the engine/motor 1718 to the wheels/tires 1724. To this end, the transmission 1722 may include a gearbox, clutch, differential, drive shafts, and/or other elements. In embodiments where the transmission 1722 includes drive shafts, the drive shafts may include one or more axles that are configured to be coupled to the wheels/tires 1724.

The wheels/tires 1724 of vehicle 1700 may be configured in various formats, including a bicycle/motorcycle, tricycle, car/truck four-wheel format, or a rail. Other wheel/tire formats are possible as well, such as those including six or more wheels. In any case, the wheels/tires 1724 may be configured to rotate differentially with respect to other wheels/tires 1724. In some embodiments, the wheels/tires 1724 may include at least one wheel that is fixedly attached to the transmission 1722 and at least one tire coupled to a rim of the wheel that could make contact with the driving surface. The wheels/tires 1724 may include any combination of metal and rubber, or combination of other materials. The propulsion system 1702 may additionally or alternatively include components other than those shown.

The sensor system 1704 may include a number of sensors configured to sense information about an environment in which the vehicle 1700 is located, as well as one or more actuators 1736 configured to modify a position and/or orientation of the sensors. As shown, the sensors of the sensor system 1704 include a Global Positioning System (GPS) 1726, an inertial measurement unit (IMU) 1728, a RADAR unit 1730, a laser rangefinder and/or LIDAR unit 1732, and a camera 1734. The sensor system 1704 may include additional sensors as well, including, for example, sensors that monitor internal systems of the vehicle 1700 (e.g., an $O_2$ monitor, a fuel gauge, an engine oil temperature, etc.). Other sensors are possible as well.

The GPS 1726 may be any sensor (e.g., location sensor) configured to estimate a geographic location of the vehicle 1700. To this end, the GPS 1726 may include a transceiver configured to estimate a position of the vehicle 1700 with respect to the Earth. The GPS 1726 may take other forms as well.

The IMU 1728 may be any combination of sensors configured to sense position and orientation changes of the vehicle 1700 based on inertial acceleration. In some embodiments, the combination of sensors may include, for example, accelerometers and gyroscopes. Other combinations of sensors are possible as well.

The RADAR unit 1730 may be any sensor configured to sense objects in the environment in which the vehicle 1700 is located using radio signals. In some embodiments, in addition to sensing the objects, the RADAR unit 1730 may additionally be configured to sense the speed and/or heading of the objects.

Similarly, the laser range finder or LIDAR unit 1732 may be any sensor configured to sense objects in the environment in which the vehicle 1700 is located using lasers. For example, LIDAR unit 1732 may include one or more LIDAR devices, at least some of which may take the form the LIDAR device 100 disclosed herein.

The camera 1734 may be any camera (e.g., a still camera, a video camera, etc.) configured to capture images of the environment in which the vehicle 1700 is located. To this end, the camera may take any of the forms described above. The sensor system 1704 may additionally or alternatively include components other than those shown.

The control system 1706 may be configured to control operation of the vehicle 1700 and its components. To this end, the control system 1706 may include a steering unit 1738, a throttle 1740, a brake unit 1742, a sensor fusion algorithm 1744, a computer vision system 1746, a navigation or pathing system 1748, and an obstacle avoidance system 1750.

The steering unit 1738 may be any combination of mechanisms configured to adjust the heading of vehicle 1700. The throttle 1740 may be any combination of mechanisms configured to control the operating speed of the engine/motor 1718 and, in turn, the speed of the vehicle 1700. The brake unit 1742 may be any combination of mechanisms configured to decelerate the vehicle 1700. For example, the brake unit 1742 may use friction to slow the wheels/tires 1724. As another example, the brake unit 1742 may convert the kinetic energy of the wheels/tires 1724 to electric current. The brake unit 1742 may take other forms as well.

The sensor fusion algorithm 1744 may be an algorithm (or a computer program product storing an algorithm) configured to accept data from the sensor system 1704 as an input. The data may include, for example, data representing information sensed at the sensors of the sensor system 1704. The sensor fusion algorithm 1744 may include, for example, a Kalman filter, a Bayesian network, an algorithm for some of the functions of the methods herein, or any other algorithm. The sensor fusion algorithm 1744 may further be configured to provide various assessments based on the data from the sensor system 1704, including, for example, evaluations of individual objects and/or features in the environment in which the vehicle 1700 is located, evaluations of particular situations, and/or evaluations of possible impacts based on particular situations. Other assessments are possible as well.

The computer vision system 1746 may be any system configured to process and analyze images captured by the camera 1734 in order to identify objects and/or features in the environment in which the vehicle 1700 is located, including, for example, traffic signals and obstacles. To this end, the computer vision system 1746 may use an object recognition algorithm, a Structure from Motion (SFM) algorithm, video tracking, or other computer vision techniques. In some embodiments, the computer vision system 1746 may additionally be configured to map the environment, track objects, estimate the speed of objects, etc.

The navigation and pathing system 1748 may be any system configured to determine a driving path for the vehicle 1700. The navigation and pathing system 1748 may additionally be configured to update the driving path dynamically while the vehicle 1700 is in operation. In some embodiments, the navigation and pathing system 1748 may be configured to incorporate data from the sensor fusion algorithm 1744, the GPS 1726, the LIDAR unit 1732, and one or more predetermined maps so as to determine the driving path for vehicle 1700.

The obstacle avoidance system 1750 may be any system configured to identify, evaluate, and avoid or otherwise negotiate obstacles in the environment in which the vehicle 1700 is located. The control system 1706 may additionally or alternatively include components other than those shown.

Peripherals 1708 may be configured to allow the vehicle 1700 to interact with external sensors, other vehicles, external computing devices, and/or a user. To this end, the peripherals 1708 may include, for example, a wireless communication system 1752, a touchscreen 1754, a microphone 1756, and/or a speaker 1758.

The wireless communication system 1752 may be any system configured to wirelessly couple to one or more other vehicles, sensors, or other entities, either directly or via a communication network. To this end, the wireless communication system 1752 may include an antenna and a chipset for communicating with the other vehicles, sensors, servers, or other entities either directly or via a communication network. The chipset or wireless communication system 1752 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 1752 may take other forms as well.

The touchscreen 1754 may be used by a user to input commands to the vehicle 1700. To this end, the touchscreen 1754 may be configured to sense at least one of a position and a movement of a user's finger via capacitive sensing, resistance sensing, or a surface acoustic wave process, among other possibilities. The touchscreen 1754 may be capable of sensing finger movement in a direction parallel or planar to the touchscreen surface, in a direction normal to the touchscreen surface, or both, and may also be capable of sensing a level of pressure applied to the touchscreen surface. The touchscreen 1754 may be formed of one or more translucent or transparent insulating layers and one or more translucent or transparent conducting layers. The touchscreen 1754 may take other forms as well.

The microphone 1756 may be configured to receive audio (e.g., a voice command or other audio input) from a user of the vehicle 1700. Similarly, the speakers 1758 may be configured to output audio to the user of the vehicle 1700. The peripherals 1708 may additionally or alternatively include components other than those shown.

The computer system 1710 may be configured to transmit data to, receive data from, interact with, and/or control one or more of the propulsion system 1702, the sensor system 1704, the control system 1706, and the peripherals 1708. To this end, the computer system 1710 may be communicatively linked to one or more of the propulsion system 1702, the sensor system 1704, the control system 1706, and the peripherals 1708 by a system bus, network, and/or other connection mechanism (not shown).

In one example, the computer system 1710 may be configured to control operation of the transmission 1722 to improve fuel efficiency. As another example, the computer system 1710 may be configured to cause the camera 1734 to capture images of the environment. As yet another example, the computer system 1710 may be configured to store and execute instructions corresponding to the sensor fusion algorithm 1744. As still another example, the computer system 1710 may be configured to store and execute instructions for determining a 3D representation of the environment around the vehicle 1700 using the LIDAR unit 1732. Other examples are possible as well. Thus, the computer system 1710 could function as the controller for the LIDAR unit 1732.

As shown, the computer system 1710 includes the processor 1712 and data storage 1714. The processor 1712 may include one or more general-purpose processors and/or one or more special-purpose processors. To the extent the processor 1712 includes more than one processor, such processors could work separately or in combination. Data storage 1714, in turn, may include one or more volatile and/or one or more non-volatile storage components, such as optical, magnetic, and/or organic storage, and data storage 1714 may be integrated in whole or in part with the processor 1712.

In some embodiments, data storage 1714 may contain instructions 1716 (e.g., program logic) executable by the processor 1712 to execute various vehicle functions (e.g., method 500, etc.). Data storage 1714 may contain additional instructions as well, including instructions to transmit data to, receive data from, interact with, and/or control one or more of the propulsion system 1702, the sensor system 1704, the control system 1706, and/or the peripherals 1708. The computer system 1710 may additionally or alternatively include components other than those shown.

As shown, the vehicle 1700 further includes a power supply 1760, which may be configured to provide power to some or all of the components of the vehicle 1700. To this end, the power supply 1760 may include, for example, a rechargeable lithium-ion or lead-acid battery. In some embodiments, one or more banks of batteries could be configured to provide electrical power. Other power supply materials and configurations are possible as well. In some embodiments, the power supply 1760 and energy source 1720 may be implemented together as one component, as in some all-electric cars.

In some embodiments, the vehicle 1700 may include one or more elements in addition to or instead of those shown. For example, the vehicle 1700 may include one or more additional interfaces and/or power supplies. Other additional components are possible as well. In such embodiments, data storage 1714 may further include instructions executable by the processor 1712 to control and/or communicate with the additional components.

Still further, while each of the components and systems are shown to be integrated in the vehicle 1700, in some embodiments, one or more components or systems may be removably mounted on or otherwise connected (mechanically or electrically) to the vehicle 1700 using wired or wireless connections. The vehicle 1700 may take other forms as well.

IX. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I claim:

1. A method comprising:
   operating a Light Detection and Ranging (LIDAR) device coupled to a vehicle to emit light pulses at emission times in accordance with an emission time sequence, wherein the emission time sequence includes a time-varying dither, and to detect return light pulses during corresponding detection periods, wherein each emitted light pulse is associated with a corresponding detection period;
   detecting, using the LIDAR device, a plurality of return light pulses, wherein each return light pulse is detected at a respective detection time in a respective detection period;
   determining a first set of ranges based on the detection times of the return light pulses relative to emission times of emitted light pulses associated with the detection periods in which the return light pulses were detected;
   determining a second set of ranges based on the detection times of the return light pulses relative to emission times of emitted light pulses associated with detection periods preceding the detection periods in which the return light pulses were detected;
   selecting between the first set of ranges and the second set of ranges for determining a representation of an environment of the vehicle, wherein the selecting is based on at least one of a similarity of ranges in the first set of ranges or a similarity of ranges in the second set of ranges; and
   operating the vehicle based on the representation of the environment of the vehicle.

2. The method of claim 1, wherein selecting between the first set of ranges and the second set of ranges comprises:
   making a determination that the ranges in the first set of ranges are similar to one another; and
   selecting the first set of ranges for determining the representation of the environment of the vehicle based on the determination that the ranges in the first set of ranges are similar to one another.

3. The method of claim 2, wherein the determination that the ranges in the first set of ranges are similar to one another comprises determining that the ranges in the first set of ranges are within a threshold tolerance.

4. The method of claim 2, wherein the determination that the ranges in the first set of ranges are similar to one another comprises determining that a difference between a smallest range and a greatest range in the first set of ranges does not exceed a threshold difference.

5. The method of claim 1, wherein selecting between the first set of ranges and the second set of ranges comprises:
   making a determination that the ranges in the second set of ranges are similar to one another; and
   selecting the second set of ranges for determining the representation of the environment of the vehicle based on the determination that the ranges in the second set of ranges are similar to one another.

6. The method of claim 5, wherein the determination that the ranges in the second set of ranges are similar to one another comprises determining that the ranges in the second set of ranges are within a threshold tolerance.

7. The method of claim 5, wherein the determination that the ranges in the second set of ranges are similar to one another comprises determining that a difference between a smallest range and a greatest range in the second set of ranges does not exceed a threshold difference.

8. The method of claim 1, wherein selecting between the first set of ranges and the second set of ranges comprises:
   making a determination that the ranges in the first set of ranges are similar to one another;
   making a determination that the ranges in the second set of ranges are not similar to one another; and
   selecting the first set of ranges for determining the representation of the environment of the vehicle based on the determination that the ranges in the first set of ranges are similar to one another and the determination that the ranges in the second set of ranges are not similar to one another.

9. The method of claim 8, wherein the determination that the ranges in the first set of ranges are similar to one another comprises determining that the ranges in the first set of ranges are within a threshold tolerance and the determination that the ranges in the second set of ranges are not similar to one another comprises determining that the ranges in the second set of ranges are not within the threshold tolerance.

10. The method of claim 8, wherein the determination that the ranges in the first set of ranges are similar to one another comprises demining that a difference between a smallest range and a greatest range in the first set of ranges does not exceed a threshold difference and the determination that the ranges in second set of ranges are not similar to one another comprises determining that a difference between a smallest range and a greatest range in the second set of ranges exceeds the threshold difference.

11. The method of claim 1, wherein selecting between the first set of ranges and the second set of ranges comprises:
    making a determination that the ranges in the first set of ranges are not similar to one another;
    making a determination that the ranges in the second set of ranges are similar to one another; and
    selecting the second set of ranges for determining the representation of the environment of the vehicle based on the determination that the ranges in the first set of ranges are not similar to one another and the determination that the ranges in the second set of ranges are similar to one another.

12. The method of claim 11, wherein the determination that the ranges in the first set of ranges are not similar to one another comprises determining that the ranges in the first set of ranges are not within a threshold tolerance and the determination that the ranges in the second set of ranges are similar to one another comprises determining that the ranges in the second set of ranges are within the threshold tolerance.

13. The method of claim 11, wherein the determination that the ranges in the first set of ranges are not similar to one another comprises demining that a difference between a smallest range and a greatest range in the first set of ranges exceeds a threshold difference and the determination that the ranges in second set of ranges are similar to one another comprises determining that a difference between a smallest range and a greatest range in the second set of ranges does not exceed the threshold difference.

14. The method of claim 1, wherein selecting between the first set of ranges and the second set of ranges comprises:
making a determination that the ranges in the first set of ranges are more similar to one another compared to similarity of the ranges in the second set of ranges; and
selecting the first set of ranges for determining the representation of the environment of the vehicle based on the determination that the ranges in the first set of ranges are more similar to one another compared to similarity of the ranges in the second set of ranges.

15. The method of claim 1, wherein selecting between the first set of ranges and the second set of ranges comprises:
making a determination that the ranges in the second set of ranges are more similar to one another compared to similarity of the ranges in the first set of ranges; and
selecting the second set of ranges for determining the representation of the environment of the vehicle based on the determination that the ranges in the second set of ranges are more similar to one another compared to similarity of the ranges in the first set of ranges.

16. A method for operating an autonomous vehicle system comprising:
emitting, from a Light Detection and Ranging (LIDAR) device, light pulses in accordance with an emission time sequence;
receiving a plurality of return light pulses; and
associating a range with the plurality of return light pulses based on a similarity between the return light pulses, wherein associating the range with the plurality of return light pulses based on the similarity between the return light pulses comprises:
identifying two or more ranges for each return light pulse in the plurality of return light pulses.

17. The method of claim 16, wherein the emission time sequence includes a time-varying dither.

18. The method of claim 16, wherein identifying two or more ranges for each return light pulse comprises:
identifying a first range for each return light pulse based on a first detection period; and
identifying a second range for each return light pulse based on a second detection period.

19. The method of claim 18, wherein the similarity is between ranges identified based on the second detection period.

20. A computing system comprising:
one or more processors;
a non-transitory computer readable medium; and
program instructions stored on the non-transitory computer readable medium and executable by the one or more processors to perform operations comprising:
operating a Light Detection and Ranging (LIDAR) device coupled to a vehicle to emit light pulses at emission times in accordance with an emission time sequence, wherein the emission time sequence includes a time-varying dither, and to detect return light pulses during corresponding detection periods, wherein each emitted light pulse is associated with a corresponding detection period;
detecting, using the LIDAR device, a plurality of return light pulses, wherein each return light pulse is detected at a respective detection time in a respective detection period;
determining a first set of ranges based on the detection times of the return light pulses relative to emission times of emitted light pulses associated with the detection periods in which the return light pulses were detected;
determining a second set of ranges based on the detection times of the return light pulses relative to emission times of emitted light pulses associated with detection periods preceding the detection periods in which the return light pulses were detected;
selecting between the first set of ranges and the second set of ranges for determining a representation of an environment of the vehicle, wherein the selecting is based on at least one of a similarity of ranges in the first set of ranges or a similarity of ranges in the second set of ranges, and wherein the representation of the environment of the vehicle comprises a three-dimensional (3D) point cloud; and
operating the vehicle based on the representation of the environment of the vehicle.

* * * * *